US008625669B2

(12) United States Patent
Holcomb

(10) Patent No.: US 8,625,669 B2
(45) Date of Patent: *Jan. 7, 2014

(54) PREDICTING MOTION VECTORS FOR FIELDS OF FORWARD-PREDICTED INTERLACED VIDEO FRAMES

(75) Inventor: Thomas W. Holcomb, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1304 days.

This patent is subject to a terminal disclaimer.

(21) Appl. No.: 12/401,831

(22) Filed: Mar. 11, 2009

(65) Prior Publication Data

US 2009/0168890 A1   Jul. 2, 2009

Related U.S. Application Data

(63) Continuation of application No. 10/857,473, filed on May 27, 2004, now Pat. No. 7,567,617.

(60) Provisional application No. 60/501,081, filed on Sep. 7, 2003.

(51) Int. Cl.
*H04N 7/12* (2006.01)

(52) U.S. Cl.
USPC .............................. 375/240.13; 375/240.16

(58) Field of Classification Search
USPC .................. 375/240.01–240.29; 382/240
See application file for complete search history.

(56) References Cited

U.S. PATENT DOCUMENTS

| | | |
|---|---|---|
| 4,454,546 A | 6/1984 | Mori |
| 4,661,849 A | 4/1987 | Hinman |
| 4,661,853 A | 4/1987 | Roeder et al. |
| 4,691,329 A | 9/1987 | Juri et al. |
| 4,695,882 A | 9/1987 | Wada et al. |
| 4,796,087 A | 1/1989 | Guichard et al. |
| 4,800,432 A | 1/1989 | Barnett et al. |

(Continued)

FOREIGN PATENT DOCUMENTS

| | | |
|---|---|---|
| EP | 0 279 053 | 8/1988 |
| EP | 0 397 402 | 11/1990 |

(Continued)

OTHER PUBLICATIONS

U.S. Appl. No. 60/341,674, filed Dec. 17, 2001, Lee et al.

(Continued)

*Primary Examiner* — Gims Philippe
(74) *Attorney, Agent, or Firm* — Klarquist Sparkman, LLP

(57) ABSTRACT

Techniques and tools for encoding and decoding predicted images in interlaced video are described. For example, a video encoder or decoder computes a motion vector predictor for a motion vector for a portion (e.g., a block or macroblock) of an interlaced P-field, including selecting between using a same polarity or opposite polarity motion vector predictor for the portion. The encoder/decoder processes the motion vector based at least in part on the motion vector predictor computed for the motion vector. The processing can comprise computing a motion vector differential between the motion vector and the motion vector predictor during encoding and reconstructing the motion vector from a motion vector differential and the motion vector predictor during decoding. The selecting can be based at least in part on a count of opposite polarity motion vectors for a neighborhood around the portion and/or a count of same polarity motion vectors.

35 Claims, 36 Drawing Sheets

(56) References Cited

U.S. PATENT DOCUMENTS

| | | | |
|---|---|---|---|
| 4,849,812 A | 7/1989 | Borgers et al. | |
| 4,862,267 A | 8/1989 | Gillard et al. | |
| 4,864,393 A | 9/1989 | Harradine et al. | |
| 4,999,705 A | 3/1991 | Puri | |
| 5,021,879 A | 6/1991 | Vogel | |
| 5,068,724 A | 11/1991 | Krause et al. | |
| 5,089,887 A | 2/1992 | Robert et al. | |
| 5,091,782 A | 2/1992 | Krause et al. | |
| 5,103,306 A | 4/1992 | Weiman et al. | |
| 5,105,271 A | 4/1992 | Niihara | |
| 5,111,292 A | 5/1992 | Kuriacose et al. | |
| 5,117,287 A | 5/1992 | Koike et al. | |
| 5,144,426 A | 9/1992 | Tanaka et al. | |
| 5,155,594 A | 10/1992 | Bernstein et al. | |
| 5,157,490 A | 10/1992 | Kawai et al. | |
| 5,175,618 A | 12/1992 | Ueda | |
| 5,193,004 A | 3/1993 | Wang et al. | |
| 5,223,949 A | 6/1993 | Honjo | |
| 5,227,878 A * | 7/1993 | Puri et al. | 375/240.15 |
| 5,258,836 A | 11/1993 | Murata | |
| 5,274,453 A | 12/1993 | Maeda | |
| 5,287,420 A | 2/1994 | Barrett | |
| 5,298,991 A | 3/1994 | Yagasaki et al. | |
| 5,317,397 A | 5/1994 | Odaka et al. | |
| 5,319,463 A | 6/1994 | Hongu et al. | |
| 5,343,248 A | 8/1994 | Fujinami | |
| 5,347,308 A | 9/1994 | Wai | |
| 5,376,968 A | 12/1994 | Wu et al. | |
| 5,376,971 A | 12/1994 | Kadono et al. | |
| 5,379,351 A | 1/1995 | Fandrianto et al. | |
| 5,386,234 A | 1/1995 | Veltman et al. | |
| 5,400,075 A | 3/1995 | Savatier | |
| 5,412,430 A | 5/1995 | Nagata | |
| 5,412,435 A | 5/1995 | Nakajima | |
| RE34,965 E | 6/1995 | Sugiyama | |
| 5,422,676 A | 6/1995 | Herpel et al. | |
| 5,424,779 A | 6/1995 | Odaka | |
| 5,426,464 A | 6/1995 | Casavant et al. | |
| 5,428,396 A | 6/1995 | Yagasaki et al. | |
| 5,442,400 A | 8/1995 | Sun | |
| 5,448,297 A | 9/1995 | Alattar et al. | |
| 5,453,799 A | 9/1995 | Yang et al. | |
| 5,457,495 A | 10/1995 | Hartung | |
| 5,461,421 A | 10/1995 | Moon | |
| RE35,093 E | 11/1995 | Wang et al. | |
| 5,465,118 A | 11/1995 | Hancock et al. | |
| 5,467,086 A | 11/1995 | Jeong | |
| 5,467,136 A | 11/1995 | Odaka | |
| 5,477,272 A | 12/1995 | Zhang et al. | |
| RE35,158 E | 2/1996 | Sugiyama | |
| 5,491,523 A | 2/1996 | Sato | |
| 5,510,840 A | 4/1996 | Yonemitsu et al. | |
| 5,517,327 A | 5/1996 | Nakatani et al. | |
| 5,539,466 A | 7/1996 | Igarashi et al. | |
| 5,544,286 A | 8/1996 | Laney | |
| 5,546,129 A | 8/1996 | Lee | |
| 5,550,541 A | 8/1996 | Todd | |
| 5,550,847 A | 8/1996 | Zhu | |
| 5,552,832 A | 9/1996 | Astle | |
| 5,565,922 A | 10/1996 | Krause | |
| 5,574,504 A | 11/1996 | Yagasaki et al. | |
| 5,594,504 A | 1/1997 | Ebrahimi | |
| 5,594,813 A | 1/1997 | Fandrianto et al. | |
| 5,598,215 A | 1/1997 | Watanabe | |
| 5,598,216 A | 1/1997 | Lee | |
| 5,617,144 A | 4/1997 | Lee | |
| 5,619,281 A | 4/1997 | Jung | |
| 5,621,481 A | 4/1997 | Yasuda et al. | |
| 5,623,311 A | 4/1997 | Phillips et al. | |
| 5,648,819 A | 7/1997 | Tranchard | |
| 5,650,829 A | 7/1997 | Sugimoto et al. | |
| 5,654,771 A | 8/1997 | Tekalp et al. | |
| 5,659,365 A | 8/1997 | Wilkinson | |
| 5,666,461 A | 9/1997 | Igarashi et al. | |
| 5,668,608 A | 9/1997 | Lee | |
| 5,668,932 A | 9/1997 | Laney | |
| 5,687,097 A | 11/1997 | Mizusawa et al. | |
| 5,689,305 A * | 11/1997 | Ng et al. | 375/240.15 |
| 5,689,306 A | 11/1997 | Jung | |
| 5,692,063 A | 11/1997 | Lee et al. | |
| 5,694,173 A | 12/1997 | Kimura et al. | |
| 5,699,117 A | 12/1997 | Uramoto et al. | |
| 5,699,476 A | 12/1997 | Van Der Meer | |
| 5,701,164 A | 12/1997 | Kato | |
| 5,715,005 A | 2/1998 | Masaki | |
| 5,717,441 A | 2/1998 | Serizawa et al. | |
| 5,731,850 A | 3/1998 | Maturi et al. | |
| 5,748,784 A | 5/1998 | Sugiyama | |
| 5,748,789 A | 5/1998 | Lee et al. | |
| 5,767,898 A | 6/1998 | Urano et al. | |
| 5,784,175 A | 7/1998 | Lee | |
| 5,786,860 A | 7/1998 | Kim et al. | |
| 5,787,203 A | 7/1998 | Lee et al. | |
| 5,793,897 A | 8/1998 | Jo et al. | |
| 5,796,855 A | 8/1998 | Lee | |
| 5,799,113 A | 8/1998 | Lee | |
| RE35,910 E | 9/1998 | Nagata et al. | |
| 5,825,830 A | 10/1998 | Kopf | |
| 5,825,929 A | 10/1998 | Chen et al. | |
| 5,835,144 A | 11/1998 | Matsumura et al. | |
| 5,835,146 A | 11/1998 | Stone | |
| 5,835,149 A | 11/1998 | Astle | |
| 5,844,613 A | 12/1998 | Chaddha | |
| 5,847,776 A | 12/1998 | Khmelnitsky et al. | |
| 5,859,668 A | 1/1999 | Aono et al. | |
| 5,874,995 A | 2/1999 | Naimpally et al. | |
| 5,901,248 A | 5/1999 | Fandrianto et al. | |
| 5,905,535 A | 5/1999 | Kerdranvat | |
| 5,905,542 A | 5/1999 | Linzer | |
| 5,923,375 A | 7/1999 | Pau | |
| 5,926,573 A | 7/1999 | Kim et al. | |
| 5,929,940 A | 7/1999 | Jeannin | |
| 5,946,042 A | 8/1999 | Kato | |
| 5,946,043 A | 8/1999 | Lee et al. | |
| 5,949,489 A | 9/1999 | Nishikawa et al. | |
| 5,959,673 A | 9/1999 | Lee et al. | |
| 5,963,258 A | 10/1999 | Nishikawa et al. | |
| 5,963,259 A | 10/1999 | Nakaya et al. | |
| 5,963,673 A | 10/1999 | Kodama et al. | |
| 5,970,173 A | 10/1999 | Lee et al. | |
| 5,970,175 A | 10/1999 | Nishikawa et al. | |
| 5,973,743 A | 10/1999 | Han | |
| 5,973,755 A | 10/1999 | Gabriel | |
| 5,982,437 A | 11/1999 | Okazaki et al. | |
| 5,982,438 A | 11/1999 | Lin et al. | |
| 5,990,960 A | 11/1999 | Murakami et al. | |
| 5,991,447 A | 11/1999 | Eifrig et al. | |
| 6,002,439 A | 12/1999 | Murakami et al. | |
| 6,005,980 A | 12/1999 | Eifrig et al. | |
| RE36,507 E | 1/2000 | Iu | |
| 6,011,596 A | 1/2000 | Burl et al. | |
| 6,026,195 A | 2/2000 | Eifrig et al. | |
| 6,035,070 A | 3/2000 | Moon et al. | |
| 6,040,863 A | 3/2000 | Kato | |
| 6,052,150 A | 4/2000 | Kikuchi | |
| 6,057,884 A | 5/2000 | Chen et al. | |
| 6,058,212 A | 5/2000 | Yokohama | |
| 6,067,322 A | 5/2000 | Wang | |
| 6,081,209 A | 6/2000 | Schuyler et al. | |
| 6,094,225 A | 7/2000 | Han | |
| RE36,822 E | 8/2000 | Sugiyama | |
| 6,097,759 A | 8/2000 | Murakami et al. | |
| 6,111,914 A | 8/2000 | Bist | |
| 6,130,963 A | 10/2000 | Uz et al. | |
| 6,148,027 A | 11/2000 | Song et al. | |
| 6,148,033 A | 11/2000 | Pearlstein et al. | |
| 6,154,495 A | 11/2000 | Yamaguchi et al. | |
| 6,167,090 A | 12/2000 | Iizuka | |
| 6,188,725 B1 | 2/2001 | Sugiyama | |
| 6,188,794 B1 | 2/2001 | Nishikawa et al. | |
| 6,201,927 B1 | 3/2001 | Comer | |
| 6,205,176 B1 | 3/2001 | Sugiyama | |
| 6,208,761 B1 | 3/2001 | Passagio et al. | |
| 6,215,905 B1 | 4/2001 | Lee et al. | |

(56) References Cited

U.S. PATENT DOCUMENTS

| | | |
|---|---|---|
| 6,219,070 B1 | 4/2001 | Baker et al. |
| 6,219,464 B1 | 4/2001 | Greggain et al. |
| 6,233,017 B1 | 5/2001 | Chaddha |
| 6,236,806 B1 | 5/2001 | Kojima et al. |
| RE37,222 E | 6/2001 | Yonemitsu |
| 6,243,418 B1 | 6/2001 | Kim |
| 6,259,741 B1 | 7/2001 | Chen et al. |
| 6,263,024 B1 | 7/2001 | Matsumoto |
| 6,263,065 B1 | 7/2001 | Durinovic-Johri et al. |
| 6,266,091 B1 | 7/2001 | Saha et al. |
| 6,271,885 B2 | 8/2001 | Sugiyama |
| 6,272,179 B1 | 8/2001 | Kadono |
| 6,275,528 B1 | 8/2001 | Isozaki et al. |
| 6,275,531 B1 | 8/2001 | Li |
| 6,281,942 B1 | 8/2001 | Wang |
| 6,282,243 B1 | 8/2001 | Kazui et al. |
| 6,289,049 B1 | 9/2001 | Kim et al. |
| 6,289,132 B1 | 9/2001 | Goertzen |
| 6,292,585 B1 | 9/2001 | Yamaguchi et al. |
| 6,295,376 B1 | 9/2001 | Nakaya |
| 6,307,887 B1 | 10/2001 | Gabriel |
| 6,307,973 B2 | 10/2001 | Nishikawa et al. |
| 6,310,918 B1 | 10/2001 | Saha et al. |
| 6,320,593 B1 | 11/2001 | Sobel et al. |
| 6,324,216 B1 | 11/2001 | Igarashi |
| 6,337,881 B1 | 1/2002 | Chaddha |
| 6,339,656 B1 | 1/2002 | Marui |
| 6,377,628 B1 | 4/2002 | Schultz et al. |
| 6,381,275 B1 | 4/2002 | Fukuhara et al. |
| 6,381,277 B1 | 4/2002 | Chun et al. |
| 6,381,279 B1 | 4/2002 | Taubman |
| 6,393,059 B1 | 5/2002 | Sugiyama |
| 6,396,876 B1 | 5/2002 | Babonneau et al. |
| 6,404,813 B1 | 6/2002 | Haskell et al. |
| 6,408,029 B1 | 6/2002 | McVeigh et al. |
| 6,418,166 B1 | 7/2002 | Wu et al. |
| 6,421,383 B2 | 7/2002 | Beattie |
| 6,430,316 B1 | 8/2002 | Wilkinson |
| 6,441,842 B1 | 8/2002 | Fandrianto et al. |
| 6,442,204 B1 | 8/2002 | Snook et al. |
| 6,449,312 B1 | 9/2002 | Zhang et al. |
| 6,483,928 B1 | 11/2002 | Bagni et al. |
| 6,493,392 B1 | 12/2002 | Chung et al. |
| 6,496,608 B1 | 12/2002 | Chui |
| 6,498,810 B1 | 12/2002 | Kim et al. |
| 6,519,005 B2 | 2/2003 | Bakhmutsky et al. |
| 6,519,287 B1 | 2/2003 | Hawkins et al. |
| 6,529,632 B1 | 3/2003 | Nakaya et al. |
| 6,539,056 B1 | 3/2003 | Sato et al. |
| 6,563,953 B2 | 5/2003 | Lin et al. |
| 6,647,061 B1 | 11/2003 | Panusopone et al. |
| 6,650,781 B2 | 11/2003 | Nakaya |
| 6,661,470 B1 | 12/2003 | Kawakami et al. |
| 6,671,323 B1 | 12/2003 | Tahara et al. |
| 6,704,360 B2 | 3/2004 | Haskell et al. |
| 6,728,317 B1 | 4/2004 | Demos |
| RE38,563 E | 8/2004 | Eifrig et al. |
| 6,778,610 B2 | 8/2004 | Lin |
| 6,782,053 B1 | 8/2004 | Lainema |
| 6,950,469 B2 | 9/2005 | Karczewicz et al. |
| 6,968,008 B1 | 11/2005 | Ribas-Corbera et al. |
| 6,980,596 B2 | 12/2005 | Wang et al. |
| 6,983,018 B1 | 1/2006 | Lin et al. |
| 7,020,200 B2 | 3/2006 | Winger |
| 7,023,919 B2 | 4/2006 | Cho et al. |
| 7,233,621 B2 | 6/2007 | Jeon |
| 7,295,616 B2 | 11/2007 | Sun et al. |
| 7,317,839 B2 | 1/2008 | Holcomb |
| 7,453,941 B1 | 11/2008 | Yamori et al. |
| 7,486,734 B2 | 2/2009 | Machida |
| 7,567,617 B2 | 7/2009 | Holcomb |
| 7,616,692 B2 | 11/2009 | Holcomb et al. |
| 7,623,574 B2 | 11/2009 | Holcomb |
| 7,630,438 B2 | 12/2009 | Mukerjee et al. |
| 7,742,529 B1 | 6/2010 | Ghanbari |
| 7,822,120 B2 | 10/2010 | Kondo et al. |
| 2001/0019586 A1 | 9/2001 | Kang et al. |
| 2001/0050957 A1 | 12/2001 | Nakaya et al. |
| 2002/0122488 A1 | 9/2002 | Takahashi et al. |
| 2002/0186890 A1 | 12/2002 | Lee et al. |
| 2003/0072374 A1 | 4/2003 | Sohm |
| 2003/0076883 A1 | 4/2003 | Bottreau et al. |
| 2003/0095603 A1 | 5/2003 | Lan et al. |
| 2003/0099292 A1 | 5/2003 | Wang et al. |
| 2003/0099294 A1 | 5/2003 | Wang et al. |
| 2003/0112864 A1 | 6/2003 | Karczewicz et al. |
| 2003/0113026 A1 | 6/2003 | Srinivasan et al. |
| 2003/0142748 A1 | 7/2003 | Tourapis |
| 2003/0152146 A1 | 8/2003 | Lin et al. |
| 2003/0156646 A1 | 8/2003 | Hsu et al. |
| 2003/0161402 A1 | 8/2003 | Horowitz |
| 2003/0179826 A1 | 9/2003 | Jeon |
| 2003/0202705 A1 | 10/2003 | Sun |
| 2004/0057523 A1 | 3/2004 | Koto et al. |
| 2004/0136461 A1 | 7/2004 | Kondo et al. |
| 2005/0013497 A1 | 1/2005 | Hsu et al. |
| 2005/0013498 A1 | 1/2005 | Srinivasan |
| 2005/0036700 A1 | 2/2005 | Lan et al. |
| 2005/0036759 A1 | 2/2005 | Lin et al. |
| 2005/0053137 A1 | 3/2005 | Holcomb |
| 2005/0053147 A1 | 3/2005 | Mukerjee et al. |
| 2005/0053149 A1 | 3/2005 | Mukerjee et al. |
| 2005/0053292 A1 | 3/2005 | Mukerjee et al. |
| 2005/0058205 A1 | 3/2005 | Holcomb et al. |
| 2005/0100093 A1 | 5/2005 | Holcomb |
| 2005/0226335 A1 | 10/2005 | Lee et al. |
| 2006/0013307 A1 | 1/2006 | Olivier et al. |

FOREIGN PATENT DOCUMENTS

| | | |
|---|---|---|
| EP | 0 526 163 | 2/1993 |
| EP | 0 535 746 | 4/1993 |
| EP | 0 540 350 | 5/1993 |
| EP | 0 542 474 | 5/1993 |
| EP | 0 588 653 | 3/1994 |
| EP | 0 614 318 | 9/1994 |
| EP | 0 625 853 | 11/1994 |
| EP | 0 651 574 | 5/1995 |
| EP | 0 676 900 | 10/1995 |
| EP | 0 771 114 | 5/1997 |
| EP | 0 786 907 | 7/1997 |
| EP | 0 825 778 | 2/1998 |
| EP | 0 830 029 | 3/1998 |
| EP | 0 863 674 | 9/1998 |
| EP | 0 863 675 | 9/1998 |
| EP | 0 884 912 | 12/1998 |
| EP | 0 944 245 | 9/1999 |
| EP | 1 335 609 | 8/2003 |
| EP | 1 411 729 | 4/2004 |
| GB | 2328337 | 2/1999 |
| GB | 2332115 | 6/1999 |
| GB | 2343579 | 5/2000 |
| JP | 61205086 | 9/1986 |
| JP | 62 213 494 | 9/1987 |
| JP | 3001688 | 1/1991 |
| JP | 3 129 986 | 3/1991 |
| JP | 05-199422 | 8/1993 |
| JP | 6 078 295 | 3/1994 |
| JP | 6 078 298 | 3/1994 |
| JP | 06-276481 | 9/1994 |
| JP | 06-276511 | 9/1994 |
| JP | 6292188 | 10/1994 |
| JP | 07-087331 | 3/1995 |
| JP | 7-274171 | 10/1995 |
| JP | 08-140099 | 5/1996 |
| JP | 08-251601 | 9/1996 |
| JP | 09-322163 | 12/1997 |
| JP | 10 056 644 | 2/1998 |
| JP | 10-271512 | 10/1998 |
| JP | 11-004441 | 1/1999 |
| JP | 11-075191 | 3/1999 |
| JP | 11-196420 | 7/1999 |
| JP | 2001-346215 | 12/2001 |
| JP | 2002-532027 | 9/2002 |

(56) References Cited

FOREIGN PATENT DOCUMENTS

| JP | 2004-048711 | 2/2004 |
|---|---|---|
| JP | 2004-215229 | 7/2004 |
| JP | 2005-510985 | 4/2005 |
| KR | 10-0233764 | 12/1999 |
| WO | WO 00/33581 | 8/2000 |
| WO | WO 01/95633 | 12/2001 |
| WO | WO 03/026296 | 3/2003 |
| WO | WO 03/026315 | 3/2003 |
| WO | WO 03/047272 | 6/2003 |
| WO | WO 03/063503 | 7/2003 |

OTHER PUBLICATIONS

U.S. Appl. No. 60/488,710, filed Jul. 18, 2003, Srinivasan et al.
U.S. Appl. No. 60/501,081, filed Sep. 7, 2003, Srinivasan et al.
U.S. Appl. No. 60/501,133, filed Sep. 7, 2003, Holcomb et al.
Bartkowiak et al., "Color Video Compression Based on Chrominance Vector Quantization," *7th Int'l Workshop on Systems, Signals and Image Processing, IWSSIP 2000*, Maribor 7-9 VI, pp. 107-110 (Jun. 2000).
Benzler et al., "Improving multiresolution motion compensating hybrid coding by drift reduction," *Picture Coding Symposium*, 4 pp. (Mar. 1996).
Benzler et al., "Motion and aliasing compensating prediction with quarter-pel accuracy and adaptive overlapping blocks as proposal for MPEG-4 tool evaluation—Technical description," ISO/IEC JTC1/SC29/WG11, MPEG 95/0552, 5 pp. (document marked Dec. 1995).
Benzler, "Results of core experiments P8 (Motion and Aliasing Compensating Prediction)," ISO/IEC JTC1/SC29/WG11, MPEG 97/2625, 8 pp. (document marked Oct. 1997).
Borman et al., "Block-matching Sub-pixel Motion Estimation from Noisy, Under-Sampled Frames—an Empirical Performance Evaluation," *SPIE Visual Comm. & Image Processing*, 10 pp. (Jan. 1999).
Conklin et al., "Multi-resolution Motion Estimation," *Proc. ICASSP '97*, Munich, Germany, 4 pp. (Apr. 1997).
Davis et al., "Equivalence of subpixel motion estimators based on optical flow and block matching," *Proc. IEEE Int'l Symposium on Computer Vision*, pp. 7-12 (Nov. 1995).
de Haan et al., "Sub-pixel motion estimation with 3-D recursive search block-matching," *Signal Processing: Image Comm.* 6, pp. 229-239 (Jun. 1994).
"DivX Multi Standard Video Encoder," 2 pp. (Downloaded from the World Wide Web on Jan. 24, 2006).
Ericsson, "Fixed and Adaptive Predictors for Hybrid Predictive/Transform Coding," *IEEE Transactions on Comm.*, vol. COM-33, No. 12, pp. 1291-1302 (Dec. 1985).
Flierl et al., "Multihypothesis Motion Estimation for Video Coding," *Proc. DCC*, 10 pp. (Mar. 2001).
Fogg, "Survey of Software and Hardware VLC Architectures," *SPIE*, vol. 2186, pp. 29-37 (Feb. 9-10, 1994).
Girod, "Efficiency Analysis of Multihypothesis Motion-Compensated Prediction for Video Coding," *IEEE Transactions on Image Processing*, vol. 9, No. 2, pp. 173-183 (Feb. 2000).
Girod, "Motion-Compensating Prediction with Fractional-Pel Accuracy," *IEEE Transactions on Comm.*, vol. 41, No. 4, pp. 604-612 (Apr. 1993).
Girod, "Motion Compensation: Visual Aspects, Accuracy, and Fundamental Limits," *Motion Analysis and Image Sequence Processing*, Kluwer Academic Publishers, pp. 125-152 (Mar. 1993).
Horn et al., "Estimation of Motion Vector Fields for Multiscale Motion Compensation," *Proc. Picture Coding Symp. (PCS 97)*, pp. 141-144 (Sep. 1997).
Hsu et al., "A Low Bit-Rate Video Codec Based on Two-Dimensional Mesh Motion Compensation with Adaptive Interpolation," *IEEE Transactions on Circuits and Systems for Video Technology*, vol. II, No. 1, pp. 111-117 (Jan. 2001).
IBM Technical Disclosure Bulletin, "Advanced Motion Estimation for Moving Picture Expert Group Encoders," vol. 39, No. 4, pp. 323-324 (Apr. 1996).
ISO/IEC, "Information Technology—Coding of Audio-Visual Objects: Visual, ISO/IEC 14496-2, Committee Draft," 330 pp. (Mar. 1998).
ISO/IEC, "MPEG-4 Video Verification Model Version 10.0," ISO/IEC JTC1/SC29/WG11, MPEG98/N1992, (ed. Ebrahimi) (document marked Feb. 1998).
ISO/IEC, "ISO/IEC 11172-2, Information Technology—Coding of Moving Pictures and Associated Audio for Digital Storage Media at up to about 1.5 Mbit/s—Part 2: Video," 112 pp. (Aug. 1993).
ITU-T, "ITU-T Recommendation H.261, Video Codec for Audiovisual Services at $p$ x 64 kbits," 25 pp. (Mar. 1993).
ITU-T, "ITU-T Recommendation H.262, Information Technology—Generic Coding of Moving Pictures and Associated Audio Information: Video," 205 pp. (Jul. 1995).
ITU-T, "ITU-T Recommendation H.263 Video Coding for Low Bit Rate Communication," 167 pp. (Feb. 1998).
ITU—Q15-F-24, "MVC Video Codec—Proposal for H.26L," Study Group 16, Video Coding Experts Group (Question 15), 28 pp. (document marked as generated in Oct. 1998).
ITU-T, "H.26L Test Model Long Term No. 5 (TML-5) draft0," Study Group 16, Video Coding Experts Group (Question 15), Document Q15-K-59, 35 pp. (ed. Gisle Bjontegaard) (Document dated Oct. 2000).
Iwahashi et al., "A Motion Compensation Technique for Downscaled Pictures in Layered Coding," *IEICE Transactions on Comm.*, vol. E77-B, No. 8, pp. 1007-1012 (Aug. 1994).
Jeong et al., "Adaptive Huffman Coding of 2-D DCT Coefficients for Image Sequence Compression," *Signal Processing: Image Communication*, vol. 7, 11 pp. (Mar. 1995).
Joint Video Team (JVT) of ISO/IEC MPEG and ITU-T VCEG, "Joint Model No. 1, Revision 1 (JM-1r1)," JVT-A003r1, Pattaya, Thailand, 80 pp. (Dec. 2001) [document marked "Generated: Jan. 18, 2002"].
Joint Video Team (JVT) of ISO/IEC MPEG and ITU-T VCEG, "Joint Committee Draft (CD)," JVT-C167, 3rd Meeting: Fairfax, Virginia, USA, 142 pp. (May 2002).
Joint Video Team (JVT) of ISO/IEC MPEG and ITU-T VCEG, "Final Joint Committee Draft of Joint Video Specification (ITU-T Recommendation H.264, ISO/IEC 14496-10 AVC," JVT-D157, 218 pp. (Aug. 2002).
Keys, "Cubic Convolution Interpolation for Digital Image Processing," *IEEE Transactions on Acoustics, Speech & Signal Processing*, vol. ASSP-29, No. 6, pp. 1153-1160 (Dec. 1981).
Konrad et al., "On Motion Modeling and Estimation for Very Low Bit Rate Video Coding," *Visual Comm. & Image Processing (VCIP '95)*, 12 pp. (May 1995).
Kossentini et al., "Predictive RD Optimized Motion Estimation for Very Low Bit-rate Video Coding," *IEEE J. on Selected Areas in Communications*, vol. 15, No. 9 pp. 1752-1763 (Dec. 1997).
Lopes et al., "Analysis of Spatial Transform Motion Estimation with Overlapped Compensation and Fractional-pixel Accuracy," *IEEE Proc. Visual Image Signal Processing*, vol. 146, No. 6, pp. 339-344 (Dec. 1999).
Microsoft Corp., "Microsoft Debuts New Windows Media Player 9 Series, Redefining Digital Media on the PC," 4 pp. (document marked Sep. 4, 2002) [Downloaded from the World Wide Web on May 14, 2004].
Mook, "Next-Gen Windows Media Player Leaks to the Web," *BetaNews*, 17 pp. (Jul. 19, 2002) [Downloaded from the World Wide Web on Aug. 8, 2003].
Morimoto et al., "Fast Electronic Digital Image Stabilization," *Proc. ICPR*, Vienna, Austria, 5 pp. (Aug. 1996).
"Overview of MPEG-2 Test Model 5," 5 pp. [Downloaded from the World Wide Web on Mar. 1, 2006].
Printouts of FTP directories from http://ftp3.itu.ch, 8 pp. (downloaded from the World Wide Web on Sep. 20, 2005).
Reader, "History of MPEG Video Compression—Ver. 4.0," 99 pp. (document marked Dec. 16, 2003).
Ribas-Corbera et al., "On the Optimal Block Size for Block-based Motion-Compensated Video Coders," *SPIE Proc. of Visual Comm. & Image Processing*, vol. 3024, 12 pp. (Jan. 1997).
Ribas-Corbera et al., "On the Optimal Motion Vector Accuracy for Block-based Motion-Compensated Video Coders," *Proc. SPIE Digital Video Compression*, San Jose, CA, 13 pp. (Mar. 1996).

(56) References Cited

OTHER PUBLICATIONS

Schultz et al., "Subpixel Motion Estimation for Super-Resolution Image Sequence Enhancement," *Journal of Visual Comm. & Image Representation*, vol. 9, No. 1, pp. 38-50 (Mar. 1998).
Sullivan et al., "The H.264/AVC Advanced Video Coding Standard: Overview and Introduction to the Fidelity Range Extensions," 21 pp. (Aug. 2004).
"The TML Project WEB-Page and Archive," (including pages of code marked "image.cpp for H.26L decoder, Copyright 1999" and "image.c"), 24 pp. [Downloaded from the World Wide Web on Jun. 1, 2005].
Tourapis et al., "Predictive Motion Vector Field Adaptive Search Technique (PMVFAST)—Enhancing Block Based Motion Estimation," *Proc. Visual Communications and Image Processing*, 10 pp. (Jan. 2001).
Triggs, "Empirical Filter Estimation for Subpixel Interpolation and Matching," *Int'l Conf. Computer Vision '01*, Vancouver, Canada, 8 pp. (Jul. 2001).
Triggs, "Optimal Filters for Subpixel Interpolation and Matching," *Int'l Conf. Computer Vision '01*, Vancouver, Canada, 10 pp. (Jul. 2001).
"Video Coding Using Wavelet Decomposition for Very Low Bit-Rate Networks," 16 pp. (month unknown, 1997).
Wang et al., "Adaptive frame/field coding for JVT Video Coding," ITU-T SG16 Q.6 JVT-B071, 24 pp. (Jan. 2002).
Wang et al., "Interlace Coding Tools for H.26L Video Coding," ITU-T SG16/Q.6 VCEG-O37, pp. 1-20 (Dec. 2001).
Wedi, "Complexity Reduced Motion Compensated Prediction with 1/8-pel Displacement Vector Resolution," ITU Study Group 16, Video Coding Experts Group (Question 6), Document VCEG-L20, 8 pp. (Document dated Dec. 2000).
Weiss et al., "Real Time Implementation of Subpixel Motion Estimation for Broadcast Applications," pp. 7/1-7/3 (Oct. 1990).
Wiegand et al., "Long-term Memory Motion Compensated Prediction," *IEEE Transactions on Circuits & Systems for Video Technology*, vol. 9, No. 1, pp. 70-84 (Feb. 1999).
Wien, "Variable Block-Size Transforms for Hybrid Video Coding," Dissertation, 182 pp. (Feb. 2004).
Wu et al., "Joint estimation of forward and backward motion vectors for interpolative prediction of video," *IEEE Transactions on Image Processing*, vol. 3, No. 5, pp. 684-687 (Sep. 1994).
Yang et al., "Very High Efficiency VLSI Chip-pair for Full Search Block Matching with Fractional Precision," *Proc. ICASSP/IEEE Int'l Conf. on Acoustics, Speech & Signal Processing*, Glasgow, pp. 2437-2440 (May 1989).
Yu et al., "Two-Dimensional Motion Vector Coding for Low Bitrate Videophone Applications," *Proc. Int'l Conf. on Image Processing*, Los Alamitos, US, pp. 414-417, *IEEE Comp. Soc. Press* (Oct. 1995).
Zhang et al., "Adaptive Field/Frame Selection for High Compression Coding," MERL TR-2003-29, 13 pp. (Jan. 2003).
Chan et al., "A Novel Predictive Global Motion Estimation for Video Coding," Proceedings of ISCAS 2002, vol. 3, pp. 5-8 (2002).
Communication dated Mar. 25, 2011, from European Patent Application No. 10009814.4, 6 pp.
Exam Report dated Dec. 22, 2011, from European Patent Application No. 04019094.4, 5 pp.
Final Rejection dated Jul. 2, 2012, from Chinese Patent Application No. 200810144049.9, 4 pp.
Hatori, *Digital Video Network*, pp. 25-29 (Dec. 2002).
Huang et al., "Hardware architecture design for variable block size motion estimation in MPEG-4 AVC/JVT/ITU-T H.264," Proc. of the 2003 Int'l Symposium on Circuits & Sys. (ISCAS '03), vol. 2, pp. 796-799 (May 2003).
ISO/IEC, "Draft Text of Final Draft International Standard for Advanced Video Coding (ITU-T Rec. H.264 | ISO/IEC 14496-10 AVC)," ISO/IEC JTC 1/SC 29/WG 11 N5555, 242 pp. (Mar. 2003).
ISO/IEC, "ISO/IEC CD 13818-2: Information technology—Generic coding of moving pictures and associated audio information—Part 2: video," ISO/IEC JTC1/SC29 N659, 189 pp. (Dec. 1993).
ISO/IEC, "Text of Committee Draft of Joint Video Specification (ITU-T Rec. H.264 | ISO/IEC 14496-10 AVC," ISO/IEC JTC1/SC29/WG11 MPEG02/N4810, 143 pp. (May 2002).
ISO/IEC, "MPEG-4 Video Verification Model Version 7.1," ISO/IEC JTC1/SC29/WG11 MPEG97/M2249, 204 pp. (Ed. Ebrahimi) (Stockholm, Jul. 13, 1997).
ISO/IEC, "Draft of 14496-2 Third Edition, Information Technology—Coding of Audio-Visual Objects—Part 2: Visual," ISO/IEC JTC 1/SC 29/WG 11 M9477, 590 pp. (Pattaya, Mar. 3, 2003).
ITU-T, "Adaptive Field/Frame Block Coding Experiment Proposal," Study Group 16, Video Coding Experts Group (VCEG), VCEG-N76, Santa Barbara Meeting, Sep. 24-27, 2001, 8 pages.
ITU (Borgwardt), "Core Experiment on Interlaced Video Coding," Study Group 16, Question 6, Video Coding Experts Group (VCEG), VCEG-N85r1, 14th Meeting: Santa Barbara, California, Sep. 24-27, 2001, 10 pages.
Jang et al., "MPEG-4 Version 2 Visual Working Draft Rev 5.1," ISO/IEC JTC1/SC29 WG11 M4257, 462 pp. (Dec. 1998).
Joint Video Team (JVT) of ISO/IEC MPEG & ITU-T VCEG (Tourapis), Direct Prediction for Predictive (P) and Bidirectionally Predictive (B) frames in Video Coding, JVT-C128 (ISO/IEC JTC1/SC29/WG11 and ITU-T SG16 Q.6), 3rd Meeting: Fairfax, Virginia, USA, 12 pages, May 6-10, 2002.
Joint Video Team (JVT) of ISO/IEC MPEG & ITU-T VCEG (Borgwardt), "Core Experiment on Macroblock Adaptive Frame/Field Encoding," JVT-B117 (ISO/IEC JTC1/SC29/WG11 and ITU-T SG16 Q.6), 2nd Meeting: Geneva, Switzerland, Jan. 29-Feb. 1, 2002, 8 pages.
Joint Video Team (JVT) of ISO/IEC MPEG & ITU-T VCEG (Tourapis), "Timestamp Independent Motion Vector Prediction for P and B frames with Division Elimination," JVT-D040 (ISO/IEC JTC1/SC29/WG11 and ITU-T SG16 Q.6), 4th Meeting: Klagenfurt, Austria, Jul. 22-26, 2002, 18 pages.
Joint Video Team (JVT) of ISO/IEC MPEG & ITU-T VCEG (Kondo), "Memory Reduction for Temporal Technique of Direct Mode," JVT-E076 (ISO/IEC JTC1/SC29/WG11 and ITU-T SG16 Q.6), 5th Meeting: Geneva, Switzerland, Oct. 9-17, 2002, 12 pages.
Kuroda et al., A study of motion vectors on chrominance, Proc. of the 2002 Engineering Sciences Society Conference on IEICE, p. 119 (Aug. 2002).
Miki, "All of MPEG-4," pp. 44-46, Kogyo Chosakai Publishing, Inc. (Sep. 1998).
Miki ed., "All of MPEG-4," 1st Ed., pp. 61-76, Kogyo Chosakai Publishing, Inc. (Sep. 30, 1998).
Nakagawa et al., "Chroma Vector Adjustment for H.264/MPEG-4 AVC in Field Coding Mode," 2003 Proceedings of the IEICE general conference, separate volume: information/system 2, p. 10, the Institute of Electronics, Information and Communication Engineers (IEICE), issued on Mar. 3, 2003.
Notice of Allowance dated Feb. 25, 2011, from Japanese Patent Application No. 2004-259053, 6 pp.
Notice on Grant of Patent Right for Invention dated Sep. 4, 2009, from Chinese Patent Application No. 200410077192.2, 4 pp.
Notice of Preliminary Rejection from Korean Patent Application No. 10-2004-70790, 1p.
Notice of Rejection dated Feb. 22, 2008, from Japanese Patent Application No. 2004-259053 (including translation), 6 pp.
Notice of Rejection dated Jun. 2, 2009, from Japanese Patent Application No. 2004-259053 (including translation), 9 pp.
Notice of Rejection dated Sep. 10, 2010, from Japanese Patent Application No. 2004-259053 (including translation), 4 pp.
Notice of Rejection dated Nov. 8, 2011, from Japanese Patent Application No. 2008-212238, 4 pp.
Notice of Rejection dated May 25, 2012, from Japanese Patent Application No. 2008-212238, 5 pp.
Notice on Office Action dated Jun. 30, 2006, from Chinese Patent Application No. 200410077192.2, 7 pp.
Notice on the Second Office Action dated Dec. 31, 2011, from Chinese Patent Application No. 200810144049.9, 8 pp.
Notice on the First Office Action dated Jun. 23, 2010, from Chinese Patent Application No. 200810144049.9, 9 pp.

(56) References Cited

OTHER PUBLICATIONS

Odaka et al., "A motion compensated prediction method for interlaced image 'Dual-prime'," Information Processing Society of Japan (IPSJ) Technical Report, vol. 94, No. 53 (94-AVM-5), pp. 17-24, Jun. 24, 1994.

Official Communication dated Nov. 24, 2005, from European Patent Application No. EP 04019094, 7 pp.

Official Notice of Final Rejection dated Mar. 30, 2010, from Japanese Patent Application No. 2004-259053 (including translation), 5 pp.

Ono et al., Basic Technologies on International Image Coding Standards, pp. 268-275 (Mar. 1998).

Ono et al., "Easy-to-understand method for achieving JPEG/MPEG2," pp. 122, 123, and 134-143 (Jul. 15, 1995).

Ono et al., "A Basic Technology of International Standard Image Encoding," First Edition, Corona Publishing Col, Ltd., pp. 227-230, Mar. 20, 1998.

Ono et al., "A Basic Technology of International Standard Image Encoding," First Edition, Corona Publishing Col, Ltd., pp. 293-300, Mar. 20, 1998.

Ono et al., "A Basic Technology of International Standard Image Encoding," First Edition, Corona Publishing Col, Ltd., pp. 253-254, Mar. 20, 1998.

Search Report dated Feb. 17, 2005, from European Patent Application No. EP 04019094, 4 pp.

Search Report dated Dec. 23, 2010, from European Patent Application No. EP 10009814.4, 4 pp.

Second Office Action dated Mar. 21, 2008, from Chinese Patent Application No. 200410077192.2, 9 pp.

Srinivasan et al., "Windows Media Video 9: overview and applications," *Signal Processing: Image Communication*, vol. 19, No. 9, pp. 851-875 (Oct. 2004).

Suhring et al., "JM2.1 video coding reference software, extract from source code module lencod.c," <http://iphome.hhi.de/suehring/tml/download/old_jm/jm21.zip>, May 27, 2002, 8 pages.

Sun et al., "Improved TML Loop Filter with Lower Complexity," ITU-T VCEG-N17, 8 pp. (Aug. 2001).

Third Office Action dated Mar. 20, 2009, from Chinese Patent Application No. 200410077192.2, 14 pp.

Yang et al., "A Controllable Predictive Cross-Diamond Fast Search Algorithm for Block Matching Motion Estimation," Proceedings of PDCAT' 2003, pp. 821-824, Aug. 2003.

Yasuda et al., "Information Compression Technique for Digital Broadcasting and the Internet," 1st ed., pp. 210-219, Kyoritsu Shuppan Co., Ltd. (Jun. 10, 1999).

Yasuda et al., "Information Compression Technique for Digital Broadcasting and the Internet," 1st ed., pp. 298-308, Kyoritsu Shuppan Co., Ltd. (Jun. 10, 1999).

Yasuda ed., "MPEC/International Standard of Multi-Media Coding," 1st ed., pp. 40-48, Maruzen Co., Ltd. (Sep. 30, 1994).

* cited by examiner

Figure 1, prior art
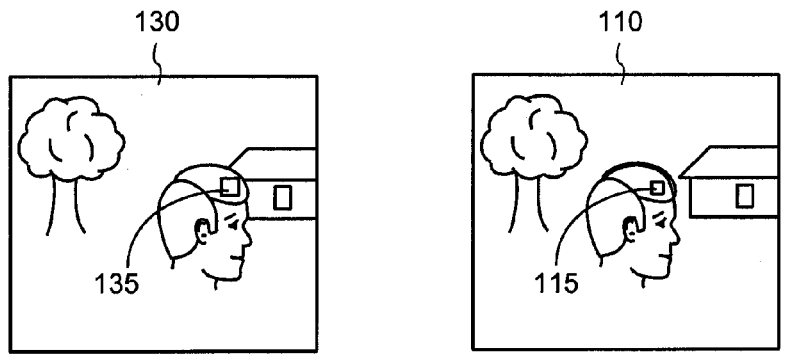
Figure 4, prior art
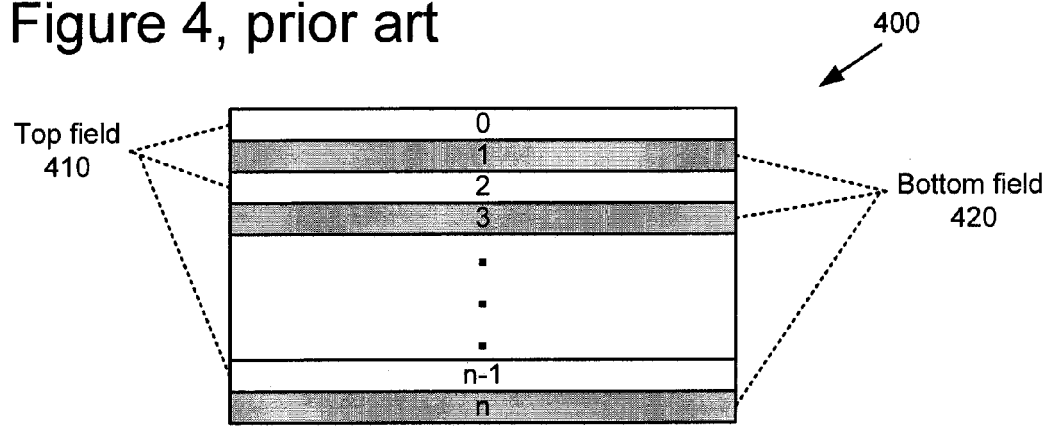
Figure 5, prior art
| Predictor A (compute average if field-coded) | Predictor B (compute average if field-coded) |
|---|---|
| Predictor C (compute average if field-coded) | Current macroblock |

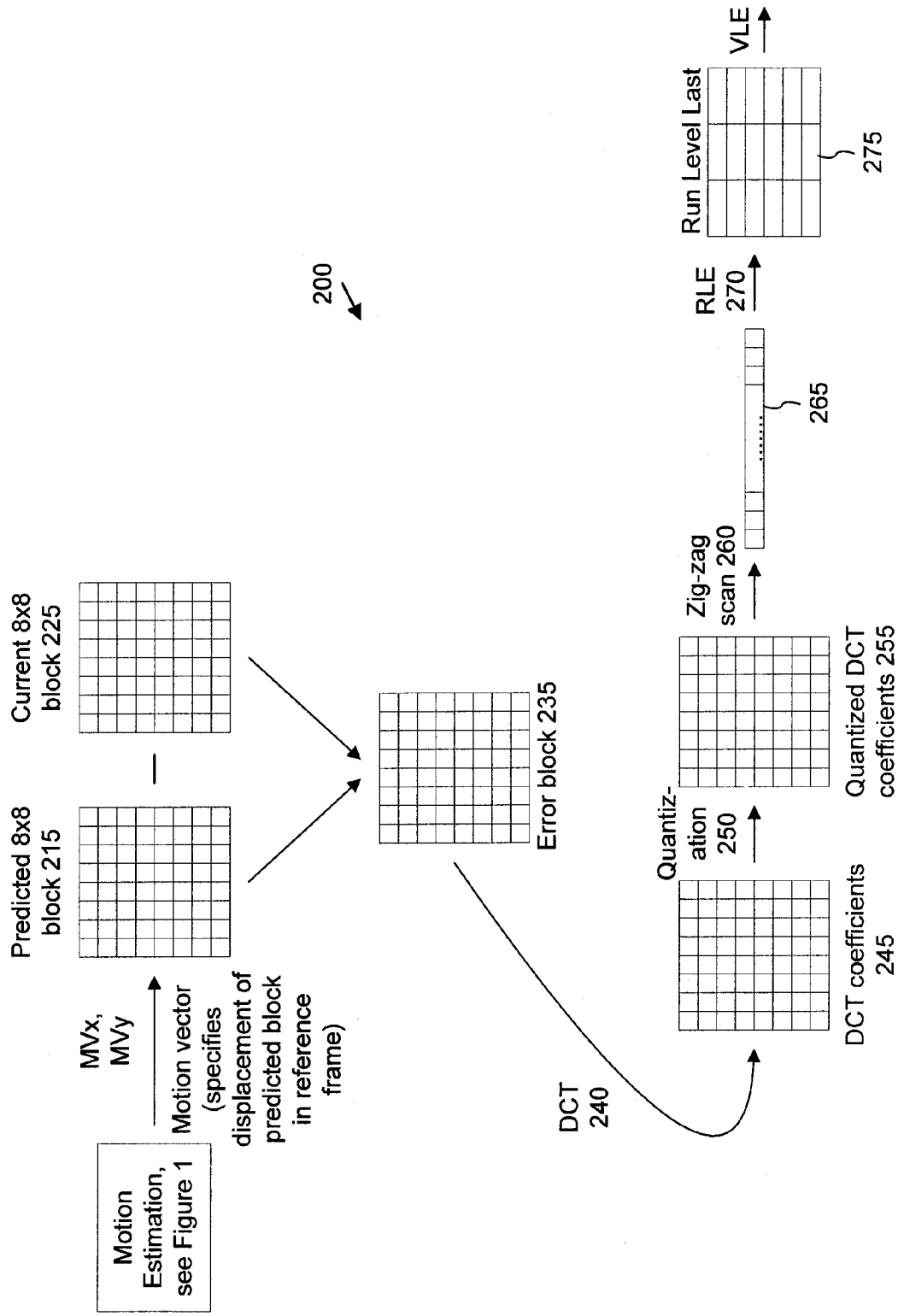

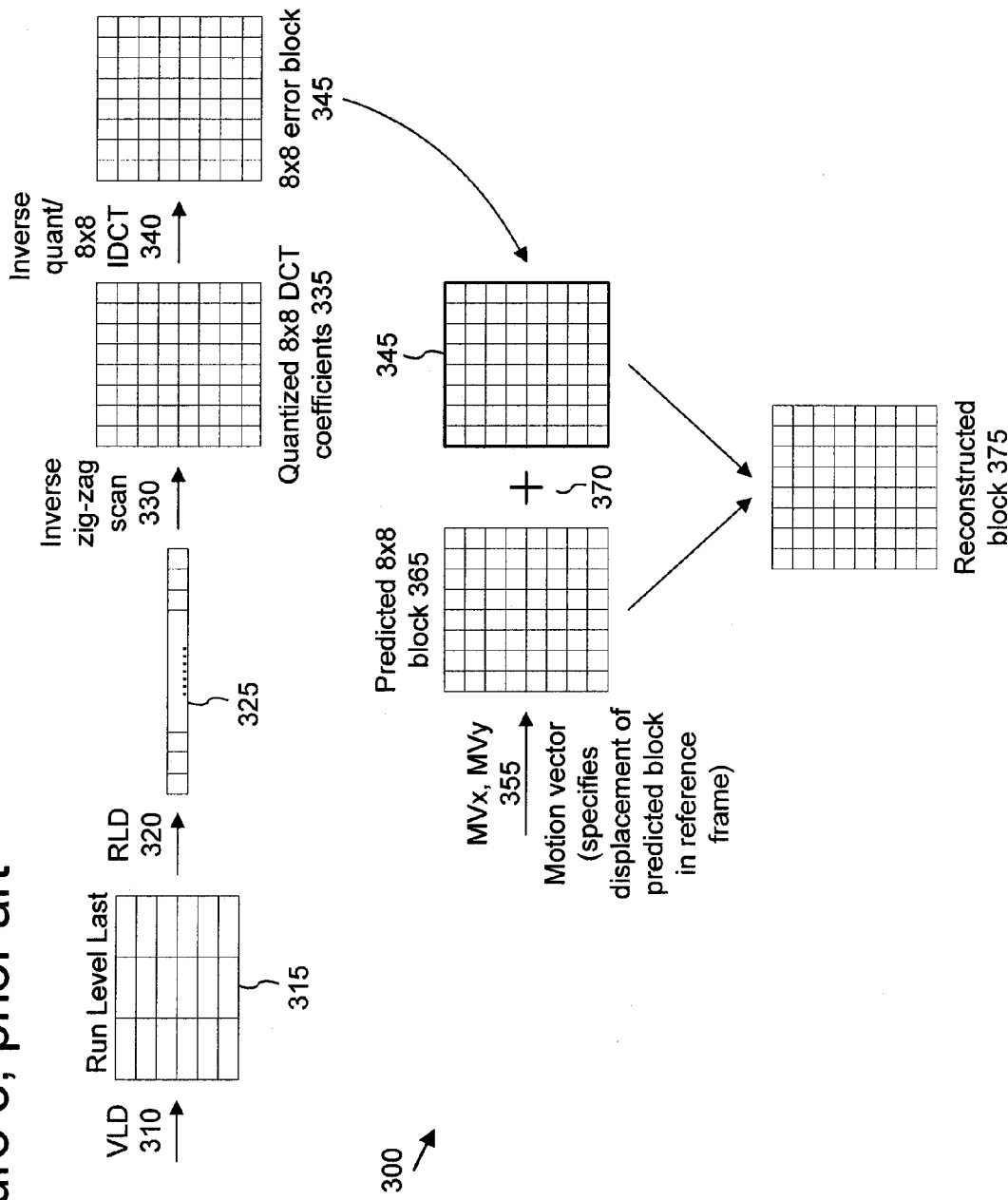
Figure 3, prior art

Figure 6, prior art
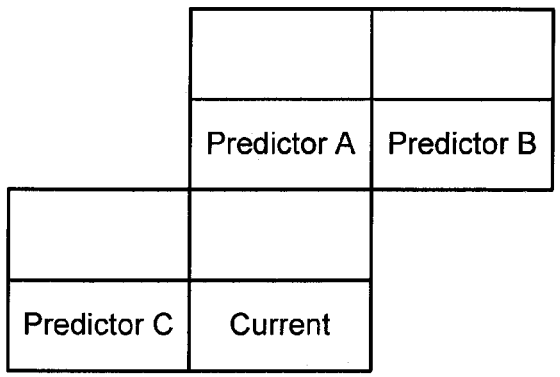
Figure 7, prior art
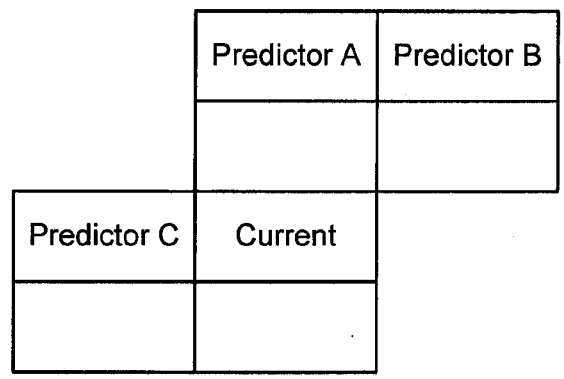
Figure 8
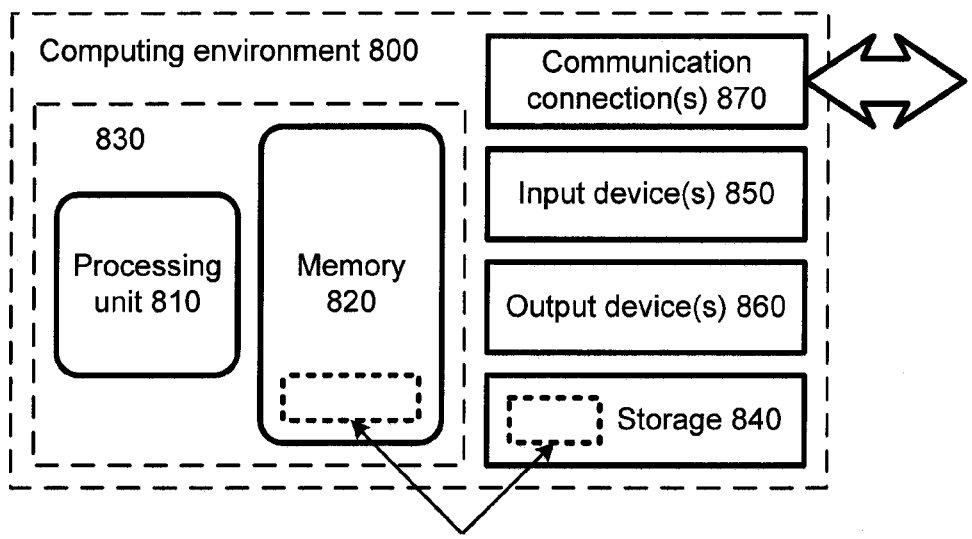
Software 880 implementing video encoder or decoder with two-reference field motion vector prediction for interlaced P-fields

```
Median3 (a, b, c) {
    if (a > b) {
        if (b > c)
            median = b
        else if (a > c)
            median = c
        else
            median = a
    }
    else if (a > c)
        median = a
    else if (b > c)
        median = c
    else median = b
    return median
}
```

```
Median4 (a, b, c, d) {
    max = min = a
        if (b > max)
            max = b
        else if (b < min)
            min = b
        if (c > max)
            max = c
        else if (c < min)
            min = c
        if (d > max)
            max = d
        else if (d < min)
            min = d median = (a + b + c + d - max - min / 2
    return median
}
```

Figure 20A

```
if (predictorA is not out of bounds) {
    if (predictorC is not out of bounds) {
        if (predictorA is intra) {
            predictorA_x = 0
            predictorA_y = 0
        }
        if (predictorB is intra) {
            predictorB_x = 0
            predictorB_y = 0
        }
        if (predictorC is intra) {
            predictorC_x = 0
            predictorC_y = 0
        }
        if (predictorA is from same field) {
            samecount = samecount + 1
            samefieldpredA_x = predictorA_x
            samefieldpredA_y = predictorA_y
            oppositefieldpredA_x = scaleforopposite_x(predictorA_x)
            oppositefieldpredA_y = scaleforopposite_y(predictorA_y)
        }
        else {
            oppositecount = oppositecount + 1
            oppositefieldpredA_x = predictorA_x
            oppositefieldpredA_y = predictorA_y
            samefieldpredA_x = scaleforsame_x(predictorA_x)
            samefieldpredA_y = scaleforsame_y(predictorA_y)
        }
        if (predictorB is from same field) {
            samecount = samecount + 1
            samefieldpredB_x = predictorB_x
            samefieldpredB_y = predictorB_y
            oppositefieldpredB_x = scaleforopposite_x(predictorB_x)
            oppositefieldpredB_y = scaleforopposite_y(predictorB_y)
        }
        else {
            oppositecount = oppositecount + 1
            oppositefieldpredB_x = predictorB_x
            oppositefieldpredB _y = predictorB_y
            samefieldpredB_x = scaleforsame_x(predictorB_x)
            samefieldpredB_y = scaleforsame_y(predictorB_y)
        }
```

```
if (predictorC is from same field) {
    samecount = samecount + 1
    samefieldpredC_x = predictorC_x
    samefieldpredC_y = predictorC_y
    oppositefieldpredC_x = scaleforopposite_x(predictorC_x)
    oppositefieldpredC_y = scaleforopposite_y(predictorC_y)
}
else {
    oppositecount = oppositecount + 1
    oppositefieldpredC_x = predictorC_x
    oppositefieldpredC _y = predictorC_y
    samefieldpredC _x = scaleforsame_x(predictorC_x)
    samefieldpredC _y = scaleforsame_y(predictorC_y)
}
samefieldpred_x =
    median (samefieldpredA_x, samefieldpredB_x, samefieldpredC_x)
samefieldpred_y =
    median (samefieldpredA_y, samefieldpredA_y, samefieldpredC_y)
oppositefieldpred_x =
    median (oppositefieldpredA_x, oppositefieldpredB_x, oppositefieldpredC_x)
oppositefieldpred_y =
    median (oppositefieldpredA_y, oppositefieldpredB_y, oppositefieldpredC_y)

if (samecount > oppositecount)
    dominantpredictor = samefield
else
    dominantpredictor = oppositefield
}
```

Figure 20C

```
else {
    // predictorC is out of bounds
    if (only 1 macroblock per row) {
        if (predictorA is intra) {
            samefieldpred_x = oppositefieldpred_x = 0
            samefieldpred_y = oppositefieldpred_y = 0
            dominantpredictor = oppositefield
        }
        else {
            // Use predictorA
            if (predictorA is from same field) {
                samefieldpred_x = predictorA_x
                samefieldpred_y = predictorA_y
                oppositefieldpred_x = scaleforopposite_x(predictorA_x)
                oppositefieldpred_y = scaleforopposite_y(predictorA_y)
                dominantpredictor = samefield
            }
            else {
                oppositefieldpred_x = predictorA_x
                oppositefieldpred_y = predictorA_y
                samefieldpred_x = scaleforsame_x(predictorA_x)
                samefieldpred_y = scaleforsame_y(predictorA_y)
                dominantpredictor = oppositefield
            }
        }
    }
}
```

```
else {
   // PredictorC is out of bounds, use PredictorA and PredictorB
   predictorC_x = 0
   predictorC_y = 0
   if (predictorA is intra) {
      predictorA_x = 0
      predictorA_y = 0
   }
   if (predictorB is intra) {
      predictorB_x = 0
      predictorB_y = 0
   }
   if (predictorC is intra) {
      predictorC_x = 0
      predictorC_y = 0
   }
   if (predictorA is from same field) {
      samecount = samecount + 1
      samefieldpredA_x = predictorA_x
      samefieldpredA_y = predictorA_y
      oppositefieldpredA_x = scaleforopposite_x(predictorA_x)
      oppositefieldpredA_y = scaleforopposite_y(predictorA_y)
   }
   else {
      oppositecount = oppositecount + 1
      oppositefieldpredA_x = predictorA_x
      oppositefieldpredA _y = predictorA_y
      samefieldpredA_x = scaleforsame_x(predictorA_x)
      samefieldpredA_y = scaleforsame_y(predictorA_y)
   }
```

```
if (predictorB is from same field) {
    samecount  = samecount + 1
    samefieldpredB_x = predictorB_x
    samefieldpredB_y = predictorB_y
    oppositefieldpredB_x = scaleforopposite_x(predictorB_x)
    oppositefieldpredB_y = scaleforopposite_y(predictorB_y)
}
else {
    oppositecount = oppositecount + 1
    oppositefieldpredB_x = predictorB_x
    oppositefieldpredB_y = predictorB_y
    samefieldpredB_x = scaleforsame_x(predictorB_x)
    samefieldpredB_y = scaleforsame_y(predictorB_y)
}
samefieldpred_x =
    median (samefieldpredA_x, samefieldpredB_x, 0)
samefieldpred_y =
    median (samefieldpredA_y, samefieldpredA_y, 0)
oppositefieldpred_x =
    median (oppositefieldpredA_x, oppositefieldpredB_x, 0)
oppositefieldpred_y =
    median (oppositefieldpredA_y, oppositefieldpredB_y, 0)
if (samecount > oppositecount)
    dominantpredictor = samefield
else
    dominantpredictor = oppositefield
        }
    }
}
```

Figure 20F

```
else {
    // Predictor A is out of bounds
    if (predictorC is out of bounds) {
        samefieldpred_x = oppositefieldpred_x = 0
        samefieldpred_y = oppositefieldpred_y = 0
        dominantpredictor = oppositefield
    }
    else {
        // Use predictorC
        if (predictorC is from same field) {
            samefieldpred_x = predictorC_x
            samefieldpred_y = predictorC_y
            oppositefieldpred_x = scaleforopposite_x(predictorC_x)
            oppositefieldpred_y = scaleforopposite_y(predictorC_y)
            dominantpredictor = samefield
        }
        else {
            oppositefieldpred_x = predictorC_x
            oppositefieldpred_y = predictorC_y
            samefieldpred_x = scaleforsame_x(predictorC_x)
            samefieldpred_y = scaleforsame_y(predictorC_y)
            dominantpredictor = oppositefield
        }
    }
}
```

Figure 21A

```
scaleforopposite_x (n) {
        int scaledvalue
        scaledvalue = (n * SCALEOPP) >> 8
        return scaledvalue
} scaleforopposite_y (n) {
        int scaledvalue
        if (current field is top)
                scaledvalue = ((n * SCALEOPP) >> 8) - 2
        else  //current field is bottom
                scaledvalue = ((n * SCALEOPP) >> 8) + 2
        return scaledvalue
}
```

```
scaleforsame_x (n) {
  if (abs (n) < SCALEZONE1_X)
    scaledvalue = (n * SCALESAME1) >> 8
  else {
    if (n < 0)
        scaledvalue = ((n * SCALESAME2) >> 8) - ZONE1OFFSET_X
    else
        scaledvalue = ((n * SCALESAME2) >> 8) + ZONE1OFFSET_X
  }
  return scaledvalue
} scaleforsame_y (n) {
  if (current field is top) {
   if (abs (n) < SCALEZONE1_Y)
     scaledvalue = ((n + 2) * SCALESAME1) >> 8
   else {
     if (n < 0)
         scaledvalue = (((n + 2) * SCALESAME2) >> 8) - ZONE1OFFSET_Y
     else
         scaledvalue = (((n + 2) * SCALESAME2) >> 8) + ZONE1OFFSET_Y
   }
  }
    else { //current field is bottom
      if (abs (n) < SCALEZONE1_Y)
         scaledvalue = ((n - 2) * SCALESAME1) >> 8
      else {
        if (n < 0)
           scaledvalue = (((n - 2) * SCALESAME2) >> 8) - ZONE1OFFSET_Y
        else
           scaledvalue = (((n - 2) * SCALESAME2) >> 8) + ZONE1OFFSET_Y
      }
   }
     return scaledvalue
  }
```

Figure 22

| | Reference Frame Distance | | | |
|---|---|---|---|---|
| | 1 | 2 | 3 | 4 or greater |
| SCALEOPP | 128 | 192 | 213 | 224 |
| SCALESAME1 | 512 | 341 | 307 | 293 |
| SCALESAME2 | 219 | 236 | 242 | 245 |
| SCALEZONE1_X | 32 * N | 48 * N | 53 * N | 56 * N |
| SCALEZONE1_Y | 8 * N | 12 * N | 13 * N | 14 * N |
| ZONE1OFFSET_X | 37 * N | 20 * N | 14 * N | 11 * N |
| ZONE1OFFSET_Y | 10 * N | 5 * N | 4 * N | 3 * N |

Figure 23

| | Reference Frame Distance | | | |
|---|---|---|---|---|
| | 1 | 2 | 3 | 4 or greater |
| SCALEOPP | 128 | 64 | 43 | 32 |
| SCALESAME1 | 512 | 1024 | 1536 | 2048 |
| SCALESAME2 | 219 | 204 | 200 | 198 |
| SCALEZONE1_X | 32 * N | 16 * N | 11 * N | 8 * N |
| SCALEZONE1_Y | 8 * N | 4 * N | 3 * N | 2 * N |
| ZONE1OFFSET_X | 37 * N | 52 * N | 56 * N | 11 * N |
| ZONE1OFFSET_Y | 10 * N | 5 * N | 4 * N | 3 * N |

Macroblock Layer Interlace P-field Bitstream Syntax 2600

```
offset_table1[9] = {0, 1, 2, 4, 8, 16, 32, 64, 128,}
offset_table2[9] = {0, 1, 3, 7, 15, 31, 63, 127, 255}
index = vlc_decode()        // Use the Huffman table indicated by MVTAB in
the picture layer
if (index == 71)
{
        dmv_x = get_bits(k_x)
        dmv_y = get_bits(k_y)
}
else
{
    if (extend_x == 1)
      offset_table = offset_table2
    else
      offset_table = offset_table1
index1 = (index + 1) % 9
    if (index1 != 0)
    {
      val = get_bits (index1 + extend_x)
      sign = 0 - (val & 1)
      dmv_x = sign ^ ((val >> 1) + offset_table[index1])
      dmv_x = dmv_x - sign
    }
    else
      dmv_x = 0
    if (extend_y == 1)
      offset_table = offset_table2
    else
      offset_table = offset_table1
index1 = (index + 1) / 9
    if (index1 != 0)
    {
      val = get_bits (index1 + extend_y)
      sign = 0 - (val & 1)
      dmv_y = sign ^ ((val >> 1) + offset_table[index1])
      dmv_y = dmv_y - sign
    }
    else
      dmv_y = 0
}
```

```
offset_table[9] = {0, 1, 2, 4, 8, 16, 32, 64, 128}
index = vlc_decode()      // Use the Huffman table indicated by MVTAB in
the picture layer
if (index == 0) {
        dmv_x = 1 - 2 * get_bits(1)
        dmv_y = 0
}
if (index == 125)
{
        dmv_x = get_bits(k_x - halfpel_flag)
        dmv_y = get_bits(k_y - halfpel_flag)
}
else
{
index1 = (index + 1) % 9
    val = get_bits (index1)
    sign = 0 - (val & 1)
    dmv_x = sign ^ ((val >> 1) + offset_table[index1])
    dmv_x = dmv_x - sign index1 = (index + 1) / 9
    val = get_bits (index1)
    sign = 0 - (val & 1)
    dmv_y = sign ^ ((val >> 1) + offset_table[index1])
    dmv_y = dmv_y - sign
}
```

Figure 28A

```
size_table[16] = {0, 0, 1, 1, 2, 2, 3, 3, 4, 4, 5, 5, 6, 6, 7, 7}
offset_table1[9] = {0, 1, 2, 4, 8, 16, 32, 64, 128}
offset_table2[9] = {0, 1, 3, 7, 15, 31, 63, 127, 255}
index = vlc_decode()  // Use the Huffman table indicated by MVTAB
if (index == 125)
{
        dmv_x = get_bits(k_x)
        dmv_y = get_bits(k_y)
        predictor_flag = dmv_y & 1
        dmv_y = dmv_y >> 1
}
else
{
    if (extend_x == 1)
        offset_table = offset_table2
    else
        offset_table = offset_table1
    index1 = (index + 1) % 9
    if (index1 != 0)
    {
      val = get_bits (index1 + extend_x)
      sign = 0 - (val & 1)
      dmv_x = sign ^ ((val >> 1) + offset_table[index1])
      dmv_x = dmv_x - sign
    }
    else
      dmv_x = 0
    if (extend_y == 1)
        offset_table = offset_table2
    else
        offset_table = offset_table1
    index1 = (index + 1) / 9
    if (index1 != 0)
    {
      val = get_bits (size_table[index1 + 2 * extend_y])
      sign = 0 - (val & 1)
      dmv_y = sign ^ ((val >> 1) + offset_table[index1 >> 1])
      dmv_y = dmv_y - sign
      predictor_flag = index1 & 1
    }
    else
    {
      dmv_y = 0
      predictor_flag = 0
    }
}
```

```
size_table[14] = {0, 0, 1, 1, 2, 2, 3, 3, 4, 4, 5, 5, 6, 6}
offset_table[9] = {0, 1, 2, 4, 8, 16, 32, 64, 128}
index = vlc_decode()     // Use the Huffman table indicated by MVTAB in
the picture layer
if (index == 0) {
        dmv_x = 1 - 2 * get_bits(1)
        dmv_y = 0
        predictor_flag = 0
}
if (index == 125)
{
        dmv_x = get_bits(k_x - halfpel_flag)
        dmv_y = get_bits(k_y - halfpel_flag)
        predictor_flag = dmv_y & 1
        dmv_y = dmv_y >> 1
}
else
{
index1 = (index + 1) % 9
    val = get_bits (index1)
    sign = 0 - (val & 1)
    dmv_x = sign ^ ((val >> 1) + offset_table[index1])
    dmv_x = dmv_x - sign index1 = (index + 1) / 9
    val = get_bits (size_table[index1])
    sign = 0 - (val & 1)
    dmv_y = sign ^ ((val >> 1) + offset_table[index1])
    dmv_y = dmv_y - sign
    predictor_flag = index1 & 1
}
```

Figure 35A

```
samecount = 0;
oppositecount = 0;
if (predictorA is not out of bounds) {
   if (predictorC is not out of bounds) {
      if (predictorA is intra) {
         samefieldpred_x = oppositefieldpred_x = samefieldpredA_x = oppositefieldpredA_x = 0
         samefieldpred_y = oppositefieldpred_y = samefieldpredA_y = oppositefieldpredA_y = 0
      }
      if (predictorB is intra) {
         samefieldpred_x = oppositefieldpred_x = samefieldpredB_x = oppositefieldpredB_x = 0
         samefieldpred_y = oppositefieldpred_y = samefieldpredB_y = oppositefieldpredB_y = 0
      }
      if (predictorC is intra) {
         samefieldpred_x = oppositefieldpred_x = samefieldpredC_x = oppositefieldpredC_x = 0
         samefieldpred_x = oppositefieldpred_x = samefieldpredC_y = oppositefieldpredC_y = 0
      }
      if (predictorA is not intra) {
         if (predictorA is from same field) {
            samecount = samecount + 1
            samefieldpred_x  = samefieldpredA_x = predictorA_x
            samefieldpred_y  = samefieldpredA_y = predictorA_y
            oppositefieldpred_x = oppositefieldpredA_x = scaleforopposite_x(predictorA_x)
            oppositefieldpred_y = oppositefieldpredA_y = scaleforopposite_y(predictorA_y)
         }
         else {
            oppositecount = oppositecount + 1
            oppositefieldpred_x  = oppositefieldpredA_x = predictorA_x
            oppositefieldpred_y  = oppositefieldpredA_y = predictorA_y
            samefieldpred_x = samefieldpredA_x = scaleforsame_x(predictorA_x)
            samefieldpred_y = samefieldpredA_y = scaleforsame_y(predictorA_y)
         }
      }
      if (predictorB is not intra) {
         If (predictorB is from same field) {
            samecount = samecount + 1
            samefieldpred_x = samefieldpredB_x = predictorB_x
            samefieldpred_y = samefieldpredB_y = predictorB_y
            oppositefieldpred_x = oppositefieldpredB_x = scaleforopposite_x(predictorB_x)
            oppositefieldpred_y = oppositefieldpredB_y = scaleforopposite_y(predictorB_y)
         }
         else {
            oppositecount  = oppositecount + 1
            oppositefieldpred_x = oppositefieldpredB_x = predictorB_x
            oppositefieldpred_y = oppositefieldpredB _y = predictorB_y
            samefieldpred_x = samefieldpredB_x = scaleforsame_x(predictorB_x)
            samefieldpred_y = samefieldpredB_y = scaleforsame_y(predictorB_y)
         }
      }
   }
```

```
if (predictorC is not intra) {
    if (predictorC is from same field) {
        samecount = samecount + 1
        samefieldpred_x = samefieldpredC_x = predictorC_x
        samefieldpred_y = samefieldpredC_y = predictorC_y
        oppositefieldpred_x = oppositefieldpredC_x = scaleforopposite_x(predictorC_x)
        oppositefieldpred_y = oppositefieldpredC_y = scaleforopposite_y(predictorC_y)
    }
    else {
        oppositecount = oppositecount + 1
        oppositefieldpred_x = oppositefieldpredC_x = predictorC_x
        oppositefieldpred_y = oppositefieldpredC _y = predictorC_y
        samefieldpred_x = samefieldpredC _x = scaleforsame_x(predictorC_x)
        samefieldpred_y = samefieldpredC _y = scaleforsame_y(predictorC_y)
    }
}
if ((samecount + oppositecount) > 1) {
    samefieldpred_x =
        median (samefieldpredA_x, samefieldpredB_x, samefieldpredC_x)
    samefieldpred_y =
        median (samefieldpredA_y, samefieldpredA_y, samefieldpredC_y)
    oppositefieldpred_x =
        median (oppositefieldpredA_x, oppositefieldpredB_x, oppositefieldpredC_x)
    oppositefieldpred_y =
        median (oppositefieldpredA_y, oppositefieldpredB_y, oppositefieldpredC_y)
} if (samecount > oppositecount)
    dominantpredictor = samefield
else
    dominantpredictor = oppositefield
}
```

Figure 35C

```
else {
    // predictorC is out of bounds
    if (only 1 macroblock per row) {
        if (predictorA is intra) {
            samefieldpred_x = oppositefieldpred_x = 0
            samefieldpred_y = oppositefieldpred_y = 0
            dominantpredictor = oppositefield
        }
        else {
            // Use predictorA
            if (predictorA is from same field) {
                samefieldpred_x = predictorA_x
                samefieldpred_y = predictorA_y
                oppositefieldpred_x = scaleforopposite_x(predictorA_x)
                oppositefieldpred_y = scaleforopposite_y(predictorA_y)
                dominantpredictor = samefield
            }
            else {
                oppositefieldpred_x = predictorA_x
                oppositefieldpred_y = predictorA_y
                samefieldpred_x = scaleforsame_x(predictorA_x)
                samefieldpred_y = scaleforsame_y(predictorA_y)
                dominantpredictor = oppositefield
            }
        }
    }
}
```

```
else {
    // Predictor C is out of bounds, use Predictor and PredictorB
    predictorC_x = 0
    predictorC_y = 0
    if (predictorA is intra) {
        samefieldpred_x = oppositefieldpred_x = samefieldpredA_x = oppositefieldpredA_x = 0
        samefieldpred_y = oppositefieldpred_y = samefieldpredA_y = oppositefieldpredA_y = 0
    }
    if (predictorB is intra) {
        samefieldpred_x = oppositefieldpred_x = samefieldpredB_x = oppositefieldpredB_x = 0
        samefieldpred_y = oppositefieldpred_y = samefieldpredB_y = oppositefieldpredB_y = 0
    }
    if (predictorC is intra) {
        samefieldpred_x = oppositefieldpred_x = samefieldpredC_x = oppositefieldpredC_x = 0
        samefieldpred_x = oppositefieldpred_x = samefieldpredC_y = oppositefieldpredC_y = 0
    }
    if (predictorA is not intra) {
        if (predictorA is from same field) {
            samecount = samecount + 1
            samefieldpred_x = samefieldpredA_x = predictorA_x
            samefieldpred_y = samefieldpredA_y = predictorA_y
            oppositefieldpred_x = oppositefieldpredA_x = scaleforopposite_x(predictorA_x)
            oppositefieldpred_y = oppositefieldpredA_y = scaleforopposite_y(predictorA_y)
        }
        else {
            oppositecount = oppositecount + 1
            oppositefieldpred_x = oppositefieldpredA_x = predictorA_x
            oppositefieldpred_y = oppositefieldpredA _y = predictorA_y
            samefieldpred_x = samefieldpredA_x = scaleforsame_x(predictorA_x)
            samefieldpred_y = samefieldpredA_y = scaleforsame_y(predictorA_y)
        }
    }
}
```

```
if (predictorB is not intra) {
   if (predictorB is from same field) {
      samecount  = samecount + 1
      samefieldpred_x = samefieldpredB_x = predictorB_x
      samefieldpred_y = samefieldpredB_y = predictorB_y
      oppositefieldpred_x = oppositefieldpredB_x = scaleforopposite_x(predictorB_x)
      oppositefieldpred_y = oppositefieldpredB_y = scaleforopposite_y(predictorB_y)
   }
   else {
      oppositecount = oppositecount + 1
      oppositefieldpred_x = oppositefieldpredB_x = predictorB_x
      oppositefieldpred_y = oppositefieldpredB_y = predictorB_y
      samefieldpred_x = samefieldpredB_x = scaleforsame_x(predictorB_x)
      samefieldpred_y = samefieldpredB_y = scaleforsame_y(predictorB_y)
   }
}
if ((samecount + oppositecount) > 1) {
   samefieldpred_x =
      median (samefieldpredA_x, samefieldpredB_x, samefieldpredC_x)
   samefieldpred_y =
      median (samefieldpredA_y, samefieldpredA_y, samefieldpredC_y)
   oppositefieldpred_x =
       median (oppositefieldpredA_x, oppositefieldpredB_x, oppositefieldpredC_x)
   oppositefieldpred_y =
      median (oppositefieldpredA_y, oppositefieldpredB_y, oppositefieldpredC_y)
}
if (samecount > oppositecount)
   dominantpredictor = samefield
else
   dominantpredictor = oppsositefield
      }
   }
}
```

```
    else {
        // Predictor A is out of bounds
        if (predictorC is out of bounds) {
            samefieldpred_x = oppositefieldpred_x = 0
            samefieldpred_y = oppositefieldpred_y = 0
            dominantpredictor = oppositefield
        }
        else {
            // Use predictorC
            if (predictorC is from same field) {
                samefieldpred_x = predictorC_x
                samefieldpred_y = predictorC_y
                oppositefieldpred_x = scaleforopposite_x(predictorC_x)
                oppositefieldpred_y = scaleforopposite_y(predictorC_y)
                dominantpredictor = samefield
            }
            else {
                oppositefieldpred_x = predictorC_x
                oppositefieldpred_y = predictorC_y
                samefieldpred_x = scaleforsame_x(predictorC_x)
                samefieldpred_y = scaleforsame_y(predictorC_y)
                dominantpredictor = oppositefield
            }
        }
    }
```

3600

```
if (predictor_flag == 0) {
    if (dominantpredictor == samefield)
        reference is from same field as current field
    else
        reference is from opposite field as current field
}
else {
    // predictor_flag == 1
    if (dominantpredictor == samefield)
        reference is from opposite field as current field
    else
        reference is from same field as current field
}
```

PREDICTING MOTION VECTORS FOR FIELDS OF FORWARD-PREDICTED INTERLACED VIDEO FRAMES

RELATED APPLICATION INFORMATION

This application is a continuation of U.S. patent application Ser. No. 10/857,473, entitled "Predicting Motion Vectors for Fields of Forward-Predicted Interlaced Video Frames," filed May 27, 2004, which claims the benefit of U.S. Provisional Patent Application No. 60/501,081, entitled "Video Encoding and Decoding Tools and Techniques," filed Sept. 7, 2003, both of which are hereby incorporated by reference.

TECHNICAL FIELD

Techniques and tools for interlaced video coding and decoding are described. For example, a video encoder/decoder calculates motion vector predictors for fields in interlaced video frames.

BACKGROUND

Digital video consumes large amounts of storage and transmission capacity. A typical raw digital video sequence includes 15 or 30 pictures per second. Each picture can include tens or hundreds of thousands of pixels (also called pels). Each pixel represents a tiny element of the picture. In raw form, a computer commonly represents a pixel with 24 bits or more. Thus, the number of bits per second, or bit rate, of a typical raw digital video sequence can be 5 million bits/second or more.

Many computers and computer networks lack the resources to process raw digital video. For this reason, engineers use compression (also called coding or encoding) to reduce the bit rate of digital video. Compression can be lossless, in which quality of the video does not suffer but decreases in bit rate are limited by the complexity of the video. Or, compression can be lossy, in which quality of the video suffers but decreases in bit rate are more dramatic. Decompression reverses compression.

In general, video compression techniques include "intra" compression and "inter" or predictive compression. Intra compression techniques compress individual pictures, typically called I-pictures or key pictures. Inter compression techniques compress pictures with reference to preceding and/or following pictures, and are typically called predicted pictures, P-pictures, or B-pictures.

I. Inter Compression in Windows Media Video, Versions 8 and 9

Microsoft Corporation's Windows Media Video, Version 8 ["WMV8"] includes a video encoder and a video decoder. The WMV8 encoder uses intra and inter compression, and the WMV8 decoder uses intra and inter decompression. Early versions of Windows Media Video, Version 9 ["WMV9"] use a similar architecture for many operations.

Inter compression in the WMV8 encoder uses block-based motion compensated prediction coding followed by transform coding of the residual error. FIGS. 1 and 2 illustrate the block-based inter compression for a predicted frame in the WMV8 encoder. In particular, FIG. 1 illustrates motion estimation for a predicted frame 110 and FIG. 2 illustrates compression of a prediction residual for a motion-compensated block of a predicted frame.

For example, in FIG. 1, the WMV8 encoder computes a motion vector for a macroblock 115 in the predicted frame 110. To compute the motion vector, the encoder searches in a search area 135 of a reference frame 130. Within the search area 135, the encoder compares the macroblock 115 from the predicted frame 110 to various candidate macroblocks in order to find a candidate macroblock that is a good match. The encoder outputs information specifying the motion vector (entropy coded) for the matching macroblock.

Since a motion vector value is often correlated with the values of spatially surrounding motion vectors, compression of the data used to transmit the motion vector information can be achieved by selecting a motion vector predictor from neighboring macroblocks and predicting the motion vector for the current macroblock using the predictor. The encoder can encode the differential between the motion vector and the predictor. After reconstructing the motion vector by adding the differential to the predictor, a decoder uses the motion vector to compute a prediction macroblock for the macroblock 115 using information from the reference frame 130, which is a previously reconstructed frame available at the encoder and the decoder. The prediction is rarely perfect, so the encoder usually encodes blocks of pixel differences (also called the error or residual blocks) between the prediction macroblock and the macroblock 115 itself.

FIG. 2 illustrates an example of computation and encoding of an error block 235 in the WMV8 encoder. The error block 235 is the difference between the predicted block 215 and the original current block 225. The encoder applies a DCT 240 to the error block 235, resulting in an 8×8 block 245 of coefficients. The encoder then quantizes 250 the DCT coefficients, resulting in an 8×8 block of quantized DCT coefficients 255. The encoder scans 260 the 8×8 block 255 into a one-dimensional array 265 such that coefficients are generally ordered from lowest frequency to highest frequency. The encoder entropy encodes the scanned coefficients using a variation of run length coding 270. The encoder selects an entropy code from one or more run/level/last tables 275 and outputs the entropy code.

FIG. 3 shows an example of a corresponding decoding process 300 for an inter-coded block. In summary of FIG. 3, a decoder decodes (310, 320) entropy-coded information representing a prediction residual using variable length decoding 310 with one or more run/level/last tables 315 and run length decoding 320. The decoder inverse scans 330 a one-dimensional array 325 storing the entropy-decoded information into a two-dimensional block 335. The decoder inverse quantizes and inverse discrete cosine transforms (together, 340) the data, resulting in a reconstructed error block 345. In a separate motion compensation path, the decoder computes a predicted block 365 using motion vector information 355 for displacement from a reference frame. The decoder combines 370 the predicted block 365 with the reconstructed error block 345 to form the reconstructed block 375.

The amount of change between the original and reconstructed frames is the distortion and the number of bits required to code the frame indicates the rate for the frame. The amount of distortion is roughly inversely proportional to the rate.

II. Interlaced Video and Progressive Video

A typical interlaced video frame consists of two fields scanned starting at different times. For example, referring to FIG. 4, an interlaced video frame 400 includes top field 410 and bottom field 420. Typically, the even-numbered lines (top field) are scanned starting at one time (e.g., time t) and the odd-numbered lines (bottom field) are scanned starting at a different (typically later) time (e.g., time t+1). This timing can create jagged tooth-like features in regions of an interlaced video frame where motion is present because the two fields are scanned starting at different times. For this reason, interlaced video frames can be rearranged according to a field structure, with the odd lines grouped together in one field, and the even lines grouped together in another field. This arrangement, known as field coding, is useful in high-motion pictures for reduction of such jagged edge artifacts. On the other hand, in stationary regions, image detail in the interlaced video frame may be more efficiently preserved without such a rearrangement. Accordingly, frame coding is often used in stationary or low-motion interlaced video frame, in which the original alternating field line arrangement is preserved.

A typical progressive video frame consists of one frame of content with non-alternating lines. In contrast to interlaced video, progressive video does not divide video frames into separate fields, and an entire frame is scanned left to right, top to bottom starting at a single time.

III. Interlace P-frame Coding and Decoding in Early Versions of WMV9

Early versions of Windows Media Video, Version 9 ["WMV9"] use interlace P-frame coding and decoding. In these early versions of WMV9, interlaced P-frames can contain macroblocks encoded in field mode or in frame mode, or skipped macroblocks, with a decision generally made on a macroblock-by-macroblock basis. Two motion vectors are associated with each field-coded macroblock, and one motion vector is associated with each frame-coded macroblock. An encoder jointly encodes motion information for the blocks in the macroblock, including horizontal and vertical motion vector differential components, potentially along with other signaling information.

In the encoder, a motion vector is encoded by computing a differential between the motion vector and a motion vector predictor, which is computed based on neighboring motion vectors. And, in the decoder, the motion vector is reconstructed by adding the motion vector differential to the motion vector predictor, which is again computed (this time in the decoder) based on neighboring motion vectors.

FIGS. 5, 6, and 7 show examples of candidate predictors for motion vector prediction for frame-coded macroblocks and field-coded macroblocks, respectively, in interlaced P-frames in early versions of WMV9. FIG. 5 shows candidate predictors A, B and C for a current frame-coded macroblock in an interior position in an interlaced P-frame (not the first or last macroblock in a macroblock row, not in the top row). Predictors can be obtained from different candidate directions other than those labeled A, B, and C (e.g., in special cases such as when the current macroblock is the first macroblock or last macroblock in a row, or in the top row, since certain predictors are unavailable for such cases). For a current frame-coded macroblock, predictor candidates are calculated differently depending on whether the neighboring macroblocks are field-coded or frame-coded. For a neighboring frame-coded macroblock, the motion vector is simply taken as the predictor candidate. For a neighboring field-coded macroblock, the candidate motion vector is determined by averaging the top and bottom field motion vectors.

FIGS. 6 and 7 show candidate predictors A, B and C for a current field in a field-coded macroblock that is not the first or last macroblock in a macroblock row, and not in the top row. In FIG. 6, the current field is a bottom field, and the bottom field motion vectors in the neighboring macroblocks are used as candidate predictors. In FIG. 7, the current field is a top field, and the top field motion vectors are used as candidate predictors. Thus, for each field in a current field-coded macroblock, the number of motion vector predictor candidates for each field is at most three, with each candidate coming from the same field type (e.g., top or bottom) as the current field.

A predictor for the current macroblock or field of the current macroblock is selected based on the candidate predictors, and a motion vector differential is calculated based on the predictor. The motion vector can be reconstructed by adding the motion vector differential to the selected motion vector predictor at either the encoder or the decoder side. Typically, luminance motion vectors are reconstructed from the encoded motion information, and chrominance motion vectors are derived from the reconstructed luminance motion vectors.

IV. Standards for Video Compression and Decompression

Aside from WMV8 and early versions of WMV9, several international standards relate to video compression and decompression. These standards include the Motion Picture Experts Group ["MPEG"] 1, 2, and 4 standards and the H.261, H.262, H.263, and H.264 standards from the International Telecommunication Union ["ITU"]. One of the primary methods used to achieve data compression of digital video sequences in the international standards is to reduce the temporal redundancy between pictures. These popular compression schemes (MPEG-1, MPEG-2, MPEG-4, H.261, H.263, etc) use motion estimation and compensation. For example, a current frame is divided into uniform square regions (e.g., blocks and/or macroblocks). A matching region for each current region is specified by sending motion vector information for the region. The motion vector indicates the location of the region in a previously coded (and reconstructed) frame that is to be used as a predictor for the current region. A pixel-by-pixel difference, called the error signal, between the current region and the region in the reference frame is derived. This error signal usually has lower entropy than the original signal. Therefore, the information can be encoded at a lower rate. As in WMV8 and early versions of WMV9, since a motion vector value is often correlated with spatially surrounding motion vectors, compression of the data used to represent the motion vector information can be achieved by coding the differential between the current motion vector and a predictor based upon previously coded, neighboring motion vectors.

In addition, some international standards describe motion estimation and compensation in interlaced video frames. The H.262 standard allows an interlaced video frame to be encoded as a single frame or as two fields, where the frame encoding or field encoding can be adaptively selected on a frame-by-frame basis. The H.262 standard describes field-based prediction, which is a prediction mode using only one field of a reference frame. The H.262 standard also, describes dual-prime prediction, which is a prediction mode in which two forward field-based predictions are averaged for a 16×16 block in an interlaced P-picture. Section 7.6 of the H.262 standard describes "field prediction," including selecting between two reference fields to use for motion compensation for a macroblock of a current field of an interlaced video frame. Section 7.6.3 describes motion vector prediction and reconstruction, in which a reconstructed motion vector for a given macroblock becomes the motion vector predictor for a subsequently encoded/decoded macroblock. Such motion vector prediction fails to adequately predict motion vectors for macroblocks of fields of interlaced video frames in many cases.

Given the critical importance of video compression and decompression to digital video, it is not surprising that video compression and decompression are richly developed fields. Whatever the benefits of previous video compression and decompression techniques, however, they do not have the advantages of the following techniques and tools.

SUMMARY

In summary, the detailed description is directed to various techniques and tools for encoding and decoding predicted video images in interlaced video. Described techniques include those for computing motion vector predictors for block or macroblocks of fields of interlaced video frames. These techniques improve the accuracy of motion vector prediction in many cases, thereby reducing the bitrate associated with encoding motion vector information for fields of interlaced video frames. The various techniques and tools can be used in combination or independently.

In a first aspect, an encoder/decoder computes a motion vector predictor for a motion vector for a portion (e.g., a block or macroblock) of an interlaced P-field, including selecting between using a same polarity motion vector predictor or using an opposite polarity motion vector predictor for the portion. The encoder/decoder processes the motion vector based at least in part on the motion vector predictor computed for the motion vector. The processing can comprise computing a motion vector differential between the motion vector and the motion vector predictor during encoding and reconstructing the motion vector from a motion vector differential and the motion vector predictor during decoding. The selecting can be based at least in part on a count of opposite polarity motion vectors for a neighborhood around the portion and/or a count of same polarity motion vectors for the neighborhood. The selecting also can be based at least in part on a single bit signal in a bit stream. The selecting can comprise determining a dominant predictor based at least in part on a count of opposite polarity motion vectors for a neighborhood around the portion and/or a count of same polarity motion vectors for the neighborhood, and selecting the same polarity motion vector predictor or the opposite polarity motion vector predictor based upon the dominant predictor and a single bit signal in a bit stream.

The selecting also can comprise selecting the same polarity motion vector predictor if the motion vector for the portion refers to a same polarity field, or selecting the opposite polarity motion vector predictor if the motion vector for the portion refers to an opposite polarity field.

The same polarity motion vector predictor can be computed as a median of plural same polarity motion vector predictor candidates for a neighborhood around the portion, and the opposite polarity motion vector predictor can be computed as a median of plural opposite polarity motion vector predictor candidates for a neighborhood around the portion. Same polarity motion vector predictor candidates can be derived by scaling an opposite polarity motion vector predictor candidate, and opposite polarity motion vector predictor candidates can be derived by scaling a same polarity motion vector predictor candidate.

In another aspect, an encoder/decoder computes a motion vector predictor for a motion vector for a portion of an interlaced P-field based at least in part on plural neighboring motion vectors, wherein the plural neighboring motion vectors include one or more opposite polarity motion vectors and one or more same polarity motion vectors. The encoder/decoder processes the motion vector based at least in part on the motion vector predictor computed for the motion vector. A same polarity motion vector predictor can be computed as a median of plural same polarity motion vector predictor candidates, wherein at least one of the plural candidates is derived based at least in part on scaling a value from one of the one or more opposite polarity motion vectors, and an opposite polarity motion vector predictor can be computed as a median of plural opposite polarity motion vector predictor candidates, wherein at least one of the plural candidates is derived based at least in part on scaling a value from one of the one or more same polarity motion vectors.

In another aspect, an encoder/decoder processes an interlaced predicted video frame by determining a first set of motion vector predictor candidates for a macroblock in a current field in the video frame, the first set of motion vector predictor candidates referencing a first reference field having a same polarity relative to the current field. A first motion vector predictor is computed for the macroblock based at least in part on one or more of the first set of motion vector predictor candidates. A second set of motion vector predictor candidates is determined for the macroblock, the second set of motion vector predictor candidates referencing a second reference field having an opposite polarity relative to the current field. A second motion vector predictor for the macroblock is computed based at least in part on one or more of the second set of motion vector predictor candidates.

The first and second motion vector predictors are used in the processing, such as by selecting one of the first and second motion vector predictors and calculating a motion vector differential for the macroblock based on the selected motion vector predictor, and/or by selecting one of the first and second motion vector predictors and combining the selected predictor with the motion vector differential to reconstruct a motion vector for the macroblock. The motion vector differential can be entropy coded.

In another aspect, a first polarity motion vector predictor candidate is computed by scaling an actual motion vector value having a second polarity different than the first polarity. The first polarity motion vector predictor candidate is used when computing a motion vector predictor for a motion vector for a portion of an interlaced P-field. A motion vector differential can be computed between the motion vector and the motion vector predictor during encoding. The motion vector can be reconstructed from a motion vector differential and the motion vector predictor during decoding. The first polarity motion vector predictor candidate can have the opposite field polarity as the portion, wherein the actual motion vector value has the same field polarity as the portion, and wherein the scaling is adapted to scale from the same polarity to the opposite polarity. Or, the first polarity motion vector predictor candidate can have the same field polarity as the portion, wherein the actual motion vector value has the opposite field polarity as the portion, and wherein the scaling is adapted to scale from the opposite polarity to the same polarity. Scaling can be based at least in part on a reference frame distance.

In another aspect, an encoder/decoder determines a first motion vector predictor candidate for a macroblock in a current field in the video frame, the first motion vector predictor candidate having a first polarity. The encoder/decoder determines a second motion vector predictor candidate for the macroblock, wherein the second motion vector predictor candidate is derived from the first motion vector predictor candidate using a scaling operation. The second motion vector predictor candidate has a polarity different than the first polarity.

In another aspect, an encoder/decoder determines a first motion vector predictor candidate for a macroblock in a current field in the video frame, the first motion vector predictor candidate referencing a field having a first polarity and a reference distance. The encoder/decoder determines a second motion vector predictor candidate for the macroblock, wherein the second motion vector predictor candidate is derived from the first motion vector predictor candidate using a scaling operation that varies based at least in part on the reference distance. The second motion vector predictor candidate can have a polarity different than the first polarity.

In another aspect, a decoder decodes a first element at a field level in a bitstream, and a second element and third element at a macroblock level in the bitstream. The first element comprises number-of-reference-field information for a current field in the video frame, which indicates two reference fields for the current field. The second element comprises macroblock mode information for a current macroblock in the current field. The third element comprises motion vector data for the current macroblock, wherein the motion vector data includes differential motion vector data. The decoder processes the motion vector data for the macroblock. The processing comprises determining first and second motion vector predictors for the current macroblock, and reconstructing a motion vector for the current macroblock based at least in part on the first and second motion vector predictors and based at least in part on the differential motion vector data. The first motion vector predictor is an odd field predictor and the second motion vector predictor is an even field predictor.

In another aspect, a decoder decodes motion vector data that collectively signal a horizontal differential motion vector component, a vertical differential motion vector component, and flag indicating whether to use a dominant or non-dominant motion vector predictor. The decoder reconstructs a motion vector based at least in part on the decoded motion vector data. The reconstructing can comprise selecting between using the dominant motion vector predictor or the non-dominant motion vector predictor based on the flag, combining the horizontal differential motion vector component with a horizontal component of the selected predictor, and combining the vertical differential motion vector component with a horizontal component of the selected predictor.

Additional features and advantages will be made apparent from the following detailed description of different embodiments that proceeds with reference to the accompanying drawings.

BRIEF DESCRIPTION OF THE DRAWINGS

FIG. 1 is a diagram showing motion estimation in a video encoder according to the prior art.

FIG. 2 is a diagram showing block-based compression for an 8×8 block of prediction residuals in a video encoder according to the prior art.

FIG. 3 is a diagram showing block-based decompression for an 8×8 block of prediction residuals in a video encoder according to the prior art.

FIG. 4 is a diagram showing an interlaced video frame according to the prior art.

FIG. 5 is a diagram showing candidate motion vector predictors for a current frame-coded macroblock in early versions of WMV9.

FIGS. 6 and 7 are diagrams showing candidate motion vector predictors for a current field-coded macroblock in early versions of WMV9.

FIG. 8 is a block diagram of a suitable computing environment in conjunction with which several described embodiments may be implemented.

FIGS. 20A-20F are code listings showing pseudo-code for calculating motion vector predictors in two-reference interlaced P-fields.

FIGS. 21A-21B are code listings showing pseudo-code for scaling a predictor from one field to derive a predictor from another field.

FIGS. 22 and 23 are tables showing scaling operation values associated with different reference frame distances.

FIGS. 27A and 27B are code listings showing pseudo-code illustrating decoding of a motion vector differential for a one-reference interlaced P-field.

FIGS. 28A and 28B are code listings showing pseudo-code illustrating decoding of a motion vector differential and dominant/non-dominant predictor information for a two-reference interlaced P-field.

FIGS. 35A-35F are code listings showing pseudo-code for calculating motion vector predictors in two-reference interlaced P-fields in a combined implementation.

DETAILED DESCRIPTION

Figure 9:
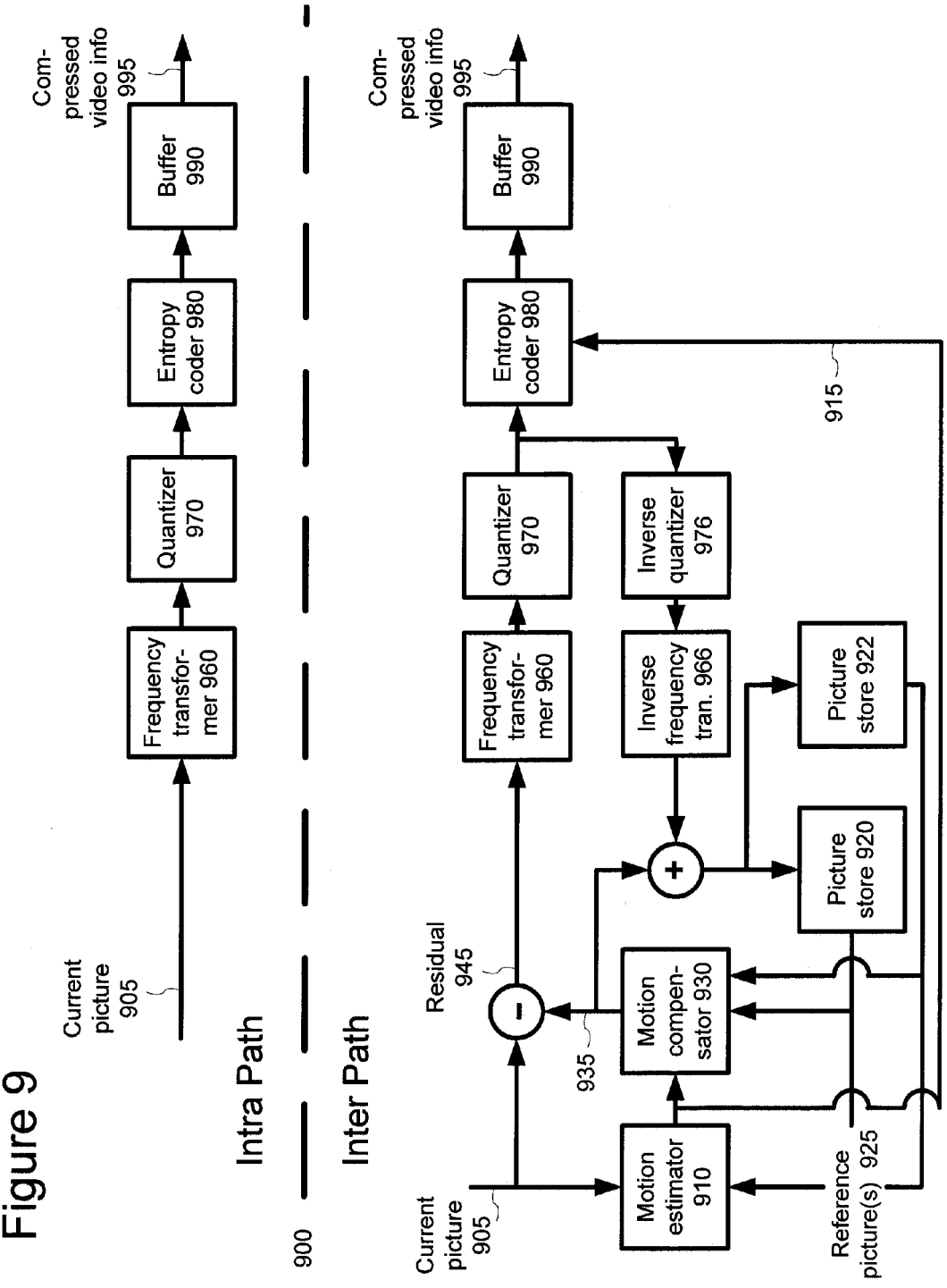
FIG. 9 is a block diagram of a generalized video encoder system in conjunction with which several described embodiments may be implemented.

The present application relates to techniques and tools for efficient compression and decompression of interlaced video.

In various described embodiments, for example, a video encoder and decoder incorporate techniques for predicting motion vectors in encoding and decoding predicted fields in interlaced video frames, as well as signaling techniques for use with a bit stream format or syntax comprising different layers or levels (e.g., sequence level, picture/image level, field level, macroblock level, and/or block level). The techniques and tools can be used, for example, in digital video broadcasting systems (e.g., cable, satellite, DSL, etc.).

In particular, described techniques and tools improve the quality of motion vector predictors for blocks and/or macroblocks of forward-predicted fields of interlaced video frames, which in turn allows motion vectors to be more efficiently encoded. For example, techniques are described for generating predictor motion vectors for the blocks and/or macroblocks of a current field using neighborhood motion vectors for surrounding blocks and/or macroblocks, where the neighborhood motion vectors collectively refer to one or both of two fields as references. Innovations implemented in the described techniques and tools include, but are not limited to the following:

1) Generating two motion vector predictors for a block or macroblock in an interlaced P-field: one motion vector predictor for an "even" reference field and one motion vector predictor for an "odd" reference field. The encoder/decoder considers up to six motion vector predictor candidates (three for the even motion vector predictor and three for the odd motion vector predictor) for a current block or macroblock. Use of up to six motion vector predictor candidates allows better motion vector prediction than prior methods.

2) Using a motion vector predictor from the reference field that is referenced by the current motion vector: If the current motion vector references a region in the corresponding field of the reference frame (meaning that the current field and reference field are of the same polarity), the motion vector predictor from that reference field is used. Similarly, if the opposite polarity field is used as a reference, the motion vector predictor from that reference field is used. This allows better motion vector prediction than prior methods.

3) Using a scaling operation to generate motion vector predictor candidates for the opposite polarity of an existing motion vector candidate. The encoder/decoder takes a motion vector from a candidate block/macroblock location, where the motion vector references either an odd field or an even field. The encoder/decoder then scales the motion vector to derive a motion vector predictor candidate of the other polarity. For example, if the actual motion vector for an adjacent macroblock references the odd field, that value is used as an odd motion vector predictor candidate from the adjacent macroblock, and a scaled motion vector value (derived from the actual value) is used as an even motion vector predictor candidate from the adjacent macroblock. Though motion vector predictor candidates are obtained from only three block/macroblock locations (with three motion vector values), the encoder/decoder's derivation of different polarity motion vector predictor candidates gives a population of six candidates to choose from.

4) Using a scaling operation that is dependent on the reference frame distances when deriving motion vector predictor candidates. The encoder/decoder uses the relative temporal distances between the current field and the two reference fields to perform the scaling operation that derives the predictor candidate for the missing polarity field from the existing motion vector candidate from the other field. An encoder/decoder that takes into account the relative temporal distances to perform scaling can produce more accurate prediction than an encoder/decoder that assumes a constant reference distance.

Various alternatives to the implementations described herein are possible. For example, techniques described with reference to flowchart diagrams can be altered by changing the ordering of stages shown in the flowcharts, by repeating or omitting certain stages, etc. As another example, although some implementations are described with reference to specific macroblock and/or block formats, other formats also can be used. Further, techniques and tools described with reference to interlaced P-field type prediction may also be applicable to other types of prediction.

The various techniques and tools can be used in combination or independently. Different embodiments implement one or more of the described techniques and tools. The techniques and tools described herein can be used in a video encoder or decoder, or in some other system not specifically limited to video encoding or decoding.

I. Computing Environment

FIG. 8 illustrates a generalized example of a suitable computing environment 800 in which several of the described embodiments may be implemented. The computing environment 800 is not intended to suggest any limitation as to scope of use or functionality, as the techniques and tools may be implemented in diverse general-purpose or special-purpose computing environments.

With reference to FIG. 8, the computing environment 800 includes at least one processing unit 810 and memory 820. In FIG. 8, this most basic configuration 830 is included within a dashed line. The processing unit 810 executes computer-executable instructions and may be a real or a virtual processor. In a multi-processing system, multiple processing units execute computer-executable instructions to increase processing power. The memory 820 may be volatile memory (e.g., registers, cache, RAM), non-volatile memory (e.g., ROM, EEPROM, flash memory, etc.), or some combination of the two. The memory 820 stores software 880 implementing a video encoder or decoder with two-reference field motion vector prediction for interlaced P-fields.

A computing environment may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The storage 840 may be removable or non-removable, and includes magnetic disks, magnetic tapes or cassettes, CD-ROMs, DVDs, or any other medium which can be used to store information and which can be accessed within the computing environment 800. The storage 840 stores instructions for the software 880 implementing the video encoder or decoder.

The input device(s) 850 may be a touch input device such as a keyboard, mouse, pen, or trackball, a voice input device, a scanning device, or another device that provides input to the computing environment 800. For audio or video encoding, the input device(s) 850 may be a sound card, video card, TV tuner card, or similar device that accepts audio or video input in analog or digital form, or a CD-ROM or CD-RW that reads audio or video samples into the computing environment 800.

The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 800, computer-readable media include memory 820, storage 840, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "estimate," "compensate," "predict," and "apply" to describe computer operations in a computing environment. These terms are high-level abstractions for operations performed by a computer, and should not be confused with acts performed by a human being. The actual computer operations corresponding to these terms vary depending on implementation.

II. Generalized Video Encoder and Decoder

Figure 10:
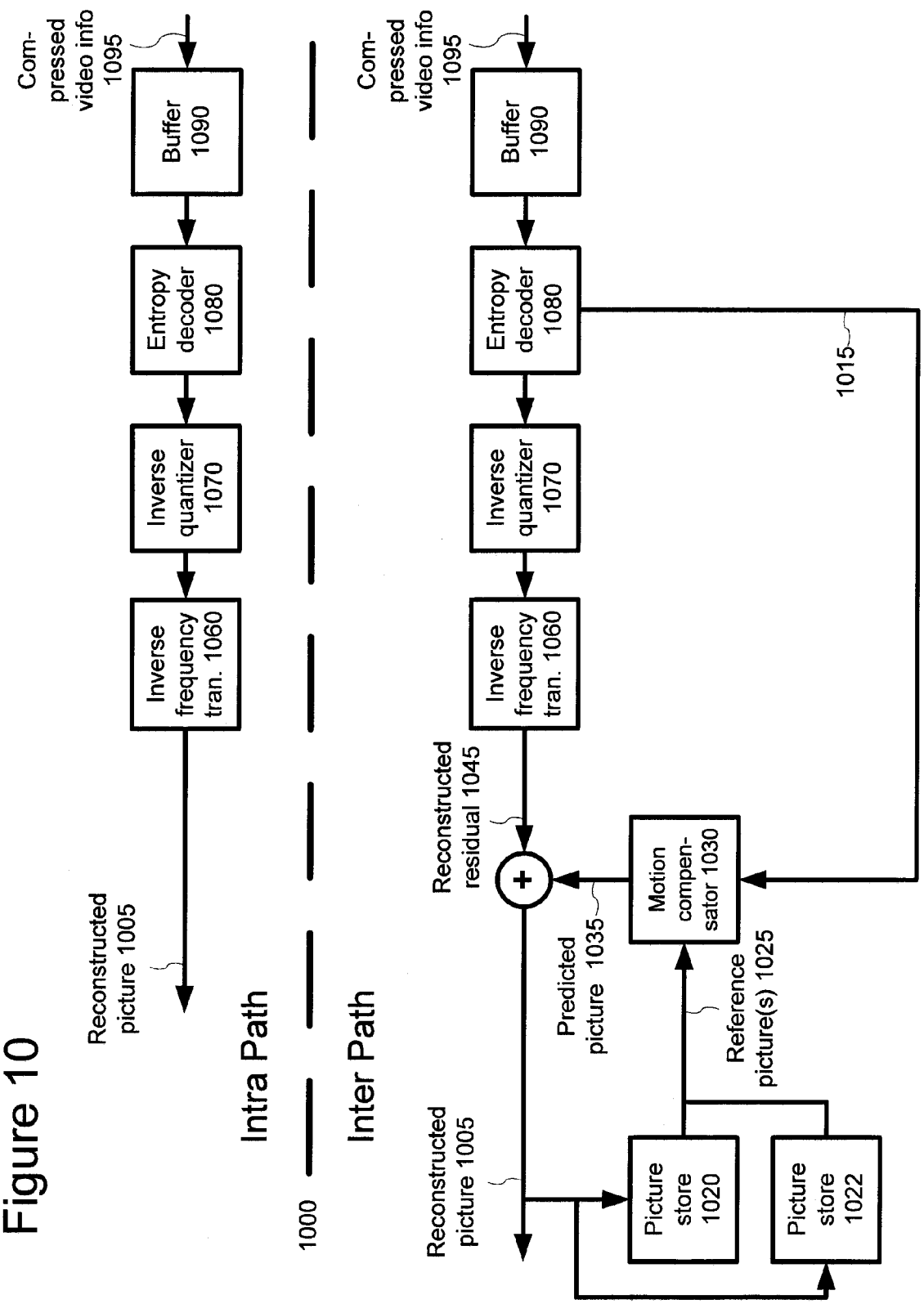
FIG. 10 is a block diagram of a generalized video decoder system in conjunction with which several described embodiments may be implemented.

FIG. 9 is a block diagram of a generalized video encoder 900 in conjunction with which described embodiments may be implemented. FIG. 10 is a block diagram of a generalized video decoder 1000 in conjunction with which described embodiments may be implemented.

The relationships shown between modules within the encoder 900 and decoder 1000 indicate general flows of information in the encoder and decoder; other relationships are not shown for the sake of simplicity. In particular, FIGS. 9 and 10 usually do not show side information indicating the encoder settings, modes, tables, etc. used for a video sequence, picture, macroblock, block, etc. Such side information is sent in the output bitstream, typically after entropy encoding of the side information. The format of the output bitstream can be a Windows Media Video version 9 format or other format.

The encoder 900 and decoder 1000 process video pictures, which may be video frames, video fields or combinations of frames and fields. The bitstream syntax and semantics at the picture and macroblock levels may depend on whether frames or fields are used. There may be changes to macroblock organization and overall timing as well. The encoder 900 and decoder 1000 are block-based and use a 4:2:0 macroblock format for frames, with each macroblock including four 8×8 luminance blocks (at times treated as one 16×16 macroblock) and two 8×8 chrominance blocks. For fields, the same or a different macroblock organization and format may be used. The 8×8 blocks may be further sub-divided at different stages, e.g., at the frequency transform and entropy encoding stages. Example video frame organizations are described in more detail below. Alternatively, the encoder 900 and decoder 1000 are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoders or decoders with different modules and/or other configurations of modules perform one or more of the described techniques.

A. Video Frame Organizations

In some implementations, the encoder 900 and decoder 1000 process video frames organized as follows. A frame contains lines of spatial information of a video signal. For progressive video, these lines contain samples starting from one time instant and continuing through successive lines to the bottom of the frame. A progressive video frame is divided into macroblocks such as the macroblock 1100 shown in FIG. 11. The macroblock 1100 includes four 8×8 luminance blocks (Y1 through Y4) and two 8×8 chrominance blocks that are co-located with the four luminance blocks but half resolution horizontally and vertically, following the conventional 4:2:0 macroblock format. The 8×8 blocks may be further sub-divided at different stages, e.g., at the frequency transform and entropy encoding stages. A progressive I-frame is an intra-coded progressive video frame. A progressive P-frame is a progressive video frame coded using forward prediction, and a progressive B-frame is a progressive video frame coded using bi-directional prediction. Progressive P and B-frames may include intra-coded macroblocks as well as different types of predicted macroblocks.

Figure 12A:
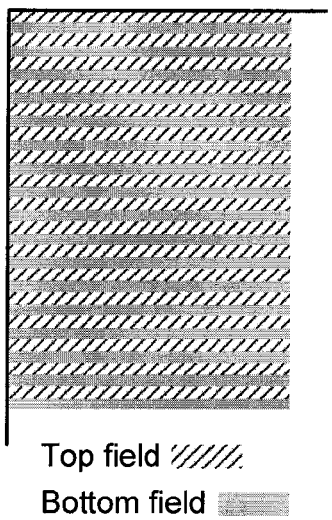
FIG. 12A is a diagram of part of an interlaced video frame, showing alternating lines of a top field and a bottom field.

For interlaced video, a frame consists of two fields, a top field and a bottom field. One of these fields commences one field period later than the other. FIG. 12a shows part of an interlaced video frame 1200, including the alternating lines of the top field and bottom field at the top left part of the interlaced video frame 1200.

Figure 11:
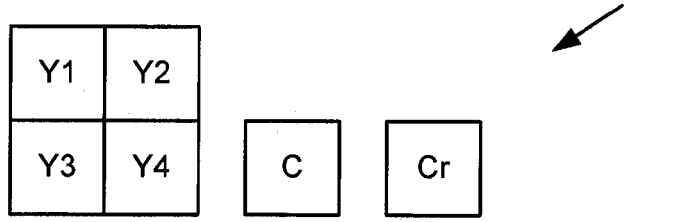
FIG. 11 is a diagram of a macroblock format used in several described embodiments.
Figure 12B:
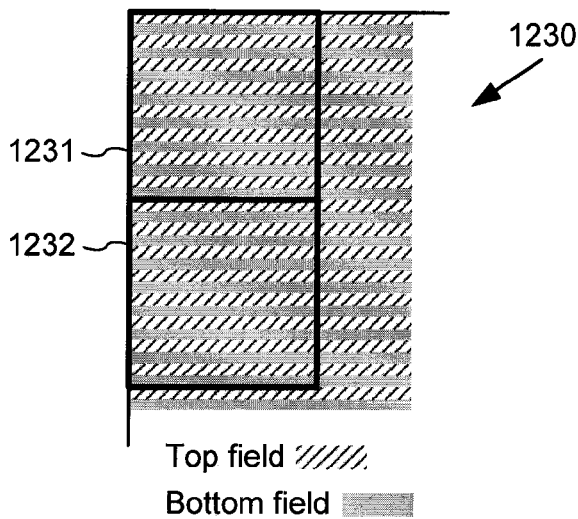
FIG. 12B is a diagram of the interlaced video frame organized for encoding/decoding as a frame.

FIG. 12b shows the interlaced video frame 1200 of FIG. 12a organized for encoding/decoding as a frame 1230. The interlaced video frame 1200 has been partitioned into macroblocks such as the macroblocks 1231 and 1232, which use 4:2:0 format as shown in FIG. 11. In the luminance plane each macroblock 1231, 1232 includes 8 lines from the top field alternating with 8 lines from the bottom field for 16 lines total, and each line is 16 pixels long. (The actual organization and placement of luminance blocks and chrominance blocks within the macroblocks 1231, 1232 are not shown, and in fact may vary for different encoding decisions). Within a given macroblock, the top-field information and bottom-field information may be coded jointly or separately at any of various phases. An interlaced I-frame is two intra-coded fields of an interlaced video frame, where a macroblock includes information for the two fields. An interlaced P-frame is two fields of an interlaced video frame coded using forward prediction, and an interlaced B-frame is two fields of an interlaced video frame coded using bi-directional prediction, where a macroblock includes information for the two fields. Interlaced P and B-frames may include intra-coded macroblocks as well as different types of predicted macroblocks.

Figure 12C:
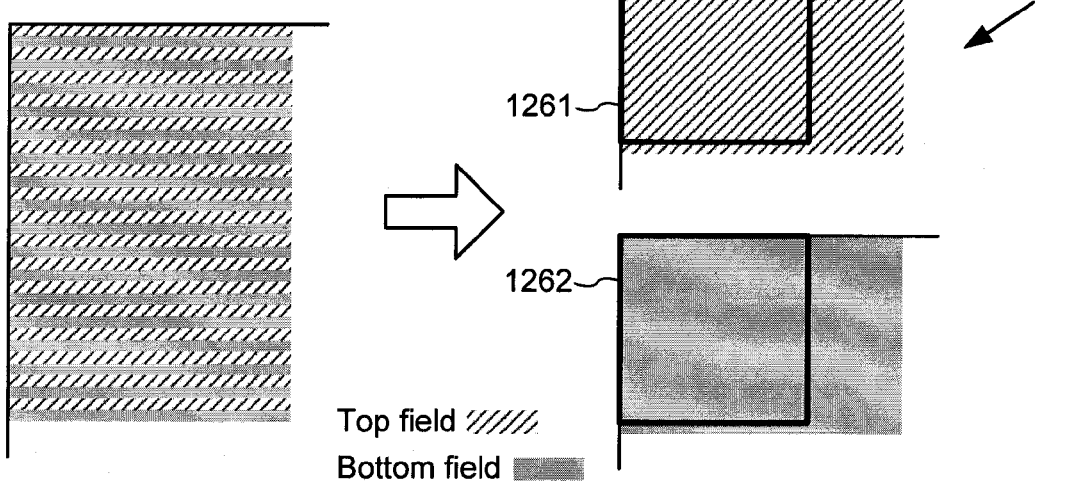
FIG. 12C is a diagram of the interlaced video frame organized for encoding/decoding as fields.

FIG. 12c shows the interlaced video frame 1200 of FIG. 12a organized for encoding/decoding as fields 1260. Each of the two fields of the interlaced video frame 1200 is partitioned into macroblocks. The top field is partitioned into macroblocks such as the macroblock 1261, and the bottom field is partitioned into macroblocks such as the macroblock 1262. (Again, the macroblocks use 4:2:0 format as shown in FIG. 11, and the organization and placement of luminance blocks and chrominance blocks within the macroblocks are not shown). In the luminance plane, the macroblock 1261 includes 16 lines from the top field and the macroblock 1262 includes 16 lines from the bottom field, and each line is 16 pixels long. An interlaced I-field is a single, separately represented field of an interlaced video frame. An interlaced P-field is single, separately represented field of an interlaced video frame coded using forward prediction, and an interlaced B-field is a single, separately represented field of an interlaced video frame coded using bi-directional prediction. Interlaced P and B-fields may include intra-coded macroblocks as well as different types of predicted macroblocks.

The term picture generally refers to source, coded or reconstructed image data. For progressive video, a picture is a progressive video frame. For interlaced video, a picture may refer to an interlaced video frame, the top field of the frame, or the bottom field of the frame, depending on the context.

B. Video Encoder

FIG. 9 is a block diagram of a generalized video encoder system 900. The encoder system 900 receives a sequence of video pictures including a current picture 905, and produces compressed video information 995 as output. Particular embodiments of video encoders typically use a variation or supplemented version of the generalized encoder 900.

The encoder system 900 compresses predicted pictures and key pictures. For the sake of presentation, FIG. 9 shows a path for key pictures through the encoder system 900 and a path for predicted pictures. Many of the components of the encoder system 900 are used for compressing both key pictures and predicted pictures. The exact operations performed by those components can vary depending on the type of information being compressed.

A predicted picture (also called p-picture, b-picture for bi-directional prediction, or inter-coded picture) is represented in terms of prediction (or difference) from one or more other pictures (which are typically referred to as reference pictures or anchors). A prediction residual is the difference between what was predicted and the original picture. In contrast, a key picture (also called I-picture, intra-coded picture) is compressed without reference to other pictures.

If the current picture 905 is a forward-predicted picture, a motion estimator 910 estimates motion of macroblocks or other sets of pixels of the current picture 905 with respect to a reference picture or pictures, which is the reconstructed previous picture(s) 925 buffered in the picture store(s) 920, 922. If the current picture 905 is a bi-directionally-predicted picture (a B-picture), a motion estimator 910 estimates motion in the current picture 905 with respect to two or more reconstructed reference pictures. Typically, a motion estimator estimates motion in a B-picture with respect to at least one temporally previous reference picture and at least one temporally future reference picture. Accordingly, the encoder system 900 can use the separate stores 920 and 922 for backward and forward reference pictures. For more information on bi-directionally predicted pictures, see U.S. patent application Ser. No. 10/622,378, entitled, "Advanced Bi-Directional Predictive Coding of Video Frames," filed Jul. 18, 2003.

The motion estimator 910 can estimate motion by pixel, ½ pixel, ¼ pixel, or other increments, and can switch the resolution of the motion estimation on a picture-by-picture basis or other basis. The resolution of the motion estimation can be the same or different horizontally and vertically. The motion estimator 910 outputs as side information motion information 915 such as differential motion vector information. The encoder 900 encodes the motion information 915 by, for example, computing one or more predictors for motion vectors, computing differentials between the motion vectors and predictors, and entropy coding the differentials. To reconstruct a motion vector, a motion compensator 930 combines a predictor with differential motion vector information. Various techniques for computing motion vector predictors, computing differential motion vectors, and reconstructing motion vectors for interlaced P-fields are described below.

The motion compensator 930 applies the reconstructed motion vector to the reconstructed picture(s) 925 to form a motion-compensated current picture 935. The prediction is rarely perfect, however, and the difference between the motion-compensated current picture 935 and the original current picture 905 is the prediction residual 945. Alternatively, a motion estimator and motion compensator apply another type of motion estimation/compensation.

A frequency transformer 960 converts the spatial domain video information into frequency domain (i.e., spectral) data. For block-based video pictures, the frequency transformer 960 applies a discrete cosine transform ["DCT"], variant of DCT, or other block transform to blocks of the pixel data or prediction residual data, producing blocks of frequency transform coefficients. Alternatively, the frequency transformer 960 applies another conventional frequency transform such as a Fourier transform or uses wavelet or sub-band analysis. The frequency transformer 960 may apply an 8×8, 8×4, 4×8, 4×4 or other size frequency transform.

A quantizer 970 then quantizes the blocks of spectral data coefficients. The quantizer applies uniform, scalar quantization to the spectral data with a step-size that varies on a picture-by-picture basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder 900 can use frame dropping, adaptive filtering, or other techniques for rate control.

If a given macroblock in a predicted picture has no information of certain types (e.g., no motion information for the macroblock and no residual information), the encoder 900 may encode the macroblock as a skipped macroblock. If so, the encoder signals the skipped macroblock in the output bitstream of compressed video information 995.

When a reconstructed current picture is needed for subsequent motion estimation/compensation, an inverse quantizer 976 performs inverse quantization on the quantized spectral data coefficients. An inverse frequency transformer 966 then performs the inverse of the operations of the frequency transformer 960, producing a reconstructed prediction residual (for a predicted picture) or a reconstructed key picture. If the current picture 905 was a key picture, the reconstructed key picture is taken as the reconstructed current picture (not shown). If the current picture 905 was a predicted picture, the reconstructed prediction residual is added to the motion-compensated current picture 935 to form the reconstructed current picture. One of the he picture store 920, 922 buffers the reconstructed current picture for use in predicting the next picture. In some embodiments, the encoder applies a de-blocking filter to the reconstructed picture to adaptively smooth discontinuities in the picture.

The entropy coder 980 compresses the output of the quantizer 970 as well as certain side information (e.g., for motion information 915, quantization step size). Typical entropy coding techniques include arithmetic coding, differential coding, Huffman coding, run length coding, LZ coding, dictionary coding, and combinations of the above. The entropy coder 980 typically uses different coding techniques for different kinds of information (e.g., DC coefficients, AC coefficients, different kinds of side information), and can choose from among multiple code tables within a particular coding technique.

The entropy coder 980 provides compressed video information 995 to the multiplexer ["MUX"] 990. The MUX 990 may include a buffer, and a buffer level indicator may be fed back to bit rate adaptive modules for rate control. Before or after the MUX 990, the compressed video information 995 can be channel coded for transmission over the network. The channel coding can apply error detection and correction data to the compressed video information 995.

C. Video Decoder

FIG. 10 is a block diagram of a general video decoder system 1000. The decoder system 1000 receives information 1095 for a compressed sequence of video pictures and produces output including a reconstructed picture 1005. Particular embodiments of video decoders typically use a variation or supplemented version of the generalized decoder 1000.

The decoder system 1000 decompresses predicted pictures and key pictures. For the sake of presentation, FIG. 10 shows a path for key pictures through the decoder system 1000 and a path for forward-predicted pictures. Many of the components of the decoder system 1000 are used for decompressing both key pictures and predicted pictures. The exact operations performed by those components can vary depending on the type of information being decompressed.

A DEMUX 1090 receives the information 1095 for the compressed video sequence and makes the received information available to the entropy decoder 1080. The DEMUX 1090 may include a jitter buffer and other buffers as well. Before or after the DEMUX 1090, the compressed video information can be channel decoded and processed for error detection and correction.

The entropy decoder 1080 entropy decodes entropy-coded quantized data as well as entropy-coded side information (e.g., for motion information 1015, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder 1080 typically uses different decoding techniques for different kinds of information (e.g., DC coefficients, AC coefficients, different kinds of side information), and can choose from among multiple code tables within a particular decoding technique.

The decoder 1000 decodes the motion information 1015 by, for example, computing one or more predictors for motion vectors, entropy decoding differential motion vectors, and combining decoded differential motion vectors with predictors to reconstruct motion vectors. Various techniques for computing motion vector predictors, computing differential motion vectors, and reconstructing motion vectors for interlaced P-fields are described below.

A motion compensator 1030 applies the motion information 1015 to one or more reference pictures 1025 to form a prediction 1035 of the picture 1005 being reconstructed. For example, the motion compensator 1030 uses one or more macroblock motion vectors to find macroblock(s) in the reference picture(s) 1025. One or more picture stores (e.g., picture stores 1020, 1022) store previous reconstructed pictures for use as reference pictures. Typically, B-pictures have more than one reference picture (e.g., at least one temporally previous reference picture and at least one temporally future reference picture). Accordingly, the decoder system 1000 can use separate picture stores 1020 and 1022 for backward and forward reference pictures. The motion compensator 1030 can compensate for motion at pixel, ½ pixel, ¼ pixel, or other increments, and can switch the resolution of the motion compensation on a picture-by-picture basis or other basis. The resolution of the motion compensation can be the same or different horizontally and vertically. Alternatively, a motion compensator applies another type of motion compensation. The prediction by the motion compensator is rarely perfect, so the decoder 1000 also reconstructs prediction residuals.

An inverse quantizer 1070 inverse quantizes entropy-decoded data. In general, the inverse quantizer applies uniform, scalar inverse quantization to the entropy-decoded data with a step-size that varies on a picture-by-picture basis or other basis. Alternatively, the inverse quantizer applies another type of inverse quantization to the data, for example, a non-uniform, vector, or non-adaptive quantization, or directly inverse quantizes spatial domain data in a decoder system that does not use inverse frequency transformations.

An inverse frequency transformer 1060 converts the quantized, frequency domain data into spatial domain video information. For block-based video pictures, the inverse frequency transformer 1060 applies an inverse DCT ["IDCT"], variant of IDCT, or other inverse block transform to blocks of the frequency transform coefficients, producing pixel data or prediction residual data for key pictures or predicted pictures, respectively. Alternatively, the inverse frequency transformer 1060 applies another conventional inverse frequency transform such as an inverse Fourier transform or uses wavelet or sub-band synthesis. The inverse frequency transformer 1060 may apply an 8×8, 8×4, 4×8, 4×4, or other size inverse frequency transform.

For a predicted picture, the decoder 1000 combines the reconstructed prediction residual 1045 with the motion compensated prediction 1035 to form the reconstructed picture 1005. When the decoder needs a reconstructed picture 1005 for subsequent motion compensation, one of the picture stores (e.g., picture store 1020) buffers the reconstructed picture 1005 for use in predicting the next picture. In some embodiments, the decoder 1000 applies a de-blocking filter to the reconstructed picture to adaptively smooth discontinuities in the picture.

III. Motion Vector Prediction

Figure 13:
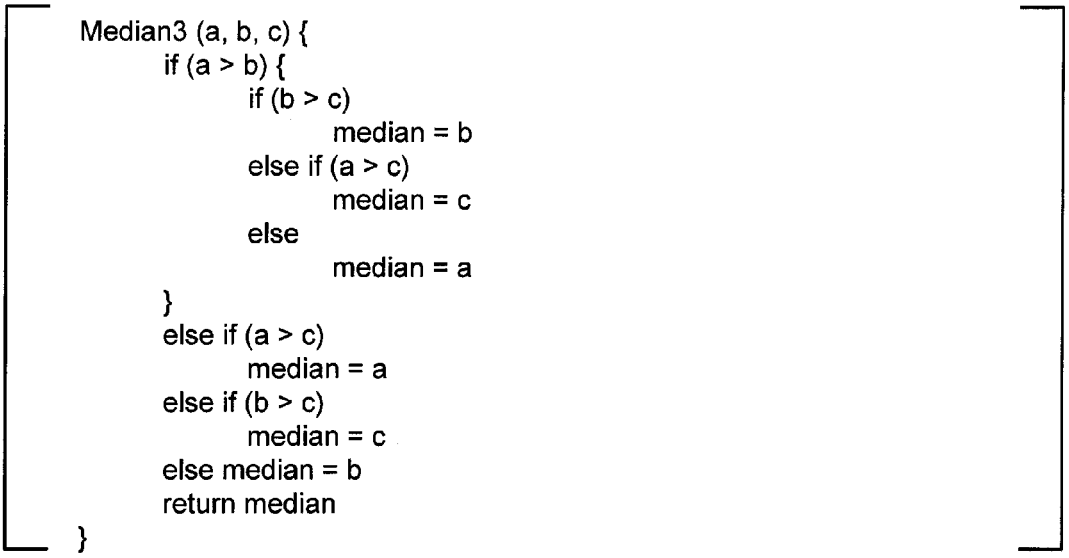
FIGS. 13 and 14 are code listings showing pseudo-code for performing median-of-3 and median-of-4 calculations, respectively.
Figure 14:
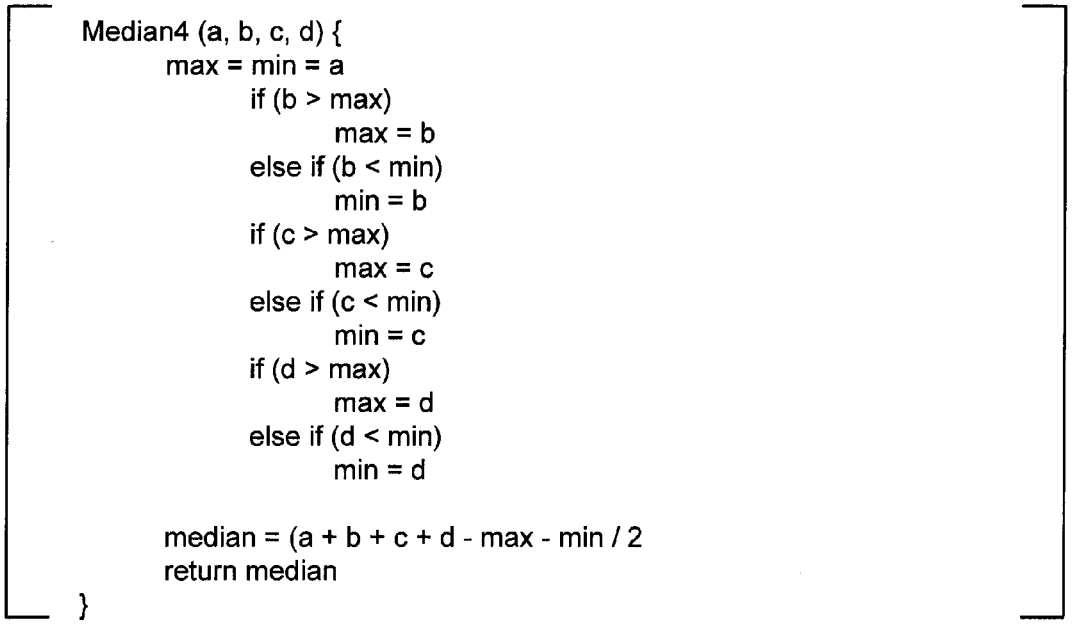

Motion vectors for macroblocks (or blocks) can be used to predict the motion vectors in a causal neighborhood of those macroblocks (or blocks). For example, an encoder/decoder can select a motion vector predictor for a current macroblock from among the motion vectors for neighboring candidate macroblocks, and predictively encode the motion vector for the current macroblock using the motion vector predictor. An encoder/decoder can use median-of-three prediction, median-of-four prediction, or some other technique to determine the motion vector predictor for the current macroblock from among candidate motion vectors from neighboring macroblocks. A procedure for median-of-three prediction is described in pseudo-code 1300 in FIG. 13. A procedure for median-of-four prediction is described in pseudo-code 1400 in FIG. 14.

IV. Field Coding for Interlaced Pictures

A typical interlaced video frame consists of two fields (e.g., a top field and a bottom field) scanned at different times. In general, it is more efficient to encode stationary regions of an interlaced video frame by coding fields together ("frame mode" coding). On the other hand, it is often more efficient to code moving regions of an interlaced video frame by coding fields separately ("field mode" coding), because the two fields tend to have different motion. A forward-predicted interlaced video frame may be coded as two separate forward-predicted fields—interlaced P-fields. Coding fields separately for a forward-predicted interlaced video frame may be efficient, for example, when there is high motion throughout the interlaced video frame, and hence much difference between the fields.

A. Reference Fields for Interlaced P-fields

Figure 15:
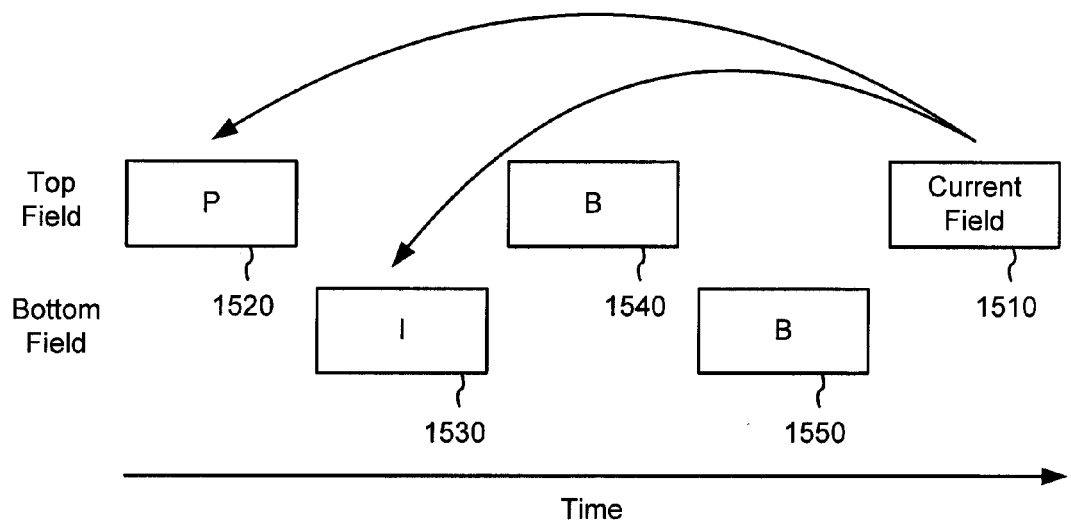
FIGS. 15 and 16 are diagrams showing interlaced P-fields each having two reference fields.
Figure 16:
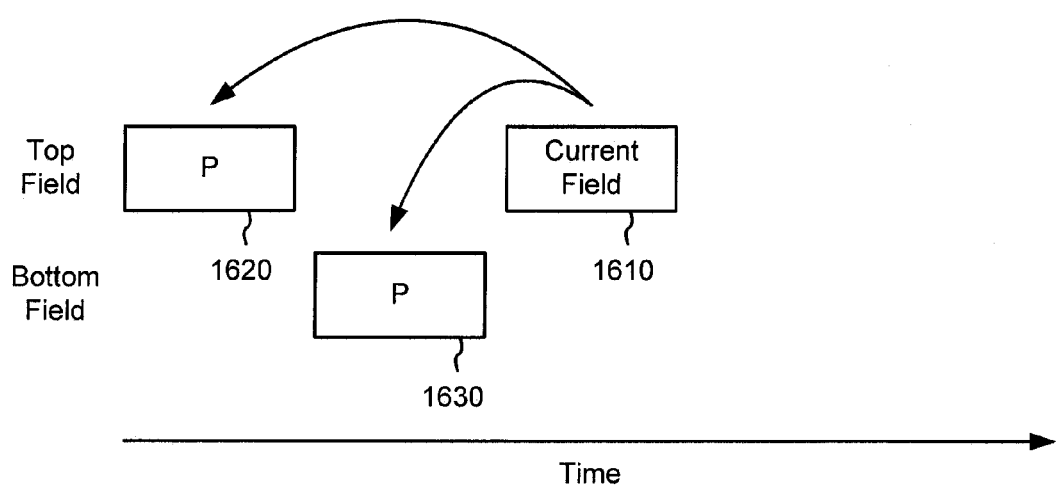

Interlaced P-fields reference one or more other fields (typically previous fields, which may or may not be coded in a bitstream). For example, in some implementations an interlaced P-field may have one or two reference fields. If the interlaced P-field has two reference fields, a particular motion vector for a block or macroblock of the P-field refers to a selected one of the two reference fields. FIGS. 15 and 16 show examples of interlaced P-fields having two reference fields. In FIG. 15, current field 1510 refers to a top field 1520 and bottom field 1530 in a temporally previous frame. Since fields 1540 and 1550 are interlaced B-fields, they are not used as reference fields. In FIG. 16, current field 1610 refers to a top field 1620 and bottom field 1630 in a predicted frame immediately previous to the interlaced video frame containing the current field 1610. In other cases, an interlaced P-field references a single field, for example, the most recent or second most recent I-field or P-field.

Alternatively, interlaced P-fields may use fields from other fields from frames of different types or temporal positions as reference fields.

B. Field Picture Coordinate System and Field Polarities

Motion vector units can be expressed in pixel/sub-pixel units or field units. For example, if the vertical component of a motion vector indicates a displacement of six quarter-pixel units, this indicates a displacement of one and a half field lines, because each line in the field in one pixel high.

Figure 17:
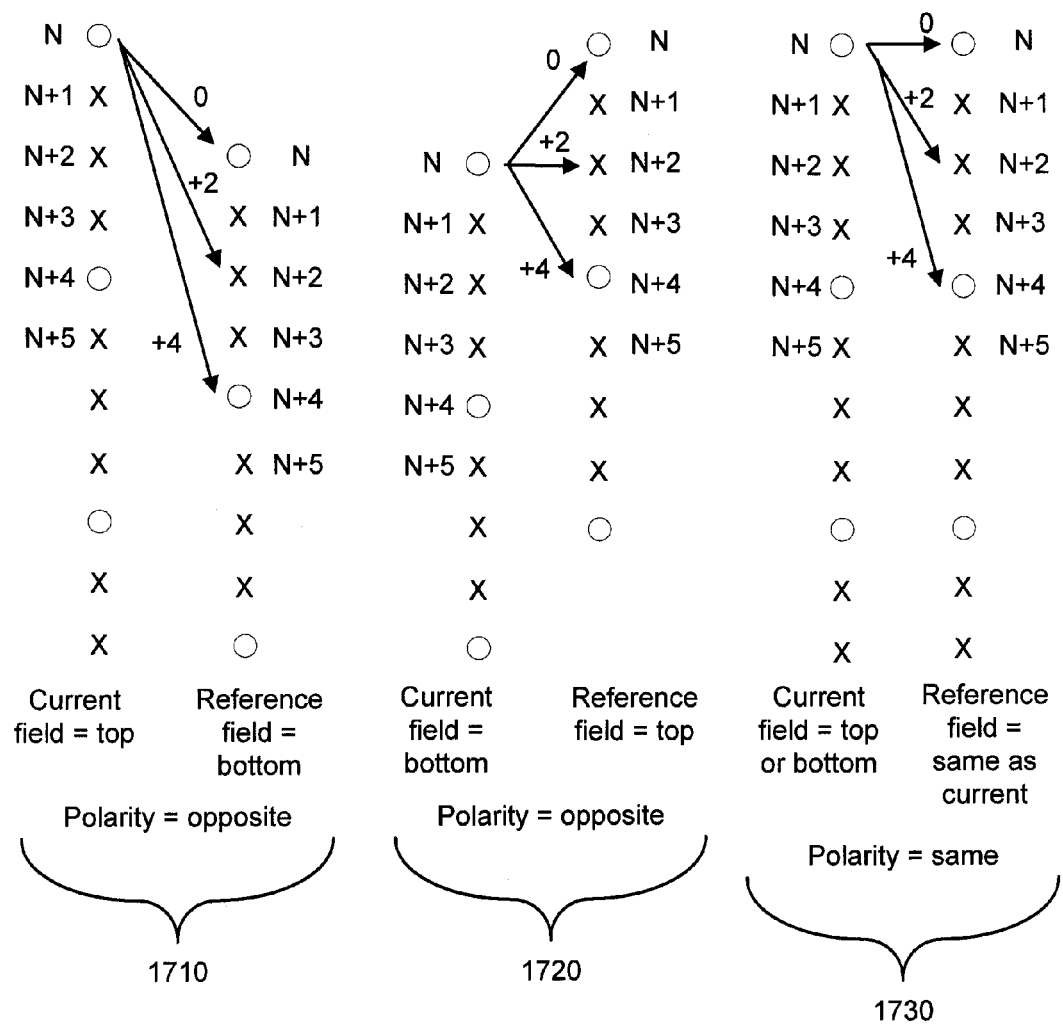
FIG. 17 is a diagram showing relationships between vertical components of motion vectors and a corresponding spatial location for different combinations of current and reference field polarities.

FIG. 17 shows a relationship between vertical components of motion vectors and spatial locations in one implementation. The example shown in FIG. 17 shows three different scenarios 1710, 1720 and 1730 for three different combinations of current and reference field types (e.g., top and bottom). If the field types are different for the current and reference fields, the polarity is "opposite." If the field types are the same, the polarity is "same." For each scenario, FIG. 17 shows one vertical column of pixels in a current field and a second vertical column of pixels in a reference field. In reality, the two columns are horizontally aligned. A circle represents an actual integer-pixel position and an X represents an interpolated half or quarter-pixel position. Horizontal component values (not shown) need not account for any offset due to interlacing, as the respective fields are horizontally aligned. Negative values indicate offsets further above, and in the opposite direction, as the positive value vertical offsets shown.

In scenario 1710, the polarity is "opposite." The current field is a top field and the reference field is a bottom field. Relative to the current field, the position of the reference field is offset by a half pixel in the downward direction due to the interlacing. Thus, a vertical motion vector component value of 0 represents a position in the reference field that is offset by a half pixel below the location in the current field, as a default "no motion" value. A vertical component value of +2 represents a position offset by a full pixel (in absolute terms) below the location in the current field, which is an interpolated value in the reference field, and a vertical component of +4 represents a position offset by one and a half pixels (in absolute terms) below the location in the current field, which is an actual value in the reference field.

In scenario 1720, the polarity is also "opposite." The current field is a bottom field and the reference field is a top field. Relative to the current field, the position of the reference field is offset by a half pixel in the upward direction due to the interlacing. Thus, a vertical motion vector component of 0 represents a position in the reference field that is a half pixel (in absolute terms) above the location in the current field, a vertical component value of +2 represents a position at the same level (in absolute terms) as the location in the current field, and a vertical component of +4 represents a position offset by a half pixel below (in absolute terms) the location in the current field.

In scenario 1730, the polarity is "same," and no vertical offset is applied because the position of the current field is the same relative to the reference field.

Alternatively, displacements for motion vectors are expressed according to a different convention.

V. Innovations in Motion Vector Prediction for Predictive Coding/Decoding of Interlaced P-fields Described embodiments include techniques and tools for coding and decoding interlaced video (e.g., interlaced P-fields). The described techniques and tools can be used in combination with one another or with other techniques and tools, or can be used independently.

In particular, described techniques and tools specify, for example, ways to generate motion vector predictors for blocks and/or macroblocks of interlace P-fields that use two fields as references for motion compensated prediction coding. Described techniques and tools implement one or more innovations, which include but are not limited to the following:

1. Generating two motion vector predictors—one for the even field reference and one for the odd field reference. Each predictor is derived from three previously coded, candidate neighboring motion vectors,
2. Using the motion vector predictor from the same reference field as the current motion vector (both refer to the same reference field).
3. Scaling actual motion vector predictor candidate values for one field to generate motion vector predictor candidates for the other field for motion vector prediction.
4. Using a scaling operation that uses the relative temporal distances between the current field and the two reference fields to derive a motion vector predictor candidate for one reference polarity from the existing motion vector predictor candidate of the other polarity.

In interlaced video, fields may be coded using no motion prediction (intra or I fields), using forward motion prediction (P-fields) or using bi-directional prediction (B fields). Described techniques and tools involve computing motion vector predictors for portions of interlaced P-fields, in particular, in cases where the motion compensation can occur with reference to either of the two most recent (in display order) I- or P-fields. It is assumed that the two reference fields are of opposite polarities, meaning that one reference field represents odd lines of an interlaced video frame and the other reference field represents even lines of the same or different interlaced video frame. This is the case for the signaling protocol indicated in FIG. 24, which shows a syntax element (FPTYPE) for field picture type for an interlaced picture. Or, for example, referring again to FIG. 15, current field 1510 refers to a top field 1520 and a bottom field 1530, which represent the odd and even lines, respectively, of a video frame.

A. Motion Vector Prediction in Two-Reference Field Pictures

With two-reference field P-fields, a current field can reference two fields in the same temporal direction (e.g., the two most recent previous reference fields). In the case of a two-reference field interlaced P-field, the encoder and decoder select between two motion vector predictors for a motion vector of a block or macroblock. In some embodiments, one predictor is for a reference field of same polarity as the current field, and the other is for a reference field of opposite polarity. Other combinations of polarities also are possible.

Figure 18:
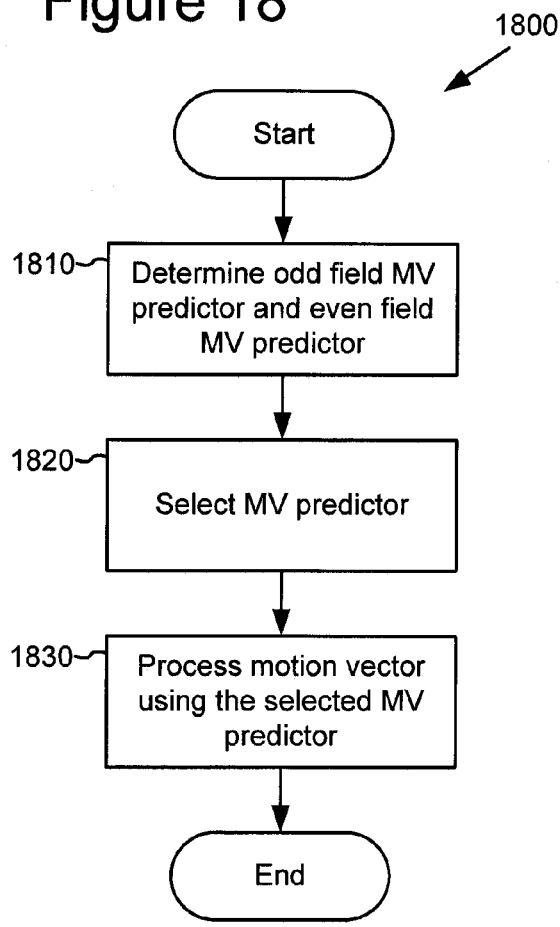
FIG. 18 is a flow chart showing a technique for selecting a motion vector predictor for an interlaced P-field having two possible reference fields.

In some embodiments, an encoder/decoder calculates a motion vector predictor for a current block or macroblock by finding an odd field predictor and an even field predictor, and selecting one of the predictors to process the macroblock. For example, FIG. 18 shows a technique 1800 for calculating a motion vector predictor for a block or macroblock of an interlaced P-field having two possible reference fields.

At 1810, an encoder/decoder determines an odd field motion vector predictor and even field motion vector predictor. One of the motion vector predictors thus has the same polarity as the current field, and the other motion vector predictor has the opposite polarity.

At 1820, the encoder/decoder selects a motion vector predictor from among the odd field motion vector predictor and the even field motion vector predictor. For example, the encoder selects between the motion vector predictors based upon which gives better prediction. Or, the encoder selects the motion vector predictor that refers to the same reference field as the motion vector that is currently being predicted. The encoder signals which motion vector predictor to use using a simple selection signal or using more complex signaling that incorporates contextual information to improve coding efficiency. The contextual information may indicate which of the odd field or even field, or which of the same polarity field or opposite polarity field, has been used predominately in the neighborhood around the block or macroblock. The decoder selects which motion vector predictor to use based upon the selection signal and/or the contextual information.

At 1830, the encoder/decoder processes the motion vector using the selected motion vector predictor. For example, the encoder encodes a differential between the motion vector and the motion vector predictor. Or, the decoder decodes the motion vector by combining the motion vector differential and the motion vector predictor.

Alternatively, the encoder and/or decoder may skip determining the odd field motion vector predictor or determining the even field motion vector predictor. For example, if the encoder determines that the odd field will be used for motion compensation for a particular block or macroblock, the encoder determines only the odd field motion vector predictor. Or, if the decoder determines from contextual and/or signaled information that the odd field will be used for motion compensation, the decoder determines only the odd field motion vector predictor. In this way, the encoder and decoder may avoid unnecessary operations.

Figure 19:
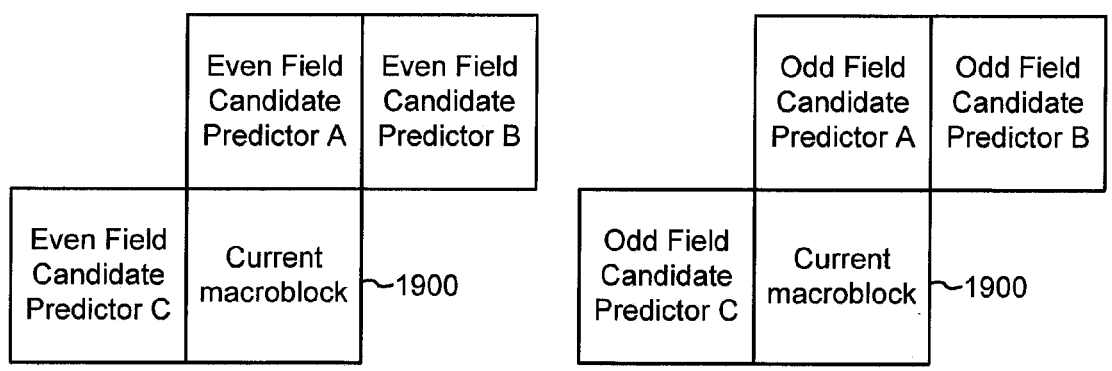
FIG. 19 is a diagram showing two sets of three candidate motion vector predictors for a current macroblock.

In one implementation, a decoder employs the following technique to determine motion vector predictors for a current interlaced P-field:

For each block or macroblock with a motion vector in an interlaced P-field, two sets of three candidate motion vector predictors are obtained. The positions of the neighboring macroblocks from which these candidate motion vector predictors are obtained relative to a current macroblock 1900 are shown in FIG. 19. Three of the candidates are from the even reference field and three are from the odd reference field. Since the neighboring macroblocks in each candidate direction (A, B or C) will either be intra-coded or have an actual motion vector that references either the even field or the odd field, there is a need to derive the other field's motion vector. For example, for a given macroblock, suppose predictor A has a motion vector which references the odd field. In this case, the "even field" predictor candidate A is derived from the motion vector of "odd field" predictor candidate A. This derivation is accomplished using a scaling operation. (See, for example, the explanation of FIGS. 21A and 21B below). Alternatively, the derivation is accomplished in another manner.

Once the three odd field candidate motion vector predictors have been obtained, a median operation is used to derive an odd field motion vector predictor from the three odd field candidates. Similarly, once the three even field candidate motion vector predictors have been obtained, a median operation is used to derive an even field motion vector predictor from the three even field candidates. Alternatively, another mechanism is used to select the field motion vector predictor based upon the candidate field motion vector predictors. The decoder decides whether to use the even field or odd field as the motion vector predictor (e.g., by selecting the dominant predictor), and the even or odd motion vector predictor is used to reconstruct the motion vector.

The pseudo-code 2000 in FIGS. 20A-20F illustrates a process used to generate motion vector predictors from predictors A, B, and C as arranged in FIG. 19. While FIG. 19 shows a neighborhood for a typical macroblock in the middle of the current interlaced P-field, the pseudo-code 2000 of FIGS. 20A-20F addresses various special cases for macroblock locations. In addition, the pseudo-code 2000 may be used to compute a motion vector predictor for the motion vector of a block in various locations.

In the pseudo-code 2000, the terms "same field" and "Opposite field" are to be understood relative to the field currently being coded or decoded. If the current field is an even field, for example, the "same field" is the even reference field and the "opposite field" is the odd reference field. The variables samefieldpred_x and samefieldpred_y in the pseudo-code 2000 represent the horizontal and vertical components of the motion vector predictor from the same field, and the variables oppositefieldpred_x and oppositefieldpred_y represent the horizontal and vertical components of the motion vector predictor from the opposite field. The variables samecount and oppositecount track how many of the motion vectors for the neighbors of the current block or macroblock reference the "same" polarity reference field for the current field and how many reference the "opposite" polarity reference field, respectively. The variables samecount and oppositecount are initialized to 0 at the beginning of the pseudo-code.

The scaling operations scaleforsame( ) and scaleforopposite( ) mentioned in the pseudo-code 2000 are used to derive motion vector predictor candidates for the "other" field from the actual motion vector values of the neighbors. The scaling operations are implementation-dependent. Example scaling operations are described below with reference to FIGS. 21A, 21B, 22, and 23. Alternatively, other scaling operations are used, for example, to compensate for vertical displacements such as those shown in FIG. 17.

FIGS. 20A and 20B show pseudo-code for computing a motion vector predictor for a typical internal block or macroblock. The motion vectors for "intra" neighbors are set to 0. For each neighbor, the same field motion vector predictor and opposite field motion vector predictor are set, where one is set from the actual value of the motion vector for the neighbor, and the other is derived therefrom. The median of the candidates is computed for the same field motion vector predictor and the opposite field motion vector predictor, and the "dominant" predictor is determined from samecount and opposite-count. The variable dominantpredictor indicates which field contains the dominant motion vector predictor. A motion vector predictor is dominant if it has the same polarity as more of the three candidate predictors. (The signaled value predictor_flag, which is decoded along with the motion vector differential data, indicates whether the dominant or non-dominant predictor is used).

The pseudo-code in FIG. 20C addresses the situation of a macroblock in an interlaced P-field with only one macroblock per row, for which there are no neighbors B or C. The pseudo-code in FIGS. 20D and 20E addresses the situation of a block or macroblock at the left edge of an interlaced P-field, for which there is no neighbor C. Here, a motion vector predictor is dominant if it has the same polarity as more of the two candidate predictors, with the opposite field motion vector predictor being dominant in the case of a tie. Finally, the pseudo-code in FIG. 20F addresses, for example, the cases of macroblock in the top row of an interlaced P-field.

B. Scaling for Derivation of One Field Motion Vector Predictor from Another Field Motion Vector Predictor In one implementation, an encoder/decoder derives one field motion vector predictor from another field motion vector predictor using the scaling operation illustrated in the pseudo-code 2100 of FIGS. 21A and 21B. The values of SCALEOPP, SCALESAME1, SCALESAME2, SCALEZONE1_X, SCALEZONE1_Y ZONE1OFFSET_X and ZONE1OFFSET_Y are implementation dependent. Two possible sets of values are shown in table 2200 in FIG. 22 for the case where the current field is first field in the interlaced video frame, and in table 2300 in FIG. 23 for the case where the current field is the second field in the interlaced video frame. In tables 2200 and 2300, the reference frame distance is defined as the number of B-pictures (i.e., a video frame containing two B-fields) between the current field and the frame containing the temporally furthest reference field.

In the examples shown in tables 2200 and 2300, the value of N is dependant on a motion vector range. For example, an extended motion vector range can be signaled by the syntax element EXTENDED_MV=1. If EXTENDED_MV=1, the MVRANGE syntax element is present in the picture header and signals the motion vector range. If EXTENDED_MV=0 then a default motion vector range is used. Table 1 shows the relationship between N and the MVRANGE.

TABLE 1

Derivation of N in FIGS. 22 and 23

| MVRANGE | N |
|---|---|
| 0 or default | 1 |
| 10 | 2 |
| 110 | 8 |
| 111 | 16 |

The values shown in tables 2200 and 2300 can be modified depending on implementation.

Alternatively, extended motion vector range information is not used, or scaling can be performed in some other way.

VI. Combined Implementations

A detailed combined implementation for a bitstream syntax and decoder are now described, in addition to an alternative combined implementation with minor differences from the main combined implementation.

A. Bitstream Syntax

Figure 24:
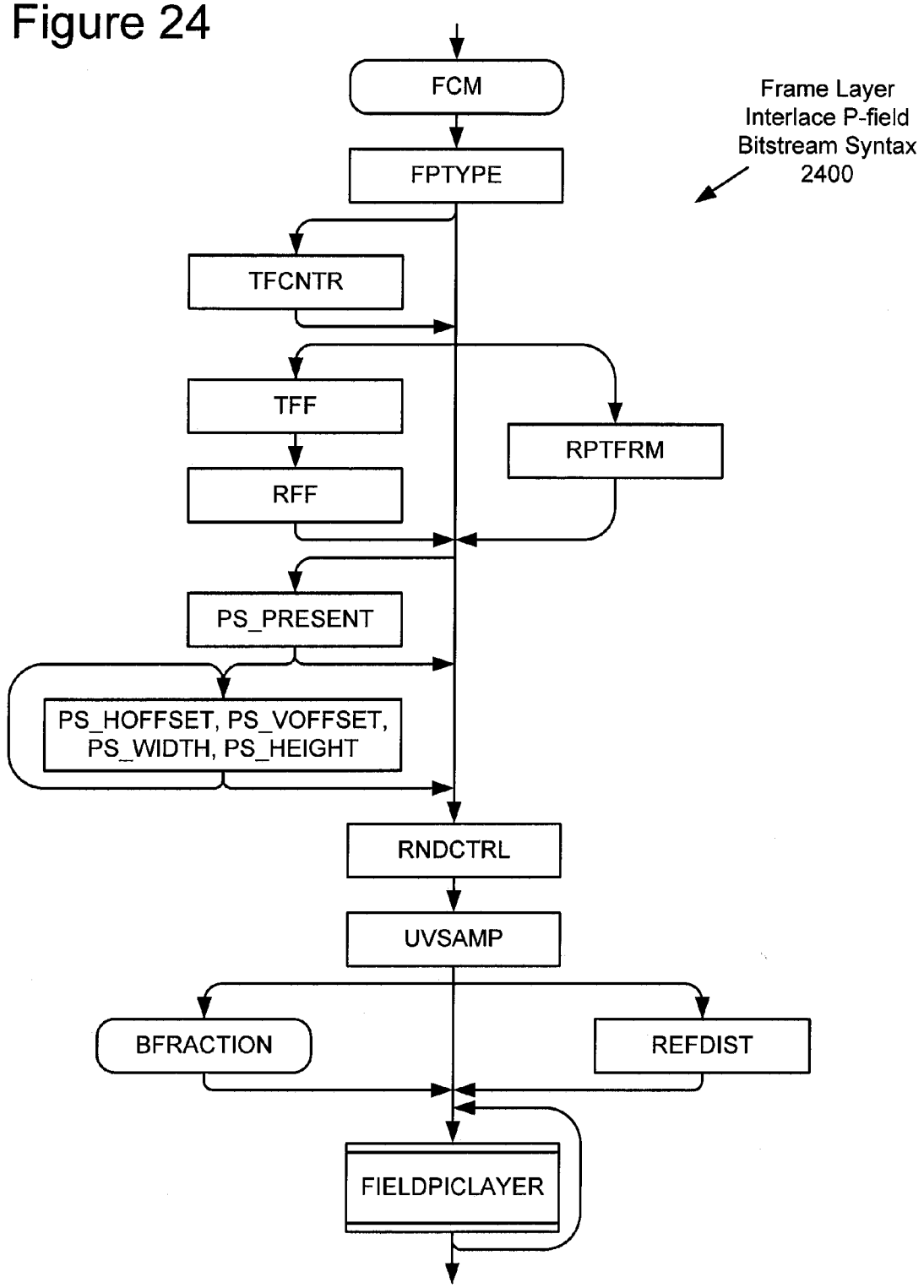
FIG. 24 is a diagram showing a frame-layer bitstream syntax for interlaced P-fields in a combined implementation.
Figure 25:
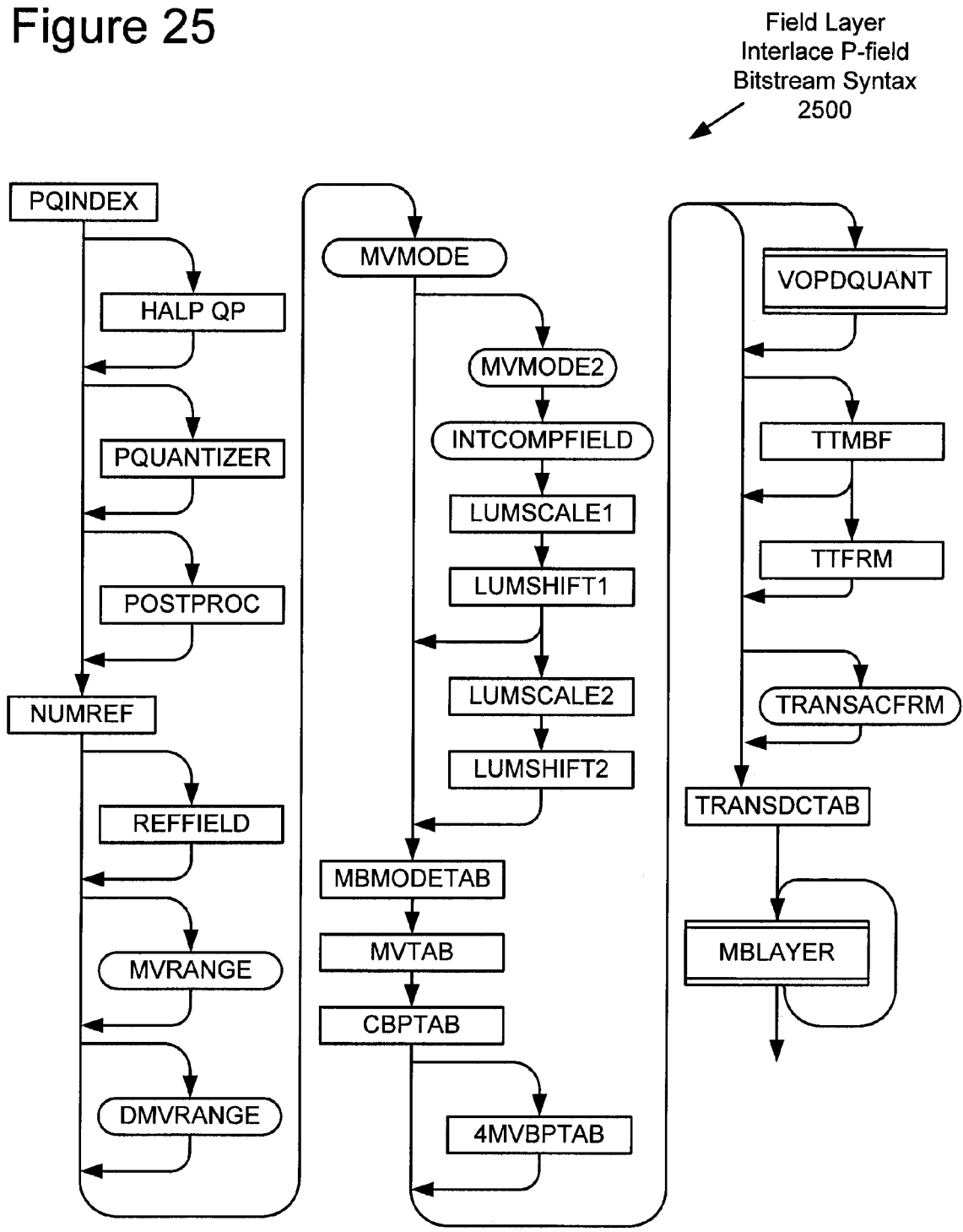
FIG. 25 is a diagram showing a field-layer bitstream syntax for interlaced P-fields in a combined implementation.
Figure 26:
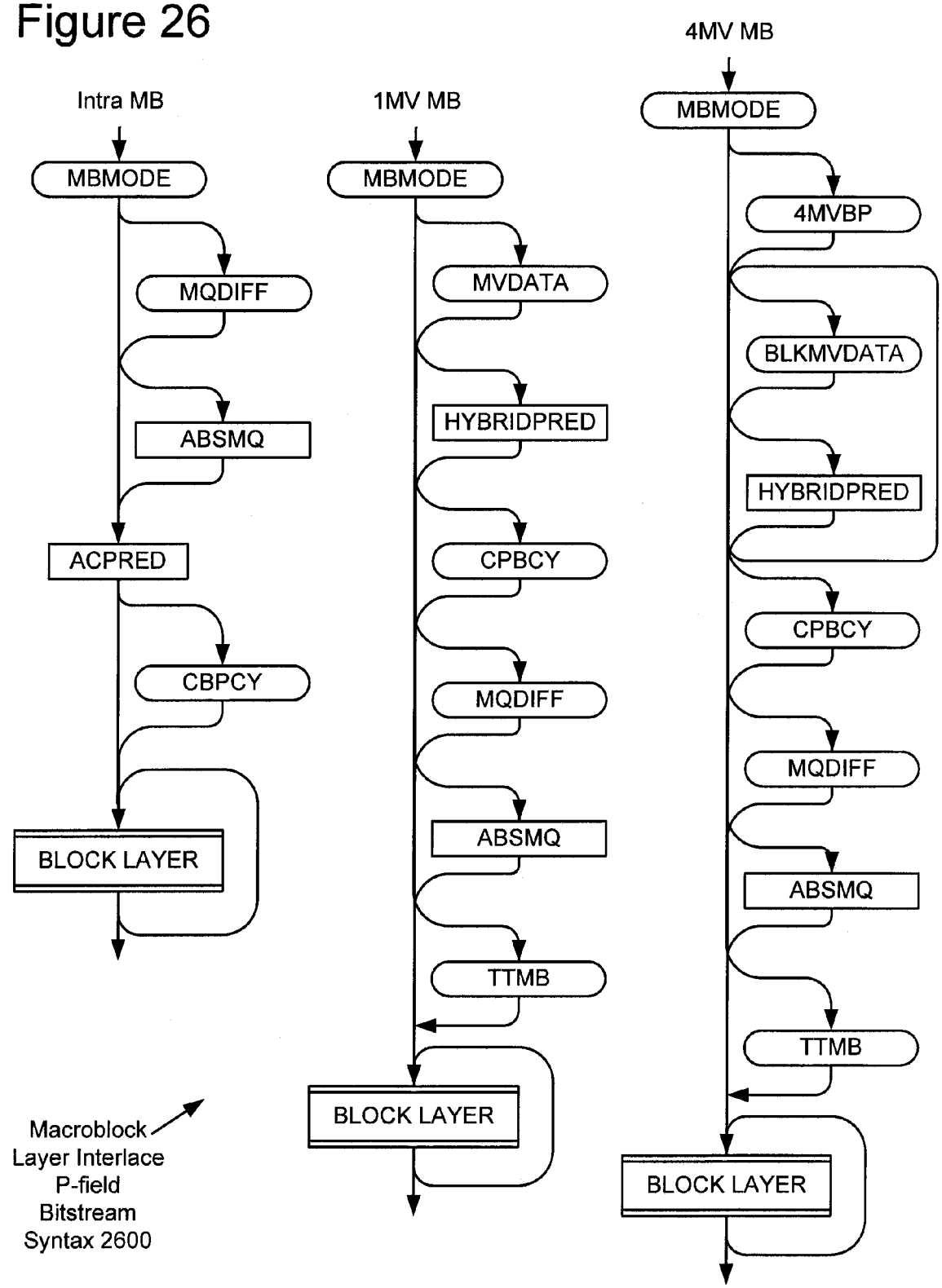
FIG. 26 is a diagram showing a macroblock-layer bitstream syntax for interlaced P-fields in a combined implementation.

In various combined implementations, data for interlaced P-fields is presented in the form of a bitstream having plural layers (e.g., sequence, frame, field, macroblock, block and/or sub-block layers). Data for each frame including an interlaced P-field consists of a frame header followed by data for the field layers. The bitstream elements that make up the frame header for a frame including an interlaced P-field are shown in FIG. 24. The bitstream elements that make up the field headers for interlaced P-fields are shown in FIG. 25. The bitstream elements that make up the macroblock layer for interlaced P-fields are shown in FIG. 26. The following sections describe selected bitstream elements in the frame, field and macroblock layers that are related to signaling for motion vector prediction for blocks or macroblocks of interlaced P-fields.

1. Selected Frame Layer Elements

FIG. 24 is a diagram showing a frame-level bitstream syntax for frames including interlaced P-fields in a combined implementation. Specific bitstream elements are described below.

Frame Coding Mode (FCM) (Variable Size)

FCM is a variable length codeword ["VLC"] used to indicate the picture coding type. FCM takes on values for frame coding modes as shown in Table 2 below:

TABLE 2

Frame Coding Mode VLC

| FCM value | Frame Coding Mode |
|---|---|
| 0 | Progressive |
| 10 | Frame-Interlace |
| 11 | Field-Interlace |

Field Picture Type (FPTYPE) (3 Bits)

FPTYPE is a three-bit syntax element present in the frame header for a frame including interlaced P-fields. FPTYPE takes on values for different combinations of field types according to Table 3 below.

TABLE 3

Field Picture Type FLC

| FPTYPE FLC | First Field Type | Second Field Type |
|---|---|---|
| 000 | I | I |
| 001 | I | P |
| 010 | P | I |
| 011 | P | P |
| 100 | B | B |
| 101 | B | BI |
| 110 | BI | B |
| 111 | BI | BI |

P Reference Distance (REFDIST) (Variable Size)

REFDIST is a variable sized syntax element. This element indicates the number of frames between the current frame and the reference frame. Table 4 shows the a VLC used to encode the REFDIST values.

TABLE 4

| REFDIST VLC Table | | |
| --- | --- | --- |
| Reference Frame Dist. | VLC Codeword (Binary) | VLC Size |
| 0 | 00 | 2 |
| 1 | 01 | 2 |
| 2 | 10 | 2 |
| N | 11[(N – 3) 1s]0 | N |

The last row in Table 4 indicates the codewords used to represent reference frame distances greater than 2. These are coded as (binary) 11 followed by N–3 1s, where N is the reference frame distance. The last bit in the codeword is 0. For example:

N=3, VLC Codeword=110, VLC Size=3
N=4, VLC Codeword=1110, VLC Size=4
N=5, VLC Codeword=11110, VLC Size=5

In an alternative combined implementation, the picture type information is signaled at the beginning of the field level for an interlaced P-field, instead of at the frame level for the frame including the interlaced P-field, and P reference distance is omitted.

2. Selected Field Layer Elements

FIG. 25 is a diagram showing a field-level bitstream syntax for interlaced P-fields in the combined implementation. Specific bitstream elements are described below.

Number of Reference Pictures (NUMREF) (1 Bit)

The NUMREF syntax element is a one-bit syntax element that indicates whether the current field may reference one or two previous reference field pictures. If NUMREF=0, then the current P field picture may only reference one field. In this case, the REFFIELD syntax element follows in the picture layer bitstream. For an interlaced P-field with two reference fields, NUMREF=1.

Reference Field Picture Indicator (REFFIELD) (1 Bit)

REFFIELD is a 1 bit syntax element present in interlace P-field picture headers if NUMREF=0. REFFIELD indicates which previously decoded field is used as a reference. If REFFIELD=0, then the temporally closest (in display order) I or P field is used as a reference. If REFFIELD=1, then the second most temporally recent I or P field picture is used as reference.

Extended MV Range Flag (MVRANGE) (Variable Size)

MVRANGE is a variable-sized syntax element present when the sequence-layer EXTENDED_MV bit is set to 1. The MVRANGE VLC represents a motion vector range.

Extended Differential MV Range Flag (DMVRANGE) (Variable Size)

DMVRANGE is a variable sized syntax element present if the sequence level syntax element EXTENDED_DMV=1. The DMVRANGE VLC represents a motion vector differential range.

Motion Vector Mode (MVMODE) (Variable Size or 1 Bit)

The MVMODE syntax element signals one of four motion vector coding modes or one intensity compensation mode. Several subsequent elements provide additional motion vector mode and/or intensity compensation information.

Macroblock Mode Table (MBMODETAB) (2 or 3 Bits)

The MBMODETAB syntax element is a fixed length field. For interlace P-fields, MBMODETAB is a 3 bit value that indicates which one of the eight Huffman tables is used to decode the macroblock mode syntax element (MBMODE) in the macroblock layer.

Motion Vector Table (MVTAB) (2 or 3 Bits)

The MVTAB syntax element is a 2 or 3 bit value. For interlace P-fields in which NUMREF=1, MVTAB is a 3 bit syntax element that indicates which of eight interlace Huffman tables are used to decode the motion vector data.

4 MV Block Pattern Table (4 MVBPTAB) (2 Bits)

The 4 MVBPTAB syntax element is a 2 bit value. For interlace P-fields, it is only present if MVMODE (or MVMODE2, if MVMODE is set to intensity compensation) indicates that the picture is of "Mixed MV" type. The 4 MVBPTAB syntax element signals which of four Huffman tables is used to decode the 4 MV block pattern (4 MVBP) syntax element in 4 MV macroblocks.

3. Selected Macroblock Layer Elements

FIG. 26 is a diagram showing a macroblock-level bitstream syntax for interlaced P-fields in the combined implementation. Specific bitstream elements are described below. Data for a macroblock consists of a macroblock header followed by block layer data.

Macroblock Mode (MBMODE) (Variable Size)

The MBMODE syntax element indicates the macroblock type (1 MV, 4 MV or Intra) and also the presence of the CBP flag and motion vector data, as described in detail in Section VI.B.3. below.

Motion Vector Data (MVDATA) (Variable Size)

MVDATA is a variable sized syntax element that encodes differentials for the motion vector(s) for the macroblock, the decoding of which is described in detail in Section VI.B.3. below.

4 MV Block Pattern (4 MVBP) (4 Bits)

The 4 MVBP syntax element indicates which of the 4 luminance blocks contain non-zero motion vector differentials, the use of which is described in detail in Section VI.B.3. below.

Block-level Motion Vector Data (BLKMVDATA) (Variable Size)

BLKMVDATA is a variable-size syntax element that contains motion information for the block, and is present in 4 MV macroblocks.

Hybrid Motion Vector Prediction (HYBRIDPRED) (1 Bit)

HYBRIDPRED is a 1-bit syntax element per motion vector. If the predictor is explicitly coded in the bitstream, a bit is present that indicates whether to use predictor A or predictor C as the motion vector predictor.

B. Decoding Interlaced P-fields

The following sections describe a process for decoding interlaced P-fields in the combined implementation.

1. Frame/Field Layer Decoding

Reference Pictures

A P-field Picture may reference either one or two previously decoded fields. The NUMREF syntax element in the picture layer is a one-bit syntax element that indicates whether the current field may reference one or two previous reference field pictures. If NUMREF=0, then the blocks and macroblocks of a current interlaced P-field picture may only reference one field. If NUMREF=1, then the blocks and macroblocks of the current interlaced P-field picture may use either of the two temporally closest (in display order) I or P field pictures as a reference.

FIGS. 15 and 16 show examples of two-reference P-fields.

P-field Picture Types

Interlaced P-field pictures may be one of two types: 1 MV or Mixed-MV. The following sections describe each type. In 1 MV P-fields, a single motion vector is used per motion-compensated macroblock to indicate the displacement of the predicted blocks for all 6 blocks in the macroblock. The 1 MV mode is signaled by the MVMODE and MVMODE2 picture layer syntax elements.

In Mixed-MV P-fields, each motion-compensated macroblock may be encoded as a 1 MV or a 4 MV macroblock. In a 4 MV macroblock, each of the 4 luminance blocks has a motion vector associated with it. In a Mixed-MV P-field, the 1 MV or 4 MV mode for each macroblock is indicated by the MBMODE syntax element at every macroblock. The Mixed-MV mode is signaled by the MVMODE and MVMODE2 picture layer syntax elements.

2. Macroblock Layer Decoding

Macroblocks in interlaced P-field pictures may be one of 3 possible types: 1 MV, 4 MV, and Intra. The macroblock type is signaled by the MBMODE syntax element in the macroblock layer. The following sections describe the 1 MV and 4 MV types and how they are signaled.

1 MV Macroblocks

1 MV macroblocks may occur in 1 MV and Mixed-MV P-field pictures. A 1 MV macroblock is one where a single motion vector represents the displacement between the current and reference pictures for all 6 blocks in the macroblock. For a 1 MV macroblock, the MBMODE syntax element in the macroblock layer indicates three things:

1) That the macroblock type is 1 MV
2) Whether the CBPCY syntax element is present
3) Whether the MVDATA syntax element is present If the MBMODE syntax element indicates that the CBPCY syntax element is present, then the CBPCY syntax element is present in the macroblock layer in the corresponding position. The CBPCY indicates which of the 6 blocks are coded in the block layer. If the MBMODE syntax element indicates that the CBPCY syntax element is not present, then CBPCY is assumed to equal 0 and no block data is present for any of the 6 blocks in the macroblock.

If the MBMODE syntax element indicates that the MVDATA syntax element is present, then the MVDATA syntax element is present in the macroblock layer in the corresponding position. The MVDATA syntax element encodes the motion vector differential. The motion vector differential is combined with the motion vector predictor to reconstruct the motion vector. If the MBMODE syntax element indicates that the MVDATA syntax element is not present, then the motion vector differential is assumed to be zero and therefore the motion vector is equal to the motion vector predictor.

4 MV Macroblocks

4 MV macroblocks may only occur in Mixed-MV P-field pictures. A 4 MV macroblock is one where each of the 4 luminance blocks in a macroblock has an associated motion vector which indicates the displacement between the current and reference pictures for that block. The displacement for the chroma blocks is derived from the 4 luminance motion vectors.

For a 4 MV macroblock, the MBMODE syntax element in the macroblock layer indicates three things:

1) That the macroblock type is 4 MV
2) Whether the CBPCY syntax element is present The 4 MVBP syntax element indicates which of the 4 luminance blocks contain non-zero motion vector differentials. The 4 MVBP syntax element decodes to a value between 0 and 15. For each of the 4 bit positions in the 4 MVBP, a value of 0 indicates that no motion vector differential (BLKMVDATA) is present for that block and the motion vector differential is assumed to be 0. A value of 1 indicates that a motion vector differential (BLKMVDATA) is present for that block in the corresponding position. For example, if 4 MVBP decodes to a value of 1100 (binary), then the bitstream contains BLKMVDATA for blocks 0 and 1 and no BLKMVDATA is present for blocks 2 and 3.

In an alternative implementation, the MBMODE syntax element can indicate if whether the 4 MVBP syntax element is present; if the MBMODE syntax element indicates that the 4 MVBP syntax element is not present, then it is assumed that motion vector differential data (BLKMVDATA) is present for all 4 luminance blocks.

Depending on whether the MVMODE/MVMODE2 syntax element indicates mixed-MV or all-1 MV the MBMODE signals the information as follows. Table 5 shows how the MBMODE signals information about the macroblock in all-1 MV pictures.

TABLE 5

Macroblock Mode in All-1 MV Pictures

| Index | Macroblock Type | CBP Present | MV Present |
|---|---|---|---|
| 0 | Intra | No | NA |
| 1 | Intra | Yes | NA |
| 2 | 1 MV | No | No |
| 3 | 1 MV | No | Yes |
| 4 | 1 MV | Yes | No |
| 5 | 1 MV | Yes | Yes |

Table 6 shows how the MBMODE signals information about the macroblock in mixed-MV pictures.

TABLE 6

Macroblock Mode in Mixed-1 MV Pictures

| Index | Macroblock Type | CBP Present | MV Present |
|---|---|---|---|
| 0 | Intra | No | NA |
| 1 | Intra | Yes | NA |
| 2 | 1 MV | No | No |
| 3 | 1 MV | No | Yes |
| 4 | 1 MV | Yes | No |
| 5 | 1 MV | Yes | Yes |
| 6 | 4 MV | No | NA |
| 7 | 4 MV | Yes | NA |

One of 8 tables is used to signal the MBMODE. The table is signaled at the picture layer via the MBMODETAB syntax element.

3. Motion Vector Decoding Process

The following sections describe the motion vector decoding process for blocks and macroblocks of P-field pictures.

Decoding Motion Vector Differential

The MVDATA or BLKMVDATA syntax elements encode motion information for macroblocks or the blocks in the macroblock. 1 MV macroblocks have a single MVDATA syntax element, and 4 MV macroblocks may have between zero and four BLKMVDATA elements. The following sections describe how to compute the motion vector differential for the one-reference (picture layer syntax element NUMREF=0) and two-reference (picture layer syntax element NUMREF=1) cases.

Motion Vector Differentials in One-Reference Field Pictures

In field pictures that have only one reference field, each MVDATA or BLKMVDATA syntax element in the macroblock layer jointly encodes two things: 1) the horizontal motion vector differential component and 2) the vertical motion vector differential component.

The MVDATA or BLKMVDATA syntax element is a variable length Huffman codeword followed by a fixed length codeword. The value of the Huffman codeword determines the size of the fixed length codeword. The MVTAB syntax element in the picture layer specifies the Huffman table used to decode the variable sized codeword.

The pseudo-code 2700 in FIG. 27A illustrates how the motion vector differential is decoded for a one-reference field. The values dmv_x and dmv_y are computed in the pseudo-code 2700. The values are defined as follows:
- dmv_x: differential horizontal motion vector component,
- dmv_y: differential vertical motion vector component,
- k_x, k_y: fixed length for long motion vectors,
- k_x and k_y depend on the motion vector range as defined by the MVRANGE symbol.

TABLE 7 k_x and k_y specified by MVRANGE

| MVRANGE | k_x | k_y | range_x | range_y |
|---|---|---|---|---|
| 0 (default) | 9 | 8 | 256 | 128 |
| 10 | 10 | 9 | 512 | 256 |
| 110 | 12 | 10 | 2048 | 512 |
| 111 | 13 | 11 | 4096 | 1024 | extend_x: extended range for horizontal motion vector differential, extend_y: extended range for vertical motion vector differential, extend_x and extend_y are derived from the DMVRANGE picture field syntax element. If DMVRANGE indicates that extended range for the horizontal component is used, then extend_x=1. Otherwise extend_x=0. Similarly, if DMVRANGE indicates that extended range for the vertical component is used, then extend_y=1 otherwise extend_y=0.

The offset_table is an array used in the pseudo-code 2700 and is defined as shown in FIG. 27A.

The pseudo-code 2710 in FIG. 27B illustrates how the motion vector differential is decoded for a one-reference field in an alternative combined implementation. Pseudo-code 2710 decodes motion vector differentials in a different way. For example, pseudo-code 2710 omits handling of extended motion vector differential ranges.

Motion Vector Differentials in Two-Reference Field Pictures

Two-reference field pictures occur in the coding of interlace frames using field pictures. Each frame of the sequence is separated into two fields, and each field is coded using what is essentially the progressive code path. Field pictures often have two reference fields and the coding of field picture motion vectors in this case is described below.

In field pictures that have two reference fields, each MVDATA or BLKMVDATA syntax element in the macroblock layer jointly encodes three things: 1) the horizontal motion vector differential component, 2) the vertical motion vector differential component and 3) whether the dominant or non-dominant predictor is used, i.e., which of the two fields is referenced by the motion vector.

The MVDATA or BLKMVDATA syntax element is a variable length Huffman codeword followed by a fixed length codeword. The value of the Huffman codeword determines the size of the fixed length codeword. The MVTAB syntax element in the picture layer specifies the Huffman table used to decode the variable sized codeword. The pseudo-code 2800 in FIG. 28A illustrates how the motion vector differential, and dominant/non-dominant predictor information are decoded.

The values predictor_flag, dmv_x and dmv_y are computed in the pseudo-code 2800 in FIG. 28A. In addition to the variables and arrays shown in the pseudo-code 2700 in FIG. 27A, pseudo-code 2800 contains the variable predictor_flag, which is a binary flag indicating whether the dominant or non-dominant motion vector predictor is used (0=dominant predictor used, 1=non-dominant predictor used), and the table size_table, which is an array defined as shown in FIG. 28.

The pseudo-code 2810 in FIG. 28B illustrates how the motion vector differential is decoded for a two-reference field in an alternative combined implementation. Pseudo-code 2810 decodes motion vector differentials in a different way. For example, pseudo-code 2810 omits handling of extended motion vector differential ranges.

Motion Vector Predictors

Motion vectors are computed by adding the motion vector differential computed in the previous section to a motion vector predictor. The predictor is computed from up to three neighboring motion vectors. The following sections describe how the motion vector predictors are calculated for macroblocks in 1 MV P-field pictures and Mixed-MV P-field pictures in this combined implementation.

Motion Vector Predictors in 1 MV Interlaced P-fields

Figure 29A:
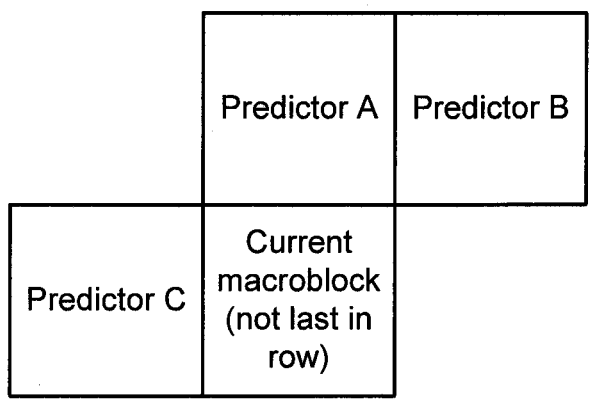
FIGS. 29A and 29B are diagrams showing locations of macroblocks for candidate motion vector predictors for a 1 MV macroblock in an interlaced P-field.
Figure 29B:
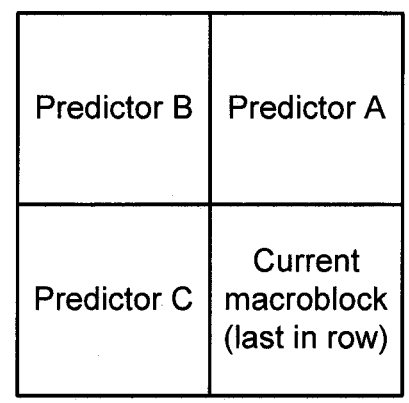

FIGS. 29A and 29B are diagrams showing the locations of macroblocks considered for candidate motion vector predictors for a 1 MV macroblock in an interlaced P-field. In 1 MV interlaced P-fields, the candidate predictors are taken from the left, top and top-right macroblocks, except in the case where the macroblock is the last macroblock in the row. In this case, Predictor B is taken from the top-left macroblock instead of the top-right. For the special case where the frame is one macroblock wide, the predictor is always Predictor A (the top predictor). The special cases for the current macroblock being in the top row (with no A and B predictors, or with no predictors at all) are addressed above with reference to FIGS. 20A-20F.

Motion Vector Predictors in Mixed-MV P Pictures

FIGS. 30A-34 show the locations of the blocks or macroblocks considered for the up to 3 candidate motion vectors for a motion vector for a 1 MV or 4 MV macroblock in Mixed-MV P-field pictures. In the following figures, the larger squares are macroblock boundaries and the smaller squares are block boundaries. For the special case where the frame is one macroblock wide, the predictor is always Predictor A (the top predictor). The special cases for the current block or macroblock being in the top row are addressed above with reference to FIGS. 20A-20F.

Figure 30A:
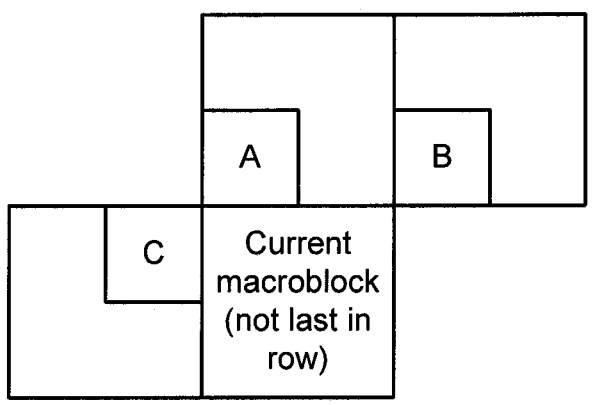
FIGS. 30A and 30B are diagrams showing locations of blocks for candidate motion vector predictors for a 1 MV macroblock in a mixed 1 MV/4 MV interlaced P-field.
Figure 30B:
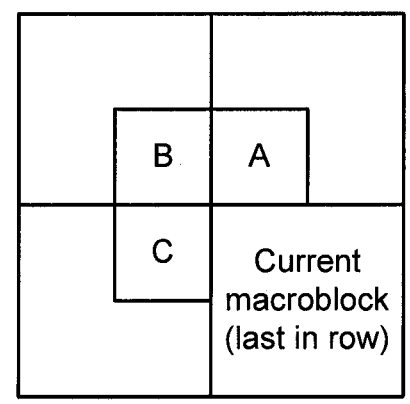

FIGS. 30A and 30B are diagrams showing locations of blocks considered for candidate motion vector predictors for a 1 MV current macroblock in a mixed 1 MV/4 MV interlaced P-field. The neighboring macroblocks may be 1 MV or 4 MV macroblocks. FIGS. 30A and 30B show the locations for the candidate motion vectors assuming the neighbors are 4 MV (i.e., predictor A is the motion vector for block 2 in the macroblock above the current macroblock, and predictor C is the motion vector for block 1 in the macroblock immediately to the left of the current macroblock). If any of the neighbors is a 1 MV macroblock, then the motion vector predictor shown in FIGS. 29A and 29B is taken to be the vector for the entire macroblock. As FIG. 30B shows, if the macroblock is the last macroblock in the row, then Predictor B is from block 3 of the top-left macroblock instead of from block 2 in the top-right macroblock as is the case otherwise.

Figure 31A:
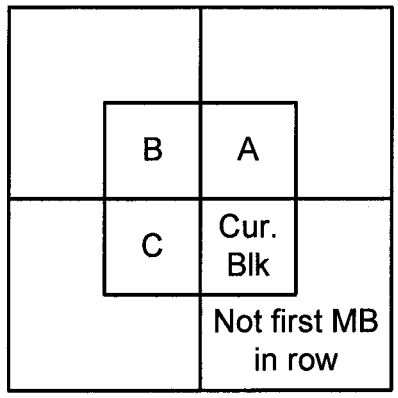
FIGS. 31A, 31B, 32A, 32B, 33, and 34 are diagrams showing the locations of blocks for candidate motion vector predictors for a block at various positions in a 4 MV macroblock in a mixed 1 MV/4 MV interlaced P-field.
Figure 31B:
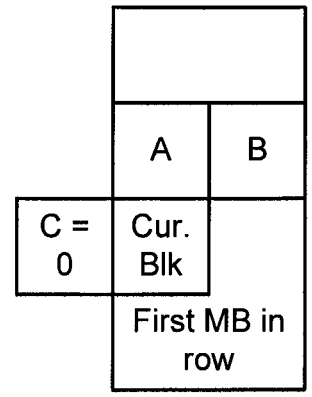
Figure 32A:
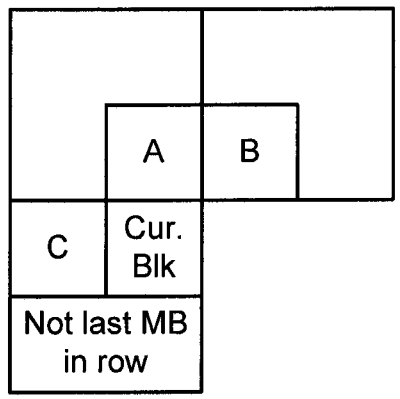
Figure 32B:
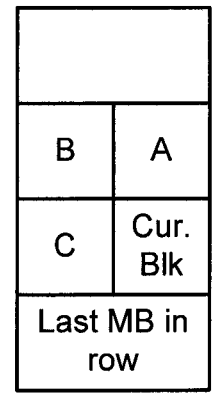
Figure 33:
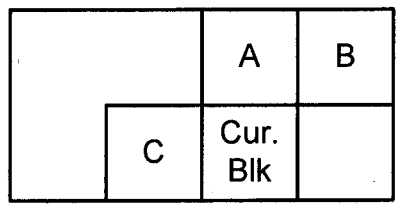
Figure 34:
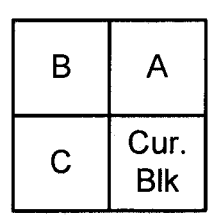

FIGS. 31A-34 show the locations of blocks considered for candidate motion vector predictors for each of the 4 luminance blocks in a 4 MV macroblock. FIGS. 31A and 31B are diagrams showing the locations of blocks considered for candidate motion vector predictors for a block at position 0 in a 4 MV macroblock in a mixed 1 MV/4 MV interlaced P-field; FIGS. 32A and 32B are diagrams showing the locations of blocks considered for candidate motion vector predictors for a block at position 1 in a 4 MV macroblock in a mixed interlaced P-field; FIG. 33 is a diagram showing the locations of blocks considered for candidate motion vector predictors for a block at position 2 in a 4 MV macroblock in a mixed 1 MV/4 MV interlaced P-field; and FIG. 34 is a diagram showing the locations of blocks considered for candidate motion vector predictors for a block at position 3 in a 4 MV macroblock in a mixed 1 MV/4 MV interlaced P-field. Again, if a neighbor is a 1 MV macroblock, the motion vector predictor for the macroblock is used for the blocks of the macroblock.

For the case where the macroblock is the first macroblock in the row, Predictor B for block 0 is handled differently than block 0 the remaining macroblocks in the row. In this case, Predictor B is taken from block 3 in the macroblock immediately above the current macroblock instead of from block 3 in the macroblock above and to the left of current macroblock, as is the case otherwise. Similarly, for the case where the macroblock is the last macroblock in the row, Predictor B for block 1 is handled differently. In this case, the predictor is taken from block 2 in the macroblock immediately above the current macroblock instead of from block 2 in the macroblock above and to the right of the current macroblock, as is the case otherwise. If the macroblock is in the first macroblock column, then Predictor C for blocks 0 and 2 are set equal to 0.

Dominant and Non-Dominant MV Predictors

In two-reference field P-field pictures, for each inter-coded macroblock, two motion vector predictors are derived. One is from the dominant field and the other is from the non-dominant field. The dominant field is considered to be the field containing the majority of the actual-value motion vector predictor candidates in the neighborhood. In the case of a tie, the motion vector predictor for the opposite field is considered to be the dominant predictor. Intra-coded macroblocks are not considered in the calculation of the dominant/non-dominant predictor. If all candidate predictor macroblocks are intra-coded, then the dominant and non-dominant motion vector predictors are set to zero and the dominant predictor is taken to be from the opposite field.

Calculating the Motion Vector Predictor

If NUMREF=1, then the current field picture may refer to the two most recent field pictures, and two motion vector predictors are calculated for each motion vector of a block or macroblock. The pseudo-code 3500 in FIGS. 35A-35F describes how the motion vector predictors are calculated for the two-reference case in the combined implementation. (The pseudo-code 2000 in FIGS. 20A-20F describes how the motion vector predictors are calculated for the two-reference case in another implementation). In two-reference pictures (NUMREF=1) the current field may reference the two most recent fields. One predictor is for the reference field of the same polarity and the other is for the reference field with the opposite polarity.

Scaling Operations in Combined Implementation

FIGS. 21A-B are code diagrams showing pseudo-code 2100 for scaling a predictor from one field to derive a predictor from another field. The values of SCALEOPP, SCALESAME1, SCALESAME2, SCALEZONE1_X, SCALEZONE1_Y, ZONE1OFFSET_X and ZONE1OFFSET_Y in this combined implementation are shown in the table 2200 in FIG. 22 (for the case where the current field is the first field) and the table 2300 in FIG. 23 (for the case where the current field is the second field). The reference frame distance is encoded in the REFDIST field in the picture header. The reference frame distance is REFDIST+1.

Reconstructing Motion Vectors

The following sections describe how to reconstruct the luminance and chroma motion vectors for 1 MV and 4 MV macroblocks. After a motion vector is reconstructed, it may be subsequently used as a neighborhood motion vector to predict the motion vector for a nearby macroblock. If the motion vector is for a block or macroblock in a two-reference field interlaced P-field, the motion vector will have an associated polarity of "same" or "opposite," and may be used to derive a motion vector predictor for the other field polarity for motion vector prediction.

Luminance Motion Vector Reconstruction

In all cases (1 MV and 4 MV macroblocks) the luminance motion vector is reconstructed by adding the differential to the predictor as follows:

mv_x=(dmv_x+predictor_x) smod range_x
mv_y=(dmv_y+predictor_y) smod range_y

The modulus operation "smod" is a signed modulus, defined as follows:

$$A \,\mathrm{smod}\, b = ((A+b)\%(2*b)) - b$$

This ensures that the reconstructed vectors are valid. (A smod b) lies within −b and b−1. range_x and range_y depend on MVRANGE.

Figure 36:
FIG. 36 is a code listing showing pseudo-code for determining a reference field in two-reference interlaced P-fields.

If the interlaced P-field picture uses two reference pictures (NUMREF=1), then the predictor_flag derived after decoding the motion vector differential is combined with the value of dominantpredictor derived from motion vector prediction to determine which field is used as reference. The pseudo-code 3600 in FIG. 36 describes how the reference field is determined.

In 1 MV macroblocks there will be a single motion vector for the 4 blocks that make up the luminance component of the macroblock. If the MBMODE syntax element indicates that no MV data is present in the macroblock layer, then dmv_x=0 and dmv_y=0 (mv_x=predictor_x and mv_y=predictor_y).

In 4 MV macroblocks, each of the inter-coded luminance blocks in a macroblock will have its own motion vector. Therefore there will be between 0 and 4 luminance motion vectors in each 4 MV macroblock. If the 4 MVBP syntax element indicates that no motion vector information is present for a block, then dmv_x=0 and dmv_y for that block (mv_x=predictor_x and mv_y=predictor_y).

Chroma Motion Vector Reconstruction

The chroma motion vectors are derived from the luminance motion vectors. In an alternative implementation, for 4 MV macroblocks, the decision on whether to code the chroma blocks as Inter or Intra is made based on the status of the luminance blocks or fields.

Having described and illustrated the principles of my invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of my invention may be applied, I claim as my invention all such embodiments as may come within the scope and spirit of the following claims and equivalents thereto.

I claim:

1. One or more computer-readable storage media storing computer-executable instructions for causing a computing device that implements a video decoder to perform a method comprising:
   at the computing device that implements the video decoder, receiving, from a bit stream, information indicating a motion vector differential for a motion vector of a current portion of a current interlaced P-field;
   with the computing device that implements the video decoder, computing a motion vector predictor for the motion vector, including:
      determining a first motion vector predictor candidate from a first neighbor of the current portion, the first motion vector predictor candidate referencing a first reference field having a first polarity;
      computing a second motion vector predictor candidate by scaling an actual motion vector value of a second neighbor of the current portion, the actual motion vector value referencing a second reference field having a second polarity different than the first polarity; and
      using the first motion vector predictor candidate and the second motion vector predictor candidate when computing the motion vector predictor for the motion vector for the current portion of the current interlaced P-field; and
   with the computing device that implements the video decoder, reconstructing the motion vector from the motion vector differential and the motion vector predictor.

2. The one or more computer-readable storage media of claim 1 wherein the first motion vector predictor candidate has the opposite field polarity as the current portion, wherein the actual motion vector value has the same field polarity as the current portion, and wherein the scaling is adapted to scale from the same polarity to the opposite polarity.

3. The one or more computer-readable storage media of claim 1 wherein the first motion vector predictor candidate has the same field polarity as the current portion, wherein the actual motion vector value has the opposite field polarity as the current portion, and wherein the scaling is adapted to scale from the opposite polarity to the same polarity.

4. The one or more computer-readable storage media of claim 1 wherein the scaling is based at least in part on a reference frame distance.

5. In a computing device that implements a video encoder, a method comprising:
   with the computing device that implements the video encoder, computing a motion vector predictor for a motion vector of a current portion of a current interlaced P-field, including:
      identifying a first candidate motion vector of a first neighbor of the current portion, the first candidate motion vector referencing a first reference field having a first polarity;
      identifying a second candidate motion vector of a second neighbor of the current portion, the second candidate motion vector referencing a second reference field having a second polarity different than the first polarity;
      scaling the second candidate motion vector; and
      determining the motion vector predictor using at least the first candidate motion vector and the scaled second candidate motion vector;
   with the computing device that implements the video encoder, computing a motion vector differential between the motion vector and the motion vector predictor; and
   with the computing device that implements the video encoder, signaling information indicating the motion vector differential in a bit stream.

6. The method of claim 5 wherein the first polarity is same polarity as the current interlaced P-field and the second polarity is opposite polarity as the current interlaced P-field, and wherein the scaling is adapted to scale from opposite polarity to same polarity.

7. The method of claim 5 wherein the first polarity is opposite polarity as the current interlaced P-field and the second polarity is same polarity as the current interlaced P-field, and wherein the scaling is adapted to scale from same polarity to opposite polarity.

8. The method of claim 5 wherein the scaling is based at least in part on reference frame distance, and wherein the reference frame distance indicates distance between a current interlaced frame that includes the current interlaced P-field and a previous interlaced frame that includes whichever of the first reference field and the second reference field is temporally further from the current interlaced P-field.

9. The method of claim 5 wherein the scaling includes looking up a scaling value in one of two tables, using a first table of the two tables when the current interlaced P-field is first field in a current interlaced frame and using a second table of the two tables when the current interlaced P-field is second field in the current interlaced frame.

10. The method of claim 5 wherein the motion vector predictor is a first polarity motion vector predictor that references the first reference field, the method further comprising:
    with the computing device that implements the video encoder, computing a second polarity motion vector predictor that references the second reference field; and
    with the computing device that implements the video encoder, selecting between using the first polarity motion vector predictor and the second polarity motion vector predictor.

11. The method of claim 5 further comprising:
    using a motion estimator to find the motion vector for the current portion, wherein the motion estimator outputs side information including the motion vector differential.

12. The method of claim 5 further comprising, for each of multiple portions of the current interlaced P-field as the current portion:
    performing motion estimation to find the motion vector for the current portion, wherein the motion vector references a matching portion in the first reference field, and wherein the motion vector predictor is selected as referring to the first reference field.

13. The method of claim 5 further comprising:
    performing rate control that includes at least one of frame dropping, adaptive filtering and consideration of buffer feedback; and
    performing channel coding of the bit stream.

14. In a computing device that implements a video decoder, a method comprising:
    at the computing device that implements the video decoder, receiving, from a bit stream, information indicating a motion vector differential for a motion vector of a current portion of a current interlaced P-field;
    with the computing device that implements the video decoder, computing a motion vector predictor for the motion vector, including:

identifying a first candidate motion vector of a first neighbor of the current portion, the first candidate motion vector referencing a first reference field having a first polarity;

identifying a second candidate motion vector of a second neighbor of the current portion, the second candidate motion vector referencing a second reference field having a second polarity different than the first polarity;

scaling the second candidate motion vector; and determining the motion vector predictor using at least the first candidate motion vector and the scaled second candidate motion vector; and with the computing device that implements the video decoder, reconstructing the motion vector from the motion vector differential and the motion vector predictor.

15. The method of claim 14 wherein the first polarity is same polarity as the current interlaced P-field and the second polarity is opposite polarity as the current interlaced P-field, and wherein the scaling is adapted to scale from opposite polarity to same polarity.

16. The method of claim 14 wherein the first polarity is opposite polarity as the current interlaced P-field and the second polarity is same polarity as the current interlaced P-field, and wherein the scaling is adapted to scale from same polarity to opposite polarity.

17. The method of claim 14 wherein the scaling is based at least in part on reference frame distance.

18. The method of claim 17 wherein the reference frame distance indicates distance between a current interlaced frame that includes the current interlaced P-field and a previous interlaced frame that includes whichever of the first reference field and the second reference field is temporally further from the current interlaced P-field.

19. The method of claim 14 wherein the scaling includes looking up a scaling value in a table of plural scaling values.

20. The method of claim 14 wherein the scaling includes looking up a scaling value in one of two tables, using a first table of the two tables when the current interlaced P-field is first field in a current interlaced frame and using a second table of the two tables when the current interlaced P-field is second field in the current interlaced frame.

21. The method of claim 14 wherein the portion is a macroblock.

22. The method of claim 14 wherein the portion is a block of a macroblock.

23. The method of claim 14 wherein the motion vector predictor is a first polarity motion vector predictor that references the first reference field, the method further comprising:

with the computing device that implements the video decoder, computing a second polarity motion vector predictor that references the second reference field; and with the computing device that implements the video decoder, selecting between using the first polarity motion vector predictor and the second polarity motion vector predictor.

24. A computer system that implements a video decoder, wherein the computer system comprises a processor, memory, speaker, voice input device, display and wireless communication connection, and wherein the computer system is adapted to:

receive, from a bit stream, information indicating a motion vector differential for a motion vector of a current macroblock of a current interlaced P-field;

compute a motion vector predictor for the motion vector, including:

identifying a first candidate motion vector of a first neighbor of the current macroblock, the first candidate motion vector referencing a first reference field having a first polarity;

identifying a second candidate motion vector of a second neighbor of the current macroblock, the second candidate motion vector referencing a second reference field having a second polarity different than the first polarity;

scaling the second candidate motion vector; and determining the motion vector predictor using at least the first candidate motion vector and the scaled second candidate motion vector; and reconstruct the motion vector from the motion vector differential and the motion vector predictor.

25. The computer system of claim 24 wherein:

when the first polarity is same polarity as the current interlaced P-field and the second polarity is opposite polarity as the current interlaced P-field, the scaling is adapted to scale from opposite polarity to same polarity; and when the first polarity is opposite polarity as the current interlaced P-field and the second polarity is same polarity as the current interlaced P-field, the scaling is adapted to scale from same polarity to opposite polarity.

26. The computer system of claim 24 wherein the scaling is based at least in part on reference frame distance, and wherein the reference frame distance indicates distance between a current interlaced frame that includes the current interlaced P-field and a previous interlaced frame that includes whichever of the first reference field and the second reference field is temporally further from the current interlaced P-field.

27. The computer system of claim 24 wherein the scaling includes looking up a scaling value in one of two tables, using a first table of the two tables when the current interlaced P-field is first field in a current interlaced frame and using a second table of the two tables when the current interlaced P-field is second field in the current interlaced frame.

28. A computer system that implements a video encoder, wherein the computer system comprises a processor and memory, and wherein the computer system is adapted to perform motion estimation that includes:

finding a motion vector of a current macroblock of a current interlaced P-field, wherein the motion vector references a matching macroblock of a first reference field having a first polarity;

computing a motion vector predictor for the motion vector, wherein the motion vector predictor is selected as referring to the first reference field, including:

identifying a first candidate motion vector of a first neighbor of the current macroblock, the first candidate motion vector referencing the first reference field;

identifying a second candidate motion vector of a second neighbor of the current macroblock, the second candidate motion vector referencing a second reference field having a second polarity different than the first polarity;

scaling the second candidate motion vector; and determining the motion vector predictor using at least the first candidate motion vector and the scaled second candidate motion vector; and computing a motion vector differential between the motion vector and the motion vector predictor, wherein information indicating the motion vector differential is later signaled in a bit stream.

29. The computer system of claim 28 wherein:
when the first polarity is same polarity as the current interlaced P-field and the second polarity is opposite polarity as the current interlaced P-field, the scaling is adapted to scale from opposite polarity to same polarity; and
when the first polarity is opposite polarity as the current interlaced P-field and the second polarity is same polarity as the current interlaced P-field, the scaling is adapted to scale from same polarity to opposite polarity.

30. The computer system of claim 28 wherein the scaling is based at least in part on reference frame distance, and wherein the reference frame distance indicates distance between a current interlaced frame that includes the current interlaced P-field and a previous interlaced frame that includes whichever of the first reference field and the second reference field is temporally further from the current interlaced P-field.

31. The computer system of claim 28 wherein the scaling includes looking up a scaling value in one of two tables, using a first table of the two tables when the current interlaced P-field is first field in a current interlaced frame and using a second table of the two tables when the current interlaced P-field is second field in the current interlaced frame.

32. The computer system of claim 28 wherein the computer system is further adapted to:
perform rate control that includes at least one of frame dropping, adaptive filtering and consideration of buffer feedback; and
perform channel coding of the bit stream.

33. One or more computer-readable storage media storing computer-executable instructions for causing a computing device that implements a video encoder to perform a method comprising:
computing a motion vector predictor for a motion vector of a current portion of a current interlaced P-field, including:
identifying a first candidate motion vector of a first neighbor of the current portion, the first candidate motion vector referencing a first reference field having a first polarity;
identifying a second candidate motion vector of a second neighbor of the current portion, the second candidate motion vector referencing a second reference field having a second polarity different than the first polarity;
scaling the second candidate motion vector; and
determining the motion vector predictor using at least the first candidate motion vector and the scaled second candidate motion vector;
computing a motion vector differential between the motion vector and the motion vector predictor; and
signaling information indicating the motion vector differential in a bit stream.

34. The one or more computer-readable storage media of claim 33 wherein the method further comprises:
using a motion estimator to find the motion vector for the current portion, wherein the motion estimator outputs side information including the motion vector differential.

35. The one or more computer-readable storage media of claim 33 wherein the method further comprises, for each of multiple portions of the current interlaced P-field as the current portion:
performing motion estimation to find the motion vector for the current portion, wherein the motion vector references a matching portion in the first reference field, and wherein the motion vector predictor is selected as referring to the first reference field.

* * * * *